US010044712B2

(12) United States Patent
Gordon et al.

(10) Patent No.: US 10,044,712 B2
(45) Date of Patent: Aug. 7, 2018

(54) AUTHENTICATION BASED ON GAZE AND PHYSIOLOGICAL RESPONSE TO STIMULI

(71) Applicant: Microsoft Technology Licensing, LLC, Redmond, WA (US)

(72) Inventors: John C. Gordon, Newcastle, WA (US); Cem Keskin, Seattle, WA (US); Michael Betser, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 15/169,359

(22) Filed: May 31, 2016

(65) Prior Publication Data

US 2017/0346817 A1    Nov. 30, 2017

(51) Int. Cl.
| | | |
|---|---|---|
| G06F 21/10 | (2013.01) | |
| H04L 29/06 | (2006.01) | |
| G02B 27/01 | (2006.01) | |
| G06F 3/01 | (2006.01) | |
| G06K 9/00 | (2006.01) | |
| H04W 12/06 | (2009.01) | |
| G06F 21/32 | (2013.01) | |

(52) U.S. Cl.
CPC ...... *H04L 63/0861* (2013.01); *G02B 27/0172* (2013.01); *G06F 3/013* (2013.01); *G06F 21/32* (2013.01); *G06K 9/00885* (2013.01); *H04W 12/06* (2013.01); *G02B 2027/0187* (2013.01); *G06K 2009/00939* (2013.01)

(58) Field of Classification Search
CPC ............ H04L 63/0861; G02B 27/0172; G02B 2027/0187; G06F 3/013; H04W 12/06; G06K 9/00885; G06K 2009/00939
See application file for complete search history.

(56) References Cited

U.S. PATENT DOCUMENTS

| 5,231,674 A | 7/1993 | Cleveland et al. |
|---|---|---|
| 6,520,905 B1 | 2/2003 | Surve et al. |

(Continued)

FOREIGN PATENT DOCUMENTS

| CN | 102866775 A | 1/2013 |
|---|---|---|
| WO | WO2014142962 A1 | 9/2014 |

OTHER PUBLICATIONS

"International Search Report and Written Opinion Issued in PCT Application No. PCT/US2017/033436", dated Jul. 31, 2017, 10 Pages.

(Continued)

*Primary Examiner* — Jeffrey C Pwu
*Assistant Examiner* — William A Corum, Jr.
(74) *Attorney, Agent, or Firm* — Jacob P. Rohwer; Newport IP, LLC

(57) ABSTRACT

A user may be authenticated to access an account, computing device, or other resource based on the user's gaze pattern and neural or other physiological response(s) to one or more images or other stimuli. When the user attempts to access the resource, a computing device may obtain login gaze tracking data and measurement of a physiological condition of the user at the time that the user is viewing an image or other stimulus. Based on comparison of the login gaze tracking data and the measurement of the physiological condition to a model, the computing device can determine whether to authenticate the user to access the resource.

20 Claims, 20 Drawing Sheets

(56) References Cited

U.S. PATENT DOCUMENTS

| | | |
|---|---|---|
| 7,594,122 B2 | 9/2009 | Milgramm et al. |
| 7,986,816 B1 | 7/2011 | Hoanca et al. |
| 8,135,957 B2 | 3/2012 | Dinges et al. |
| 8,234,262 B2 | 7/2012 | Jung et al. |
| 8,988,350 B2 | 3/2015 | Karmarkar et al. |
| 9,058,473 B2 | 6/2015 | Navratil et al. |
| 2007/0236488 A1 | 10/2007 | Mathan et al. |
| 2011/0256520 A1 | 10/2011 | Siefert |
| 2013/0044055 A1* | 2/2013 | Karmarkar ............ G06F 3/013 345/158 |
| 2013/0063550 A1 | 3/2013 | Ritchey et al. |
| 2014/0125574 A1* | 5/2014 | Scavezze ............... G06F 21/31 345/156 |
| 2014/0184550 A1 | 7/2014 | Hennessey et al. |
| 2015/0073907 A1 | 3/2015 | Purves et al. |
| 2015/0294149 A1 | 10/2015 | Palti-Wasserman et al. |
| 2016/0103487 A1 | 4/2016 | Crawford et al. |
| 2016/0132669 A1* | 5/2016 | Pathangay ............ G06F 21/32 726/19 |
| 2016/0183812 A1* | 6/2016 | Zhang .................. A61B 5/7246 600/301 |
| 2016/0308859 A1* | 10/2016 | Barry .................. H04L 63/0861 |
| 2016/0358181 A1* | 12/2016 | Bradski ............ G06Q 20/40145 |
| 2017/0061424 A1* | 3/2017 | Dent .................. G06Q 20/3227 |
| 2017/0315613 A1* | 11/2017 | Fein ........................ G06F 3/011 |
| 2017/0318019 A1* | 11/2017 | Gordon ................ H04L 63/102 |

OTHER PUBLICATIONS

Martin et al., "Eye Tracking Recognition-based Graphical Authentication," In Proceedings of 7th International Conference on Application of Information and Communication Technologies, Oct. 23, 2013, pp. 1-5.

Schmalstieg et al., "Gaze-Directed Ubiquitous Interaction Using a Brain-Computer Interface," In Proceedings of Augmented Human International Conference, Apr. 2, 2010, 5 pages.

Thorpe et al., "Pass-thoughts: Authenticating with Our Minds," In Proceedings of the workshop on New security paradigms, Sep. 20, 2005, pp. 45-56.

* cited by examiner

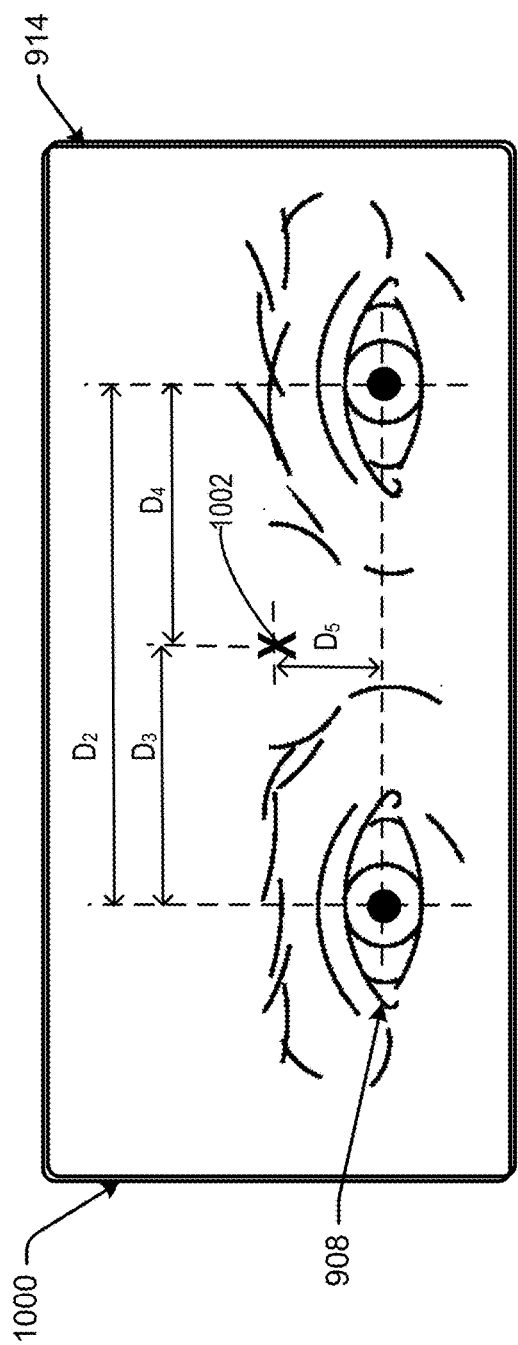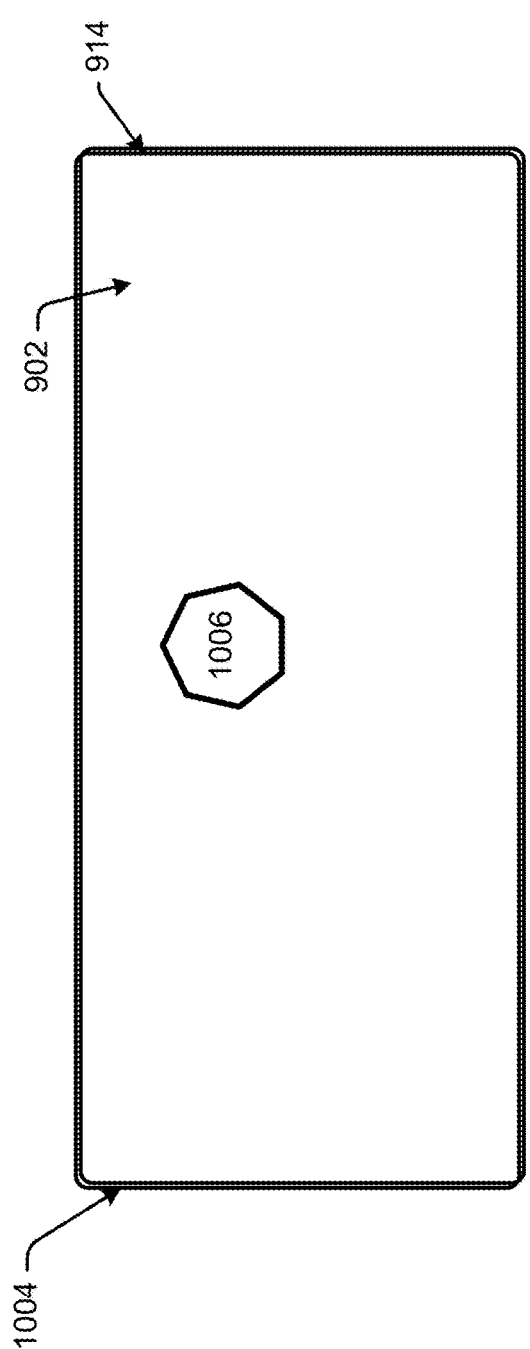

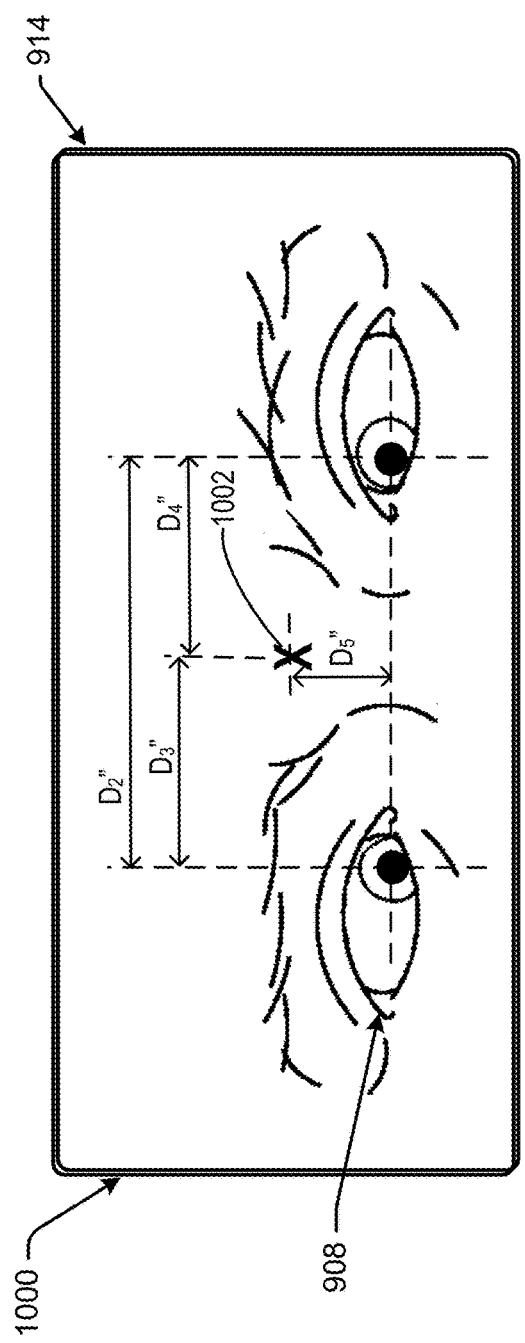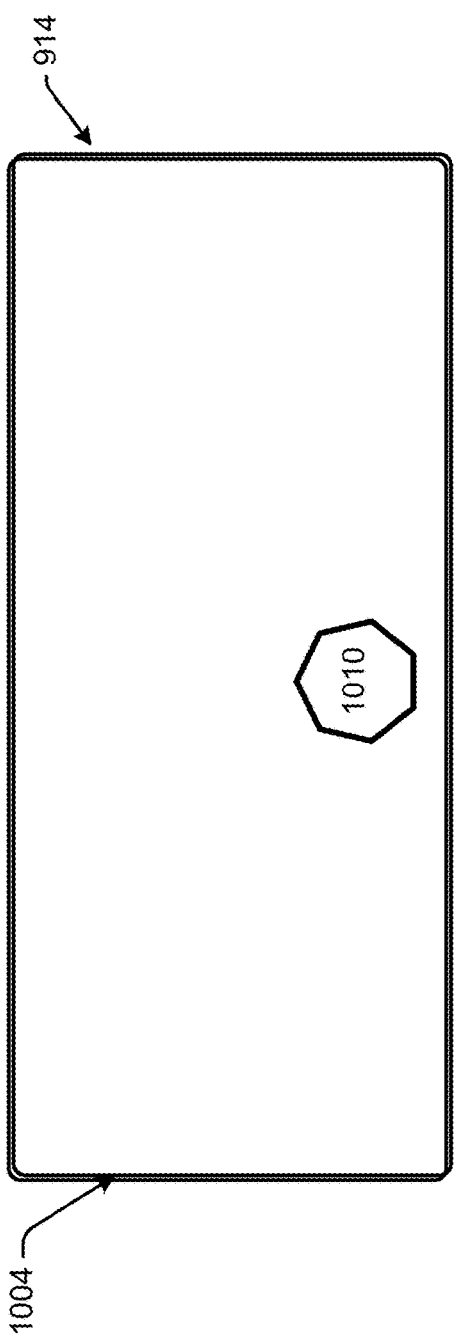

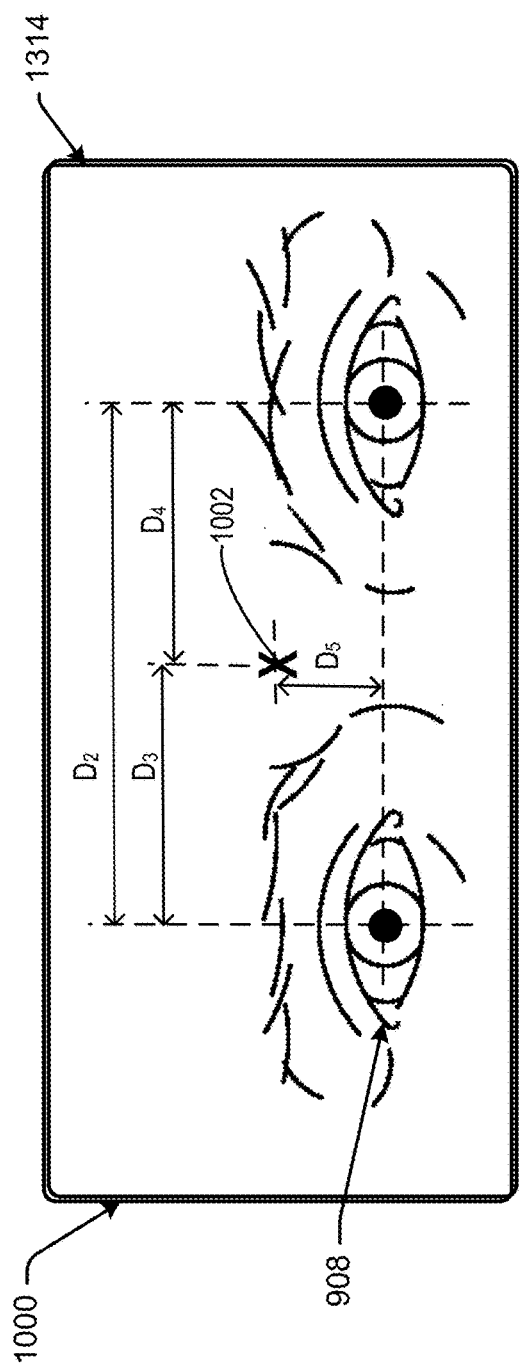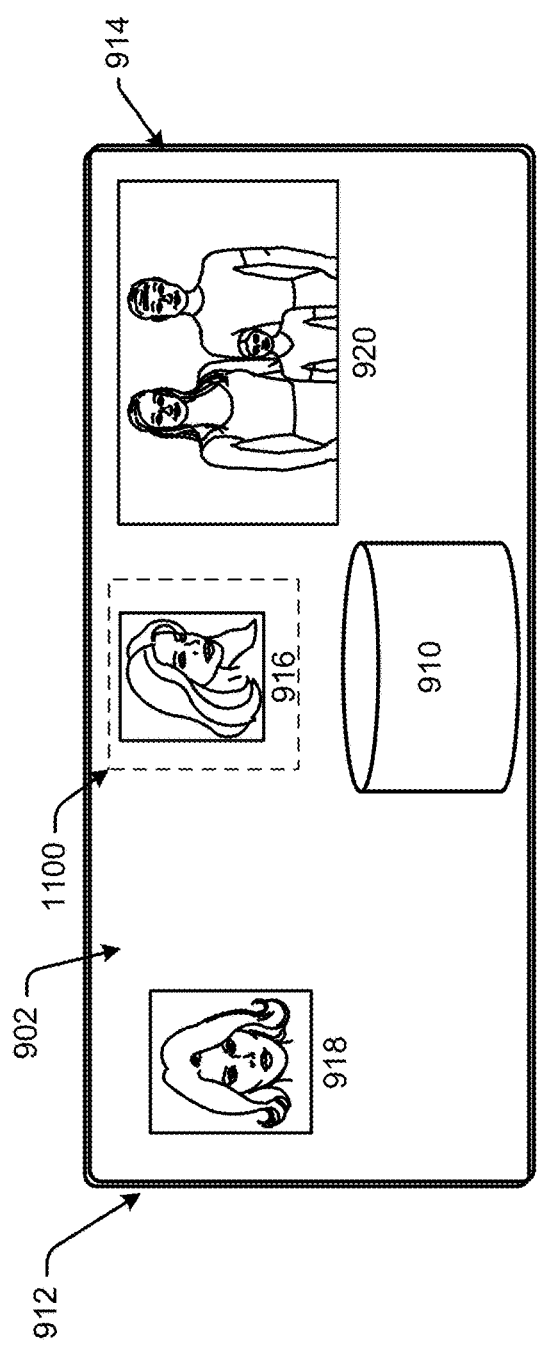

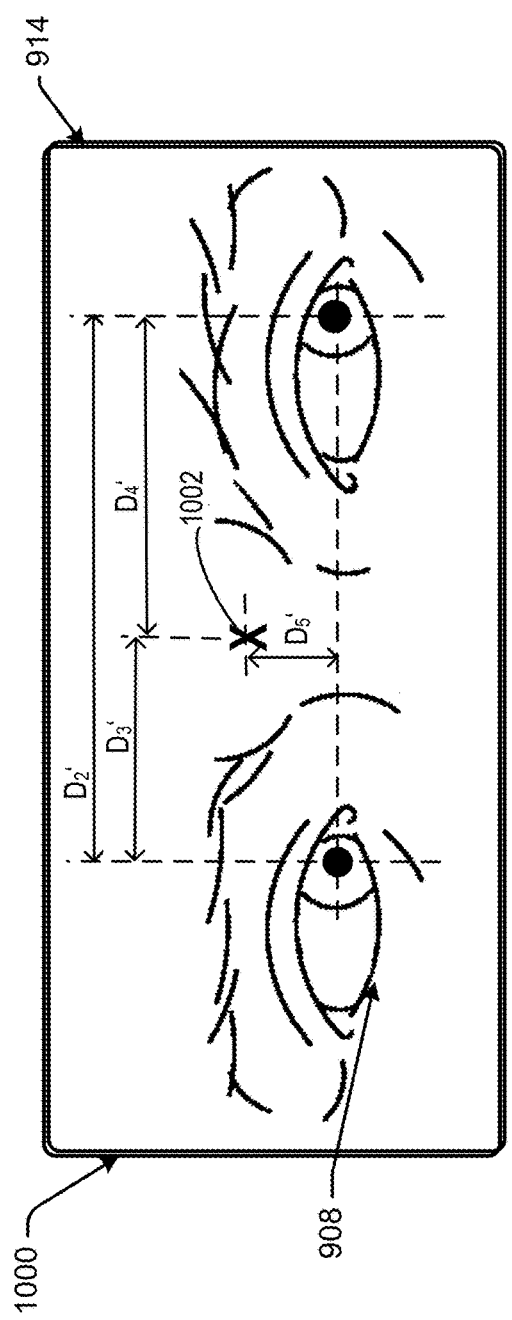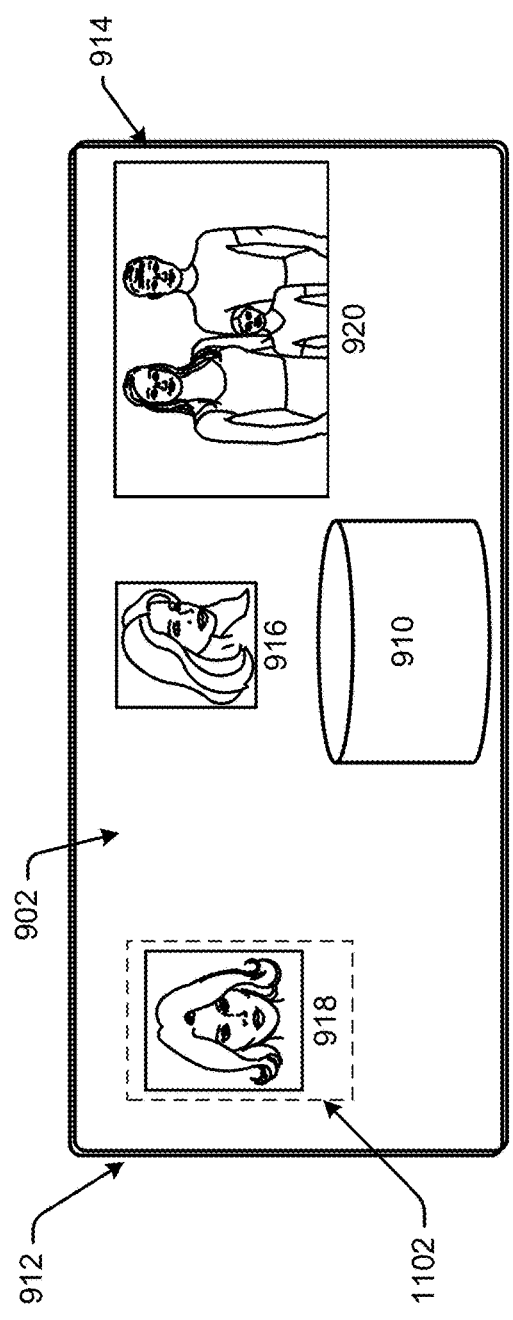

AUTHENTICATION BASED ON GAZE AND PHYSIOLOGICAL RESPONSE TO STIMULI

BACKGROUND

Users are often required to login to authenticate their identity in order to access online accounts, computing devices, or other resources. Numerous authentication techniques exist. For example, before accessing a resource, a user may be required to provide a login name, email address, personal identification number (PIN), text-based password, picture password, digital certificate, physical access credential (e.g., smart card), phone number, biometric information (e.g., finger print, retinal scan, etc.), answers to one or more security questions, and/or other identifying information. Authentication has become a common requirement for almost everything users do on computers. Yet, authentication is a heavy and cumbersome task, often imposing a cognitive load (e.g., to remember passwords) or lengthy and cumbersome tasks (e.g., fingerprint/retinal scanning). Additionally, almost all existing authentication techniques require intentional movement on the part of the user (e.g., entry of a textual or picture password, placing a body part in proximity to a biometric scanner, etc.), which is difficult or impossible for many disabled persons. Still further, many existing authentication techniques are susceptible to being spoofed by humans and/or computers.

SUMMARY

This disclosure describes techniques for authenticating a user to access an account, computing device, location, or other resource based on a user's gaze pattern and neural or other physiological response(s) to one or more images or other stimuli.

In some examples, in order to access a resource, a user may be prompted to establish a model representing the user's gaze pattern and physiological response to viewing one or more images. For instance, a computing device by which the user attempts to access the resource may cause presentation of an image on a display, and may obtain gaze tracking data and a measurement of a physiological condition of the user while the user is viewing the image. The model may be established based at least in part on the gaze tracking data of the user and the measurement of the physiological condition of the user at a time that the user is viewing the image. The model may be associated with the resource and stored in memory for use in authenticating the user to access the resource.

In some examples, when the user attempts to access a resource, a computing device may determine whether to authenticate the user to access the resource based on a model representative of user gaze tracking data and physiological condition. Responsive to receiving a request by the user to access the resource, the computing device may cause presentation of an image via an authentication interface. The computing device may obtain login gaze tracking data corresponding to gaze of the user at a time that the user is viewing the image via the authentication interface, and a measurement of a physiological condition of the user at the time that the user is viewing the image via the authentication interface. Based on the login gaze tracking data and the measurement of the physiological condition, the computing device can determine whether to authenticate the user to access the resource. In some examples, the determination of whether to authenticate the user to access the resource may be based at least in part on a comparison of the login gaze tracking data and the measurement of the physiological condition of the user at the time that the user is viewing the image via the authentication interface, with a model representative of gaze of the user and physiological condition of the user at a previous time that the user viewed the image. If the login gaze tracking data and the measurement of the physiological condition of the user at the time that the user is viewing the image via the authentication interface correlate with the model, the user may be authenticated to access the resource.

The authentication techniques described herein provide a fast and easy way of authenticating a user to access a resource. In some examples, the techniques described herein can be performed without intentional movement on the part of the user to enter a password or position a body part in proximity to a biometric scanner. Because the user need not remember a password, the cognitive burden on the user is low and there is no authentication credential that could be lost or stolen. Additionally, the neurological or other physiological response to certain stimuli are unique and personal to the user, making it difficult for the response to be spoofed or reproduced by other humans and/or computers.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 10A-FIG. 10F describe example techniques for obtaining calibration data for gaze tracking.

FIG. 11A-FIG. 11F describe example techniques for processing calibration data and other data to identify a gaze location.

DETAILED DESCRIPTION

Figure 1:
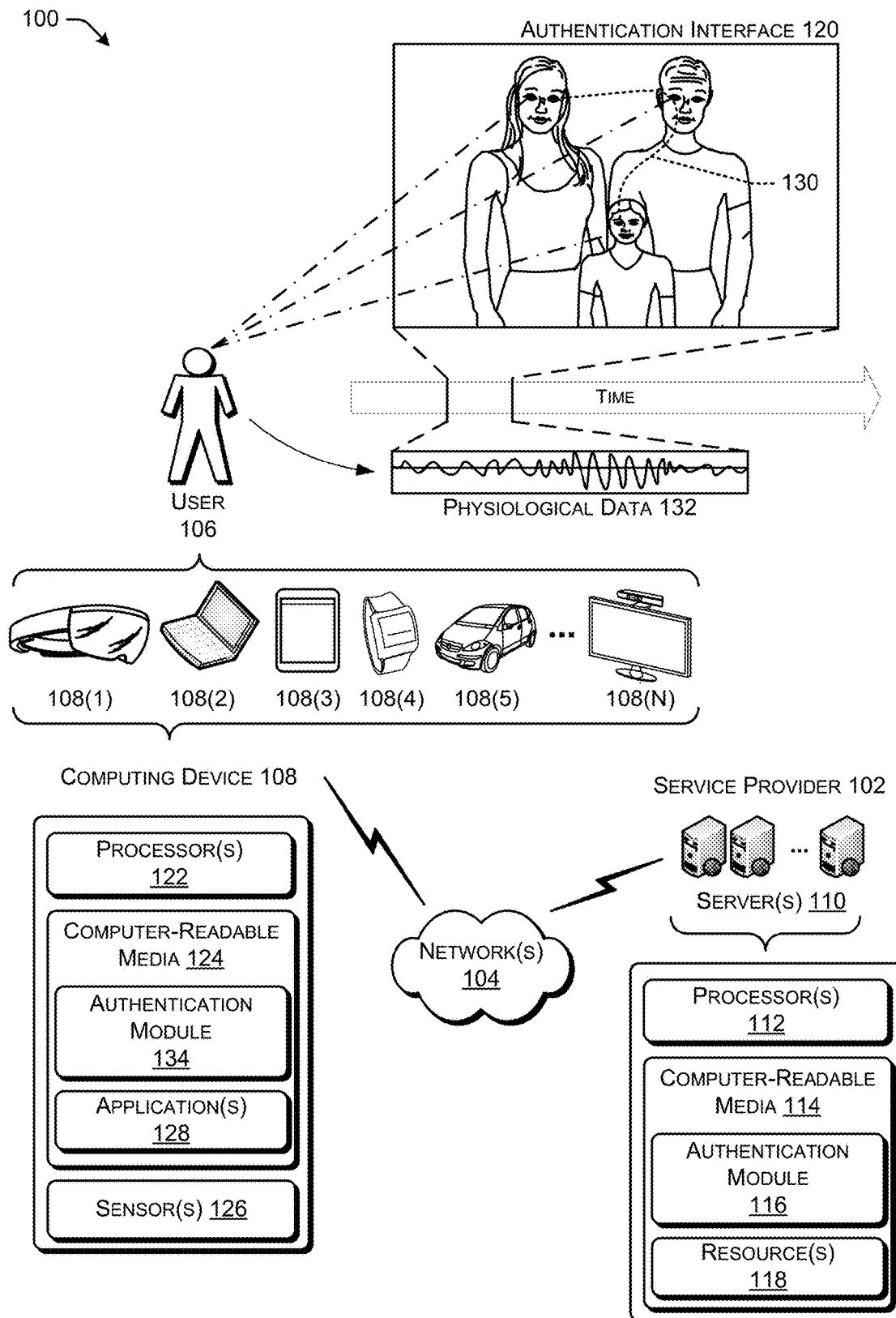
FIG. 1 is a schematic diagram showing an example environment for enabling authentication to a resource based on gaze and physiological response to stimuli.

As discussed above, authentication has become a common requirement for almost everything users do on computers. For instance, users are required to authenticate themselves in order to access an online bank account, make a payment to an online merchant, login into a computing device, use a local or web-based application or service, gain entry to a building or room, and the list goes on. However, existing authentication techniques are heavy and cumbersome tasks, and often impose a cognitive load (e.g., to remember passwords) or lengthy and cumbersome tasks (e.g., fingerprint/retinal scanning). Additionally, almost all existing authentication techniques require intentional movement on the part of the user (entry of a textual or picture password, placing a body part in proximity to a biometric scanner, etc.), which is difficult or impossible for many disabled persons. Still further, many existing authentication techniques are susceptible to being spoofed by humans and/or computers.

This disclosure describes techniques for authenticating a user to access an account, computing device, location, or other resource based on a user's gaze pattern and physiological response(s) to one or more images or other stimuli. Rather than simply using gaze pattern and physiological condition as two separate authentication phases of a multi-factor authentication, the techniques described herein take into account a user's physiological responses to the stimuli. In other words, the user's physiological response is specific to the user's particular gaze pattern while experiencing the stimuli. In some examples, this can be accomplished by taking multiple instantaneous measurements of the user's physiological condition and correlating them with gaze tracking data of the user, to obtain a time series of samples of physiological condition and corresponding gaze location over a time period in which the user viewed an image. Using such techniques, a computing device may authenticate a user to access a resource, if the user's physiological responses to looking at certain gaze locations within one or more images correlate to a machine learning classifier or "model" of the user. The model of the user may be based on the user's gaze pattern and physiological response when looking at the image(s) in the past. Tracking gaze in addition to physiological response ensures that the person attempting to access the resource is looking at the image being presented and not some other picture that evokes the same feeling in an attempt to fraudulently access the resource. Put simply, to be authenticated to access the resource, the user must look at the things in the image(s) and have a same or similar physiological response while doing so as he or she did during a previous viewing of the image(s).

In some examples, a machine learning classifier or model of the user can be established by one causing presentation of an image on a display, and obtaining gaze tracking data and measuring physiological condition of the user while the user is viewing the image. The model may be established based at least in part on the gaze tracking data of the user and the measurement of the physiological condition of the user at one or more times that the user is viewing the image. The gaze of the user can be detected using gaze sensors (or "eye tracking sensors") such as, but not limited to, infrared ("IR") emitters and sensors, visible light sensors, depth sensing cameras, or the like. The gaze tracking data may consist of a time series of gaze locations represented by coordinates (x and y in the case of two-dimensional images; x, y, and z in the case of three-dimensional images). The measurements of physiological condition may also consist of a time series of values or signals representative of the physiological condition (c). Each measurement of gaze location and physiological condition may be time stamped with a time (t). The measurements of physiological condition corresponding matched to each corresponding gaze location based on the time stamps. Thus, in an example in which a single physiological condition of the user is measured while the user is viewing two-dimensional images the model for each image may be represented as a set of discreet point samples $RT=(t1, x1, y1, c1), (t2, x2, y2, c2), \ldots (tn, xn, yn, cn)$. The model may be associated with the resource and stored in memory for use in authenticating the user to access the resource.

In some examples, the measurement of physiological condition may include data identifying brain activity of a user of the computing device. The brain activity of the user can be detected utilizing brain activity sensors such as, but not limited to, electrodes suitable for performing an electroencephalogram ("EEG") on the user of the computing device. The model can also be trained using data representing other neurological or physiological signals of the user of the computing device collected by one or more physiological sensors. For example, and without limitation, the user's heart rate, galvanic skin response, temperature, capillary action, pupil dilation, facial expression, and/or voice signals can also be utilized to train the machine learning model.

When next the user attempts to access the resource, a determination whether to authenticate the user to access the resource can be made based at least in part on the model. Responsive to receiving a request by the user to access the resource, a computing device may cause presentation of an image via an authentication interface. The computing device may obtain login gaze tracking data corresponding to gaze of the user at a time that the user is viewing the image via the authentication interface, and a measurement of a physiological condition of the user at the time that the user is viewing the image via the authentication interface. Based on the login gaze tracking data and the measurement of the physiological condition, the computing device can determine whether to authenticate the user to access the resource. In some examples, the determination of whether to authenticate the user to access the resource may be based at least in part on a comparison of the login gaze tracking data and the measurement of the physiological condition of the user at the time that the user is viewing the image via the authentication interface, with the model representative of gaze of the user and physiological condition of the user at a previous time that the user viewed the image. The comparison can be made based on the machine learning model that is initially trained when the model is established. The login gaze tracking data may be found to correlate to the model if the similarity of the login gaze tracking data and physiological data to the model is above a threshold similarity learned from the data. The threshold of similarity required may depend on the level of security desired, the number of image(s) or stimuli upon which the model is based, the amount of training data for the model, the complexity of the image(s) or other stimuli, the strength or magnitude of the user's physiological response to the image(s) or other stimuli, or other factors. For example, the login data (gaze tracking data and physiological measurement data) may be compared to the model on a point-by-point basis and if a threshold number of points of the login data match (or are within an acceptable margin of error), the login data can be said to correlate to the model and the user can be authenticated. The order or path in which the user viewed the image(s) may or may not be taken into account when determining whether the login data correlate with the model of the user. If the login gaze tracking data and the measurement of the physiological condition of the user at the time that the user is viewing the image via the authentication interface correlate with the model, the user may be authenticated to access the resource.

In some instances, it may not be possible or practical to train a user specific model in advance due to limitations on training data. For instance, time and/or user experience considerations may not allow for a user to be exposed to the number of stimuli (e.g., to view hundreds of pictures) needed to build a robust user-specific model at the time the user first seeks to access the resource. In such instances, a generic (i.e., non-user specific) background model may be established in advance based on offline training data of multiple users experiencing a predefined set of stimuli (e.g., looking at a predefined set of images) and recording their gaze tracking data and physiological data in response to the predefined set of stimuli. In some examples, a temporal Hidden Markov Model (HMM) can be used for this purpose, which encodes both gaze tracking data and physiological data. State emission probabilities can be modeled using, for example, Gaussian mixture models, neural networks, recurrent networks, or other known machine learning models.

In some examples, during the offline training, users may be instructed to look at one or more predefined locations in the images or other stimuli. However, in other examples, the users need not be instructed to look at predefined locations within the images or other stimuli. In the latter case, in which locations within the stimuli are not predefined, both gaze tracking data and physiological data may be obtained and encoded. In the former example, where locations within the stimuli are predefined, the gaze tracking data need not be tracked and encoded during training because the locations within the stimuli are known/specified ahead of time. In that case, a different HMM can be used for each location within each image or other stimulus, for example. The set of HMMs for all locations within an image/stimulus would be the total model for the image/stimulus. In example in which the locations within the images/stimuli are not predefined, a gaze trajectory of the user may be divided into meaningful segments by the training algorithm (for HMM this process is known as a baum-welch training process).

Then, when a specific user attempts to access a resource for the first time, the model training/establishment phase may be fairly brief. For instance, the specific user may be asked to look at one (or more) of the images or other stimuli at training time (once or a few times), and the user model may be derived from the background model (e.g., using adaptive and/or discriminative training). In some specific examples, the model adaptation could be performed using Maximum a posteriori adaptation, ivector adaptation, or the like.

When the user next attempts to access the resource, a new instance of the user data (i.e., login data) can be compared against the background model and/or the user-specific model, or alternatively a new model can be built for comparison to the trained model. The comparison can be done using, for example, a maximum likelihood of the respective models, comparison in model space (e.g., via ivectors), or the like. A determination of whether or not to authenticate the user to access the resource can then be made based on whether or not a result of the comparison exceeds a threshold of similarity.

Alternatively, instead of a machine learning based method a more data driven method like Dynamic Time Warping (DTW) can be used. In that case, a small initial dataset of user-specific data can may be sufficient to against which to authenticate the user at the time of login. When the user subsequently attempts to login, a time series of the login data is compared against the initial dataset using DTW. The DTW process will automatically align the sequences and assign a cost to the alignment process, which can be thresholded using some threshold learned at training time from data. This also helps the system to quickly adapt to the small changes the user's responses may show over time, since the dataset can be updated with each new successful access attempt. The size of the dataset can be kept reasonable if too similar sequences are pruned (and/or not added in the first place).

The user's physiological response to the image may change over time (e.g., due to familiarity, changed perception or opinion, etc.). Thus, the model may be updated after each iteration (e.g., each login attempt) based on the gaze tracking data and the measurement of the physiological condition of the user at the time that the user is viewing the image via the authentication interface. Additionally or alternatively, the machine learning classifier may be adapted over time, with each login attempt providing additional online training of the classifier.

In some examples, one or more filler images may be presented via the authentication interface before, concurrently with, or after causing presentation of the image via the authentication interface. When present, the filler image(s) are not used as a basis for the authentication. Thus, the authenticating is performed without regard to gaze and physiological condition of the user when viewing the filler image via the authentication interface. However, the model may be adapted to incorporate one or more of the filler images for future authentication attempts. For example, if the user manifests a measurable physiological response to a filler image, the computing device may obtain gaze tracking data corresponding to gaze of the user viewing the filler image via the authentication interface and measurement of a physiological condition of the user at the time that the user is viewing the filler image via the authentication interface. The model may then be updated based on the gaze tracking data and the measurement of the physiological condition of the user at the time that the user is viewing the filler image. When next a user attempts to access the resource, the filler image may no longer be "filler" and may instead be a salient image, in response to presentation of which, the user's gaze and physiological condition are monitored.

As discussed above, the model may be established in response to the user viewing one or multiple images and/or in response to other stimuli. Examples of images include photographs or other two- or three-dimensional computer generated images. Examples of other stimuli include, for example, audio (e.g., speech, music, sounds, etc.) and/or video. In some examples, multiple different types of stimuli may be used concurrently (e.g., an image accompanied by an audio track) or sequentially (e.g., a series of sequential images and/or video clips). In some examples, image(s) and/or other stimuli may be recognizable and personal to the user prior to the process of establishing the model. In that case, the user may have deeply trained or conditioned neural or other physiological responses to the image(s) and/or stimuli (e.g., as in the case of an image, photo, video, and/or audio) of a friend or family member of the user). In other examples, the image(s) and/or other stimuli may be new or unfamiliar to the user, but may include subjects or objects with which the user is familiar (e.g., a national monument, past president, etc.). Typically, however, the image(s) and/or other stimuli used to establish the model are ones that produce a measurable neural or other physiological response and are unlikely to change substantially over time (as might be the case with a current celebrity or presidential candidate). While many of the examples throughout this application describe using one or more images as the stimuli, it should be understood that the examples can be modified to use additional or alternative stimuli such as audio and/or video.

The model is based partly on the gaze of the user as the user views the image(s) and/or is presented with the other stimuli. A gaze tracking camera may be used to capture the user's gaze to generate gaze tracking data corresponding to gaze of the user while the user views the image(s) and/or other stimuli. In some examples, the gaze tracking data may include a subconscious or unintentional gaze pattern or gaze path of the user. In that case, an image may be presented for a relatively short period of time so that the user has time to recognize the image, but does not have time to intentionally gaze at certain parts of the image. In some examples, an image may be presented for at least about 300 milliseconds and at most about 1 second. In other examples, the user's gaze may be directed to one or more points in the image or other stimulus (e.g., using an arrow, target, circle, or other visual indicator presented on the image). In that case, the static visual indicators may be sequentially presented to the user on the image indicating the one or more locations that the user is to view, or a dynamic visual indicator may move from one location to the next directing the user's gaze at the image.

The model is additionally based on measurement of one or more physiological conditions(s) in response to the image(s) or other stimuli. As used herein, the term "physiological condition" refers to a chemical, physical, or electrical property of the body of a user which is measurable and is susceptible to change in response to visual and/or audible stimuli. By way of example and not limitation, physiological conditions include neural activity or brain state, tissue transparency, blood oxygen concentration, heart rate, skin conductance, pupil dilation, body temperature, and adrenal response. One or more physiological sensors can be used depending on the physiological condition(s) to be measured. For instance, one or more neural sensors such as electroencephalography (EEG) sensors, magnetoencephalography (MEG) sensors, and/or functional near-infrared spectroscopy (fNIRS) sensor sensors can be used to measure a signal representative of brain state. One or more cardiac sensors may be used to measure conditions of the heart, such as optical heart rate monitoring or photoplethysmography sensors to measure heart rate and/or electrocardiogram (EKG) sensors to measure electrical activity of the heart. One or more skin sensors may be used to measure conditions of the skin, such as a galvanometer to measure skin conductance and/or a thermometer to measure skin temperature. One or more eye sensors may be used to measure conditions of the eye, such as a pupil scanner to measure pupil dilation.

In some examples, the techniques described herein can be performed in whole or in part using a head-mounted computing device (e.g., Occulus Rift® by Occulus VR, Google Glass by Google Inc., or HoloLens by Microsoft Corporation). The head-mounted computing device may include one or more displays to display the image, gaze tracking cameras to track a gaze of the user, and/or physiological sensors to monitor one or more physiological conditions of the user. In some examples, the head-mounted computing device may include one or more onboard processors and memory, while in other examples, the head-mounted computing device may be communicatively coupled (by wire or wirelessly) to one or more remote processing and/or memory resources. When the user desires to use the head-mounted computing device or other resource accessible via the head-mounted computing device, the user may simply gaze at one or more images. As long as the user's gaze and physiological response(s) correlate to the model for the user, the user can be authenticated without intentional actions by the user and without the need for the user to remember a password. In other examples, the gaze-based authentication techniques described herein may be implemented using a personal computer (e.g., laptop or desktop) having a user-facing camera to capture the user's gaze. In other examples, the gaze-based authentication techniques described herein may be implemented using a game console or other computing device in communication with a depth camera as a user input (e.g., Kinect® by Microsoft Corporation, PlayStation® Camera by Sony Corporation). In still other examples, the computing device may comprise a vehicle computing device (e.g., a vehicle onboard computer of an autonomous, manually operated, or semi-autonomous vehicle). In some examples, one or more physiological sensors may be remote from the computing device and may be in wired or wireless communication with the computing device. For instance, the one or more physiological sensors may be located in or on a wearable device (e.g., smart watch or band, a chest strap, eyeglasses, contact lens, or the like), an implantable device (e.g., pacemaker, defibulator, insulin pump, prosthetic implant, or the like), on a control surface or hand hold (e.g., on a steering wheel of a vehicle, in a seat of a vehicle, on a mouse or joystick, a surface of a tablet or phone, or the like). While various specific configurations are described herein, it should be understood that the display(s) to display the image, gaze tracking camera(s) to track a gaze of the user, physiological sensor(s) to monitor one or more physiological conditions of the user, one or more processors, and/or memory may all be included within or coupled to a single device, or may be distributed amongst two or more devices that may be spaced from one another and in communication with one another by wired or wireless communication.

While certain specific examples are described involving various hardware and software configurations, the techniques described herein are not limited to those examples and may be implemented using any computing device or combination of computing devices capable of tracking a gaze and physiological condition of a user while the user looks at an image or perceives other stimuli. Examples of other computing devices that are usable individually or collectively to implement the techniques described herein include, without limitation desktop computers, laptop computers, tablet computers, mobile devices, smartphones, wearable computers, implanted computing devices, telecommunication devices, vehicle computers, network enabled televisions, thin clients, terminals, game consoles, gaming devices, work stations, media players, digital video recorders (DVRs), set-top boxes, cameras, access points to a building or other facility, integrated components for inclusion in a computing device, appliances, or any other sort of computing device including or having access to gaze tracking data and measurement data of one or more physiological conditions.

While the subject matter described herein is primarily presented in the general context of techniques for authentication to a computing resource, the techniques described herein may apply to any type of scenario where authentication is employed, such as access to a physical site (e.g., building, room, locker, etc.), object (e.g., vehicle, appliance, etc.), or resource. Also, while the authentication techniques describe both establishing a model and authenticating a user based on the model, in other examples either the model establishing phase or the authentication phase may be performed using other techniques. For instance, the model may be established using one computing device (e.g., a head-mounted computing device), and the user may be authenticated using another computing device (e.g., a computer, tablet, vehicle computing device, etc.).

The authentication techniques described herein provide a fast and easy way of authenticating a user to access a resource. In some examples, the techniques described herein can be performed without intentional movement on the part of the user to enter a password or position a body part in proximity to a biometric scanner. Because the user need not remember a password, the cognitive burden on the user is low and there is no authentication credential that could be lost or stolen. Additionally, the neurological or other physiological response to certain stimuli are unique and personal to the user, making it difficult for the response to be spoofed or reproduced by other humans and/or computers.

These and various other example features will be apparent from a reading of the following description and a review of the associated drawings. However, the claimed subject matter is not limited to implementations that solve any or all disadvantages or provide any of the benefits noted in any part of this disclosure.

Illustrative Environments

FIG. 1 is a schematic diagram showing an example environment 100 in which the authentication techniques described herein can be implemented. The example environment 100 can include a service provider 102, one or more networks 104, a user 106, and one or more computing devices 108 usable by the user 106 to access a service or resource available from the service provider 102 via the network(s) 104. Example computing device(s) 108 illustrated in this figure include a head-mounted computing device 108(1), a laptop computer 108(2), a tablet computer 108(3), a wearable device 108(4), a vehicle 108(5), and a gaming device 108(N), where N is any number greater than or equal to 1. However, as discussed above, the techniques described herein can also be implemented using any other computing device including or having access to a camera or other sensor capable of tracking gaze of a user and a physiological sensor to measure a physiological condition of the user.

In this example, the user 106 is attempting to access a resource provided by the service provider 102 via the network(s) 104. In some examples, the network(s) 104 can be any type of wired and/or wireless networks known in the art. Moreover, the computing devices 108 can communicatively couple to the network(s) 104 in any manner, such as by a wired or wireless connection (e.g., Ethernet, WiFi, Bluetooth, cellular data connection, etc.). The network(s) 104 can facilitate communication between the service provider 102 and the computing devices 108.

The service provider 102 can include one or more server(s) 110, which can be arranged in a data center or server farm. Additionally or alternatively, the service provider 102 can be implemented in a distributed computing environment, with portions of the service running on one or more other devices (e.g., computing devices 108 or other remotely located devices). The server(s) 110 or other computing devices of the service provider 102 can include one or more processing unit(s)(e.g., processor(s) 112) and computer-readable media 114, such as memory. The computer-readable media 114 includes an authentication module 116 and one or more resources 118. The resource(s) 118 may include applications or services provided by the service provider 102. For instance, in one specific example, the service provider 102 may comprise a financial institution and the resource may comprise an online banking account of the user 106. However, as discussed above, the resource provided by service provider 102 may be any service commonly provided by an online service provider, such as, for example, a shopping service, a gaming service, a mail service, a social networking service, or the like.

When the user 106 attempts to access the resource 118, the user may be presented with an authentication interface 120. In some examples, the service provider 102 may serve the authentication interface 120 for presentation to the user 106 via a display of the computing device 108. In that case, the authentication interface 120 may include one or more images to be presented. Additionally or alternatively, the service provider may transmit audible or visual instructions to the user for how to authenticate him or herself to access the resource. For example, the instructions may inform the user that he or she will be presented with one or more images and that he or she is to view the images normally and to try to ignore distractions in his or her surroundings. As noted above, the authentication interface 120 may include one or more images (e.g., photographs, computer generated images, etc.), videos, audio, or other stimuli presented concurrently or sequentially. Each image or other stimuli may be presented to the user for a limited duration.

The computing device 108 can include one or more processing unit(s)(e.g., processor(s) 122), computer-readable media 124 such as memory, and one or more sensors 126 (e.g., gaze tracking sensors, physiological sensors, etc.). The computer-readable media 124 may include one or more applications 128, such as an operating system, a browser, or the like. The computing device 108 may capture login data (including gaze tracking data 130 and/or physiological data 132) using the sensor(s) 126 or other sensor of the computing device 108 while the user 106 views the image(s) or other stimuli presented via the authentication interface 120. The computing device 108 may transmit the login data (i.e., gaze tracking data 130 and/or physiological data 132) to the service provider 102 via the network 104. The service provider 102 may determine whether or not the login data (i.e., gaze tracking data 130 and physiological data 132) correlates with a model of the user and, if so, may authenticate the user to access the resource 118.

In other examples, instead of being provided by the service provider 102, the resource to be accessed by the user 106 may be the computing device 108 itself or one of the applications 128 stored locally on the computing device 108, or the resource to be accessed may be a physical resource (e.g., a building, room, locker, etc.) to which the user 106 is attempting to gain access. In such cases, the computing device 108 may also include an authentication module 134 stored in the computer-readable media 124 to perform the authentication. While the authentication modules 116 and 134 are shown as separate modules in computer-readable media of their respective devices (server 110 and computing device 108), in other examples, the authentication functionality may be incorporated into the operating system or another application running on the respective devices. The authentication module 116 and/or the authentication module 134 include the instructions and machine learning models to implement the authentication techniques described herein.

Example Authentication Based on Physiological Response to Stimuli

FIGS. 2-5 are schematic diagrams illustrating several example authentication techniques based on physiological response to one or more images or other stimuli.

Figure 2:
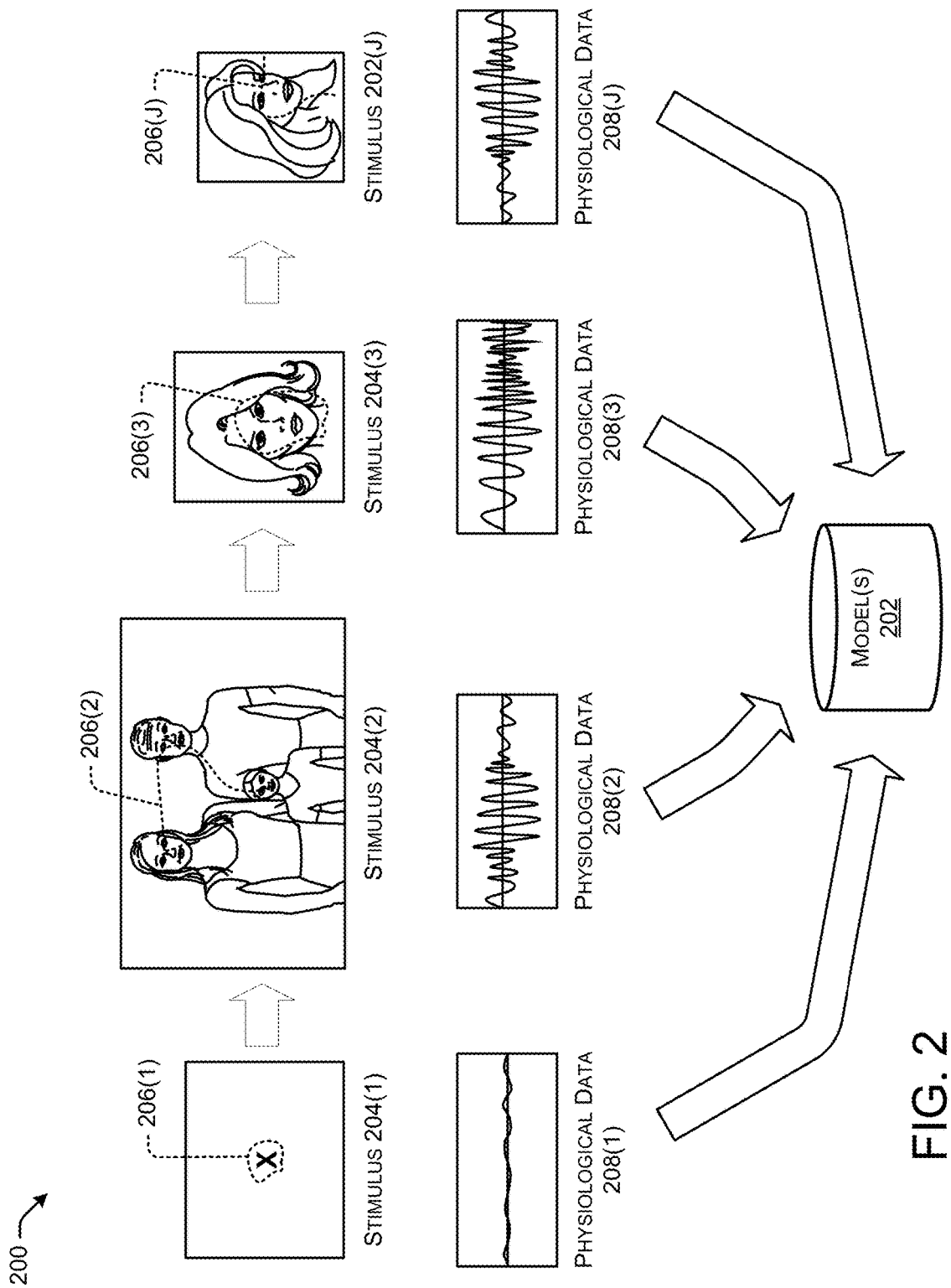
FIG. 2 is a schematic diagram showing an example of establishing a machine learning model for authentication of a user to access a resource.

FIG. 2 illustrates an example process 200 of establishing and training a machine learning model 202 of a user for authentication. When a user attempts to access a resource for a first time, the user may be presented with one or more stimulus 204(1), 204(2), 204(3), . . . 204(J) (collectively "stimuli" 204), where J represents any integer greater than or equal to 1. The stimuli 204 may be presented on a display or other output of a computing device, such as computing device 108. The user's gaze pattern is tracked using one or more gaze tracking cameras or sensors to obtain gaze tracking data 206(1), 206(2), 206(3), . . . 206(J) (collectively "gaze tracking data" 206) while the user experiences the stimuli 204. Additionally, physiological response of the user is measured using one or more physiological sensors to obtain physiological data 208(1), 208(2), 208(3), . . . 208(J) (collectively "physiological data" 208) indicative of one or more physiological conditions of the user while the user experiences the stimuli 204. The gaze tracking cameras/sensors and the physiological sensors may be part of the computing device (e.g., sensors 126 of computing device 108), or may be separate from and communicatively coupled to the computing device by wired and/or wireless connections.

In the illustrated example, stimulus 204(1) is a null stimulus designed not to invoke a physiological response from the user in order to obtain a baseline or ambient measurement of the physiological condition. In some examples, the stimulus 204(1) may comprise a blank screen, a screen having a cool or soothing color, text (e.g., a letter, number, word, or symbol), a visual target for the user to focus his or her gaze on, or the like. In other examples, stimulus 204(1) may include an instruction (audio or textual) for the user to close his or her eyes for a period of time (e.g., 1-5 seconds) during which time the baseline or ambient measurement of the physiological condition can be made. Depending on the physiological condition(s) being measured, the measurement of the user's physiological condition(s) in response to the null stimulus 204(1) may provide a unique signature of the user. For instance, when multiple neurological or other physiological conditions are measured, the combination of physiological conditions may provide a unique physiological signature of the user. In other instances, the measurement of the user's physiological condition in response to the null stimulus 204(1) may not be unique to the user. The measurement of the user's physiological condition in response to the null stimulus 204(1) may or may not be used to train the model.

Stimulus 204(2), stimulus 204(3), and stimulus 204(J), in this example, correspond to photographs or other images. The images may be selected by the user, a service provider (e.g., authentication module 116 of service provider 102), or computing device (e.g., authentication module 134 of computing device 108). In some examples, the user may upload the images from a local computing device (e.g., computing device 108) or designate the images from a repository of scenes available to the computing device (e.g., an online photo library, social networking site, etc.) to use for the authentication. In some examples, a computing device associated with the resource to be accessed may select the images to be used for the authentication, or may present the user with multiple images from which the user can select one or more images to be used for the authentication. In this example, the images comprise static photographs or other two-dimensional images. Each image may be presented to the user for a brief period of time, long enough for the user to perceive and recognize the image or the subjects in the image, but not long enough for the user to intentionally gaze at objects in the image. In some examples, each image may be displayed to the user for at least about 300 milliseconds and at most about 1 second. However, in other examples, one or more of the images may be displayed for less than 300 milliseconds or greater than 1 second. In other examples, as discussed below, the stimuli 204 can be dynamic (i.e., one or more objects or portions of the stimuli may be changing or animated as in the case of video) and/or can include audio, text, or other stimuli. In some examples, the user's gaze may be directed to one or more points in the image or other stimulus (e.g., using an arrow, target, circle, or other visual indicator presented on the image). In that case, the static visual indicators may be sequentially presented to the user on the image indicating the one or more locations that the user is to view, or a dynamic visual indicator may move from one location to the next directing the user's gaze at the image.

As the stimuli 204 are presented (i.e., displayed, audibly emitted, etc.), the user's gaze and one or more physiological conditions are tracked. As described in more detail with respect to FIG. 4, for each stimulus 204(1), 204(2), etc., the gaze tracking data 206 may comprise a time series of sampled gaze locations or coordinates at which the user looked while the respective stimulus was presented. Each sample may be represented by the coordinate locations (e.g., x and y coordinates in the case of two-dimensional images, or x, y, and z coordinate sin the case of three-dimensional images) and a time stamp. Alternatively, the gaze tracking data 206 may comprise a function representing the user's continuous gaze path over a period of time during which the user perceived the stimulus. The physiological data 208 are measured for each stimulus 204(1), 204(2), etc., while the respective stimulus is presented. The physiological data 208 may comprise a time series of sampled measurements of the physiological condition(s) while the respective stimulus was presented, and can be represented by a signal value and a corresponding time stamp at which the signal value was measured. In some examples, the physiological data 208 can comprise a function representing the user's continuous physiological condition over the period of time during which the user perceived the stimulus.

The gaze tracking data 206 and corresponding physiological data 208 can be aligned or matched up based on the respective time stamps. In some instances, the user's physiological response may be substantially instantaneous, such that a measurement of the user's physiological condition at a given time corresponds to the user's gaze location at the given time. However, in other examples, the user's physiological response may be delayed somewhat relative to the user's gaze. This may be due to a time required for the user to perceive and recognize an image or other stimulus (referred to herein as "perception delay") and/or due to time required for the user's body to respond to the stimulus and/or return to an ambient state after a stimulus is removed (referred to herein as "reaction delay"). In the case of perception delay and/or reaction delay, the physiological data 208 may be aligned with the gaze tracking data 206 that actually caused the physiological response using a time offset (e.g., time stamp of gaze tracking data+time offset=time stamp of corresponding physiological data). The time offset used will depend on the perception delay and/or reaction delay, which may be known or can be measured empirically during the training of the model for each user. In some examples, time offsets may be computed and accounted for algorithmically. In other examples, the machine learning techniques may automatically recognize signal delays and account for them.

In many cases, alignment of various physiological sensor data may be known and consistent. Additionally, sampling rates of the various sensors and systems involved may be known or easily measured. In that case, the sensor data can be aligned to compensate for the delays first, and then the sensor data can be aligned with respect to time by interpolating between samples. If the time delays are not known but are not wildly different, an explicit alignment operation may not be needed, since the machine learning model will learn how the signals correlate with each other. For example, for a neural network emission probability model, the input to the model may include a context of frames (not just one) which could span a period before, during, and/or after the user views an image or otherwise experiences a stimulus. If all the delays are within that range, then there is no need to do further compensation as the model will learn it at training time. All that is needed in that case is to resample the measured signals so that they share the same reference sampling rate.

The stimuli 204, gaze tracking data 206, and physiological data 208 can be used to train the model 202 for each user. The model(s) 202 can be stored in memory (e.g., computer readable media 114 of service 102, computer readable media 124 of computing device 108, or other memory accessible to the service 102 and/or computing device 108) and associated with a resource. The model 202 can then be used as a basis to authenticate the user to access the resource in the future. The model 202 can be adapted or updated after each authentication, using the gaze and physiological condition of the user during the login as additional training data with which to train the model. This adaptation accounts for gradual changes in the user's physiological responses to certain stimuli due to, for example, changing perceptions emotions associated with the stimuli.

Figure 3:
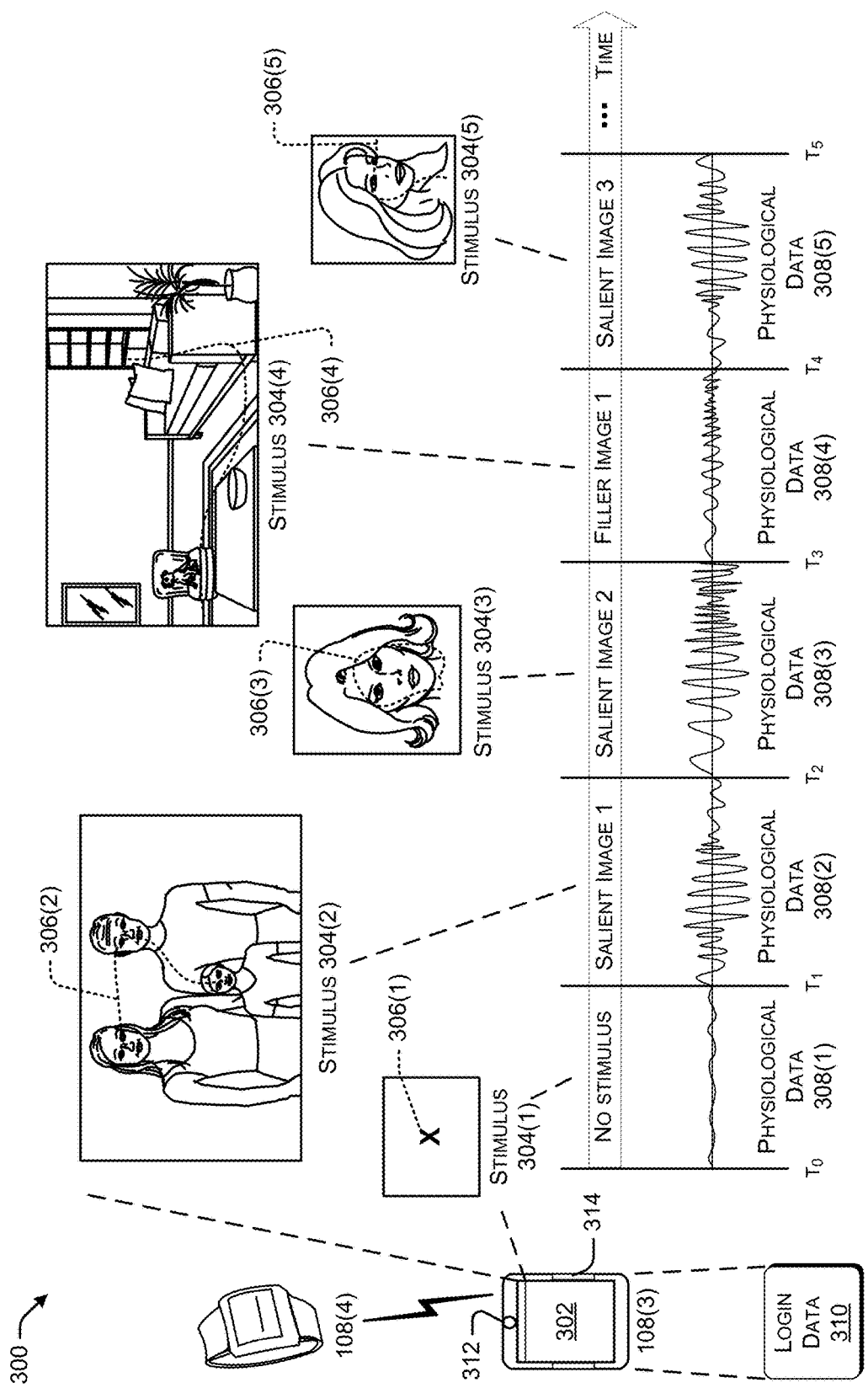
FIG. 3 illustrates an example process of authenticating a user to access a resource based on gaze and physiological response to sequentially presented stimuli.

FIG. 3 illustrates an example authentication process 300 of authenticating a user to access a resource based on physiological response to multiple stimuli over time (from time $T_0$ to time $T_5$). This example is described in the context of tablet computing device 108(3) of FIG. 1, but is applicable to other computing devices as well. In this example, the computing device 108(3) receives a request from the user to access the resource. The request may be received as a touch input, gesture, voice input, or any other form of user input. Responsive to receiving the request to access the resource, the computing device 108(3) causes presentation of an authentication interface 302 including one or more stimulus 304(1)-304(5)(collectively "stimuli 304") via the authentication interface 302. In this example, the stimuli 304 are shown as being presented sequentially over time. However, in other examples, multiple stimuli may be presented concurrently. Also, while five stimuli 304 are shown in this example, in other examples, greater or lesser numbers of stimuli may be used. The number of stimuli used for during authentication may or may not be the same as the number of stimuli upon which the model 202 has been trained. While not shown in this figure, in addition to the stimuli 304, the authentication interface 302 may include one or more controls, windows, borders, instructions, or other visual and/or audio elements that are presented to the user.

At least some of the stimuli 304 presented via the authentication interface 302 are stimuli 204 based upon which the machine learning model 202 for the user was trained. Images or stimuli upon which the machine learning model 202 are based are referred to herein as being "salient" images or stimuli. In some examples, the stimuli 304 presented via the authentication interface 302 may include additional images or other stimuli that were not used to train the model 202. Such additional images or other stimuli are referred to herein as "non-salient" or "filler" images or stimuli. The filler images or other stimuli may be interspersed with salient images or stimuli during the authentication process. In that case, the user's responses to the filler images or stimuli may be ignored or otherwise excluded in determining whether to authenticate the user to access the resource. In the illustrated example, stimulus 304(2), stimulus 304(3), and stimulus 304(5) are examples of salient images which correspond to stimuli 204 upon which the machine learning model 202 of the user was trained. Stimulus 304(4) corresponds to a filler image upon which the machine learning model 202 of the user has not been trained.

In some examples, the salient images or other stimuli presented via the authentication interface 302 may be presented in a same or different order than they were presented during training of the model 202 and/or during a last login attempt. Additionally or alternatively, they may be presented for the same or different durations than they were presented during training of the model 202 and/or during a last login attempt. In the case where the salient images or other stimuli are presented for different durations than during the training or last login attempt, they may still be presented for a limited amount of time (e.g., at least about 300 milliseconds and at most about 1 second). This may help to ensure that the user's response to images or other stimuli is genuine, subconscious, or unintentional. However, in other examples, the user's gaze may be directed to one or more points in the image or other stimulus (e.g., using an arrow, target, circle, or other visual indicator presented on the image), in which case the images or other stimuli may be presented for longer than 1 second. Additionally, in some examples, salient images or other stimuli may be presented in a slightly modified manner relative to during the training of the model 202 and/or during a last login attempt. For instance, one or more of the images may be presented in a different location on a display screen, at a different location within the authentication interface, and/or a portion of the image or other stimulus may be cropped to show less than all of the image that was previously presented. Any or all of the foregoing techniques may help to further increase security of the authentication by preventing a malicious user from learning an order of the stimuli and attempting to mimic the physiological responses to the stimuli.

The computing device 108(3) obtains login gaze tracking data 306(1)-306(5)(collectively "gaze tracking data 306") corresponding to gaze of the user, and physiological data 308(1)-308(5)(collectively "physiological data 308") including measurements of a physiological condition of the user at times that the user is viewing each image via the authentication interface 302. The gaze tracking data 306 and physiological data 308 comprise at least part of login data 310 collected during the authentication process 300. The gaze tracking data 306 and physiological data 308 may be obtained from one or more sensors of computing device 108(3) and/or on or more sensors in communication with computing device 108(3). In one example, the gaze tracking data 306 may be obtained from a user-facing camera 312 of the computing device 108(3) and the physiological data may be obtained from a touch surface 314 of the computing device 108(3) and/or a wearable device 108(4) in wireless communication with the computing device 108(3). For instance, the touch surface 314 of the computing device 108(3) may comprise a skin galvanometer usable to measure conductivity of the user's skin and the wearable device 108(4) may include a heart rate sensor usable to measure a heart rate of the user. However, the physiological data may be obtained from other sensors and may include measurements of other physiological conditions (e.g., neural sensors to measure brain state), as described in other examples.

All or part of the login data 310 may then be compared to the machine learning model 202 of the user. Portions of the login data 310 including gaze tracking data and/or physiological data of the user in response to filler stimuli may be excluded from the comparison. The comparison may be performed locally by authentication module 134 of computing device 108(3), remotely by authentication module 116 of the service provider 102, by a combination of both, or by other means. The comparison may be used by the computing device 108(3) and/or service provider 102 to determine whether the login data 310 correlates with the model 202 of the user. If so, the user may be authenticated to access the resource.

In some examples, the login data 310 may also be used to adapt or update the machine learning model 202 after each successful login attempt. For example, the gaze tracking data and physiological data of the user at the times that the user is viewing salient stimuli via the authentication interface 302 may be used as additional training data to train the model 202 of the user. Thus, in the illustrated example, gaze tracking data 306(2), 306(3), and 306(5), and physiological data 308(2), 308(3), and 308(5) corresponding to the user's response to salient stimulus 304(2), stimulus 304(3), and stimulus 304(5) may be used to adapt the machine learning model 202. Additionally or alternatively, in some examples, the gaze tracking data 306(4) and physiological data 308(4) of the user at the times that the user is viewing the filler stimuli via the authentication interface 302 may be used as additional training data to train the model 202 of the user. Thus, in the illustrated example, gaze tracking data 306(4) and physiological data 308(4) corresponding to the user's response to filler image 304(4) may be used to adapt the machine learning model 202. Once the model 202 has been trained using the filler stimuli, the filler stimuli cease to be filler stimuli and become salient stimuli.

In some examples, in addition to or instead of the salient stimuli, the authentication may take into account ambient or background measurements of physiological condition when the user is not presented with stimuli and/or is presented with a control or null stimulus. In the illustrated example, after receiving the request to access the resource and prior to causing presentation stimulus 304(2) on the display via the authentication interface, the computing device 108(3) obtains physiological data 208(1) of an ambient measurement of the physiological condition in response to stimulus 304(1) which is designed not to invoke a physiological response from the user. In the illustrated example, the stimulus 304(1) comprises a visual target for the user to focus his or her gaze on. However, in other examples, other types of null stimulus may be used. In examples taking into account the ambient measurement of the physiological condition, the ambient measurement of physiological condition taken during the login attempt can be compared to the ambient measurement of physiological condition taken during training of the model 202 (during establishment of the model and/or during one or more previous login attempts). The determination of whether the login data correlates to the model 202 may be based at least in part on the comparison of the ambient measurement of physiological condition during login to that during training of the model.

Figure 4:
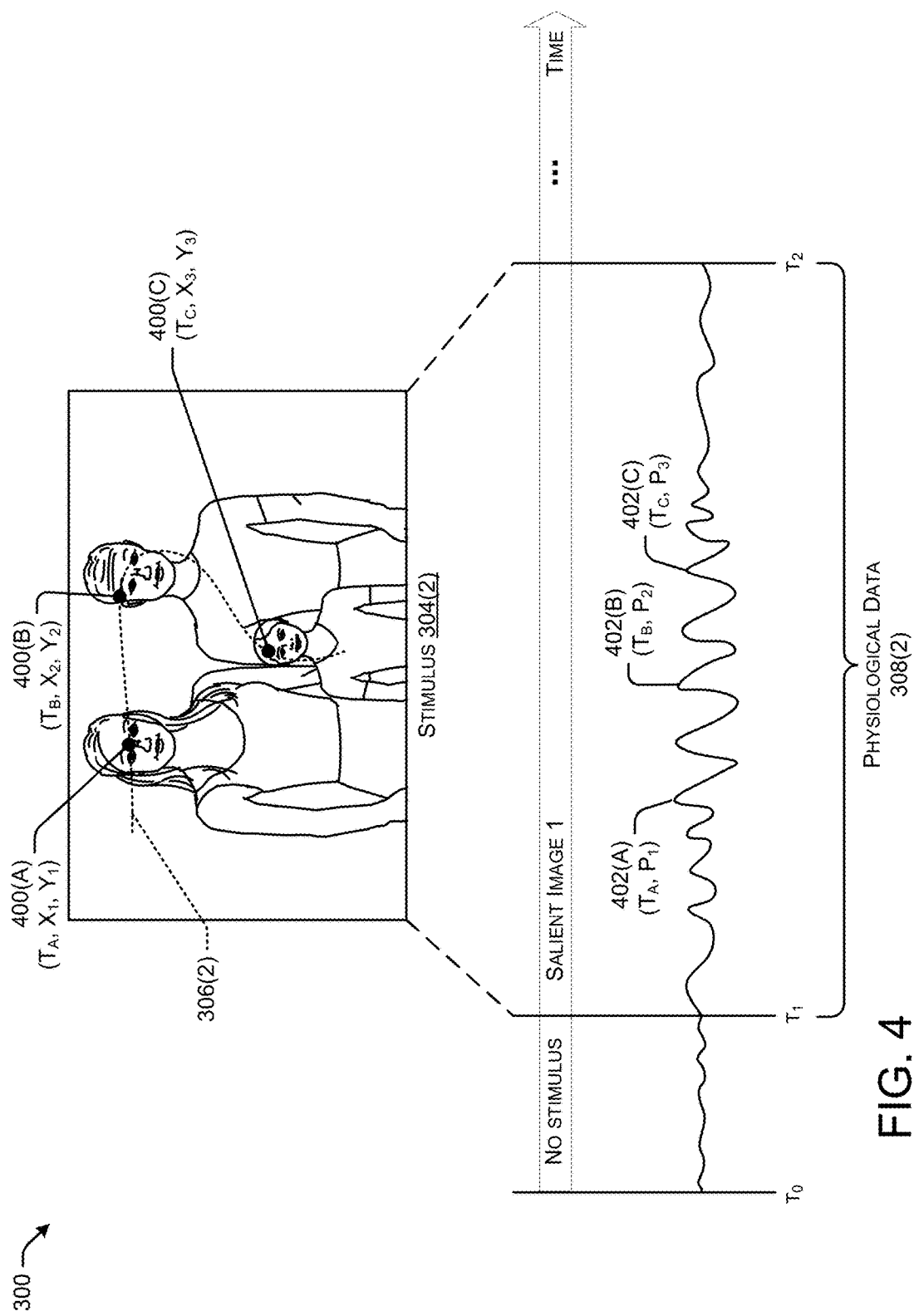
FIG. 4 illustrates an example process of correlating gaze tracking data to physiological data of a user obtained in response to stimuli.

FIG. 4 illustrates an example technique for correlating gaze tracking data with physiological data over time. FIG. 4 illustrates a portion of the authentication process 300 of FIG. 3 in more detail. In particular, FIG. 4 shows a portion of the authentication process 300 from $T_1$ to $T_2$ in which the gaze tracking data 306(2) and physiological data 308(2) of the user are captured while the user is viewing salient stimulus 304(2). The user's gaze in this example traveled in a generally S-shaped path from top left to the bottom center of the stimulus 304(2) through the faces of three individuals depicted in the stimulus 304(2). The gaze path of the user occurred during a time period from $T_1$ to $T_2$ in which the stimulus 304(2) was displayed. The gaze tracking data 306(2) corresponding to the stimulus 304(2) includes multiple discrete samples, including at least sample 400(A), sample 400(B), and sample 400(C). Each sample includes a time stamp at which the sample was taken and a coordinate location of the user's gaze at the time the sample was taken. Thus, each sample can be represented in the form (T, X, Y). In the illustrated example, sample 400(A) was taken at time $T_A$ when the user was gazing at coordinate location $X_1, Y_1$. Sample 400(B) was taken at time $T_B$ when the user was gazing at coordinate location $X_2, Y_2$. And, sample 400(C) was taken at time $T_C$ when the user was gazing at coordinate location $X_3, Y_3$. In this example, times $T_A$, $T_B$, and $T_C$ represent any times between $T_1$ and $T_2$ and do not imply that samples 400(A), 400(B), and 400(C) are sequential samples or that there is a uniform time elapsed between samples 400(A), 400(B), and 400(C). Thus, sample 400(A) can be represented as $(T_A, X_1, Y_1)$, sample 400(B) can be represented as $(T_B, X_2, Y_2)$, and sample 400(C) can be represented as $(T_C, X_3, Y_3)$.

The physiological data 308(2) corresponding to the stimulus 304(2) also includes multiple discrete samples, including at least sample 402(A), sample 402(B), and sample 402(C). Each sample includes a time stamp at which the sample was taken and a signal from a physiological sensor representing a measurement of physiological condition at the time the sample was taken. Thus, each sample can be represented in the form (T, P). In the illustrated example, sample 402(A) was taken at time $T_A$ when the measurement of physiological condition was $P_1$. Sample 402(B) was taken at time $T_B$ when the measurement of physiological condition was $P_2$. And, sample 402(C) was taken at time $T_C$ when the measurement of physiological condition was $P_3$. As noted above, times $T_A$, $T_B$, and $T_C$ represent any times between $T_1$ and $T_2$ and thus do not imply that samples 402(A), 402(B), and 402(C) are sequential samples or that there is a uniform time elapsed between samples 402(A), 402(B), and 402(C). Thus, sample 402(A) can be represented as $(T_A, P_1)$, sample 402(B) can be represented as $(T_B, P_2)$, and sample 402(C) can be represented as $(T_C, P_3)$.

Individual samples of the gaze tracking data 306(2) can be correlated to individual samples of the physiological data 308(2) based on the time stamps, with or without time offsets for perception delay and/or reaction delay. Assuming no time offset, in the illustrated example, gaze tracking sample 400(A) can be correlated to physiological data sample 402(A), gaze tracking sample 400(B) can be correlated to physiological data sample 402(B), and gaze tracking sample 400(C) can be correlated to physiological data sample 402(C). Alternatively, in examples in which the physiological response to stimulus is delayed due to perception delay and/or reaction delay, the gaze tracking samples may be correlated by applying a relative time offset. For instance, gaze tracking sample 400(A) taken at time $T_A$ can be correlated to a physiological data taken at a time $T_A$+offset, gaze tracking sample 400(B) taken at time $T_B$ can be correlated to a physiological data taken at a time $T_B$+offset, and so forth. While three samples are shown for the time period T1 to T2, in other examples, any number of more or less samples may be taken while an image is presented. The sample rate for gaze tracking data and physiological data may be chosen based upon a desired sampling resolution, desired model resolution, limitations of the gaze tracking cameras and/or sensors or physiological sensors, or other factors.

Figure 5:
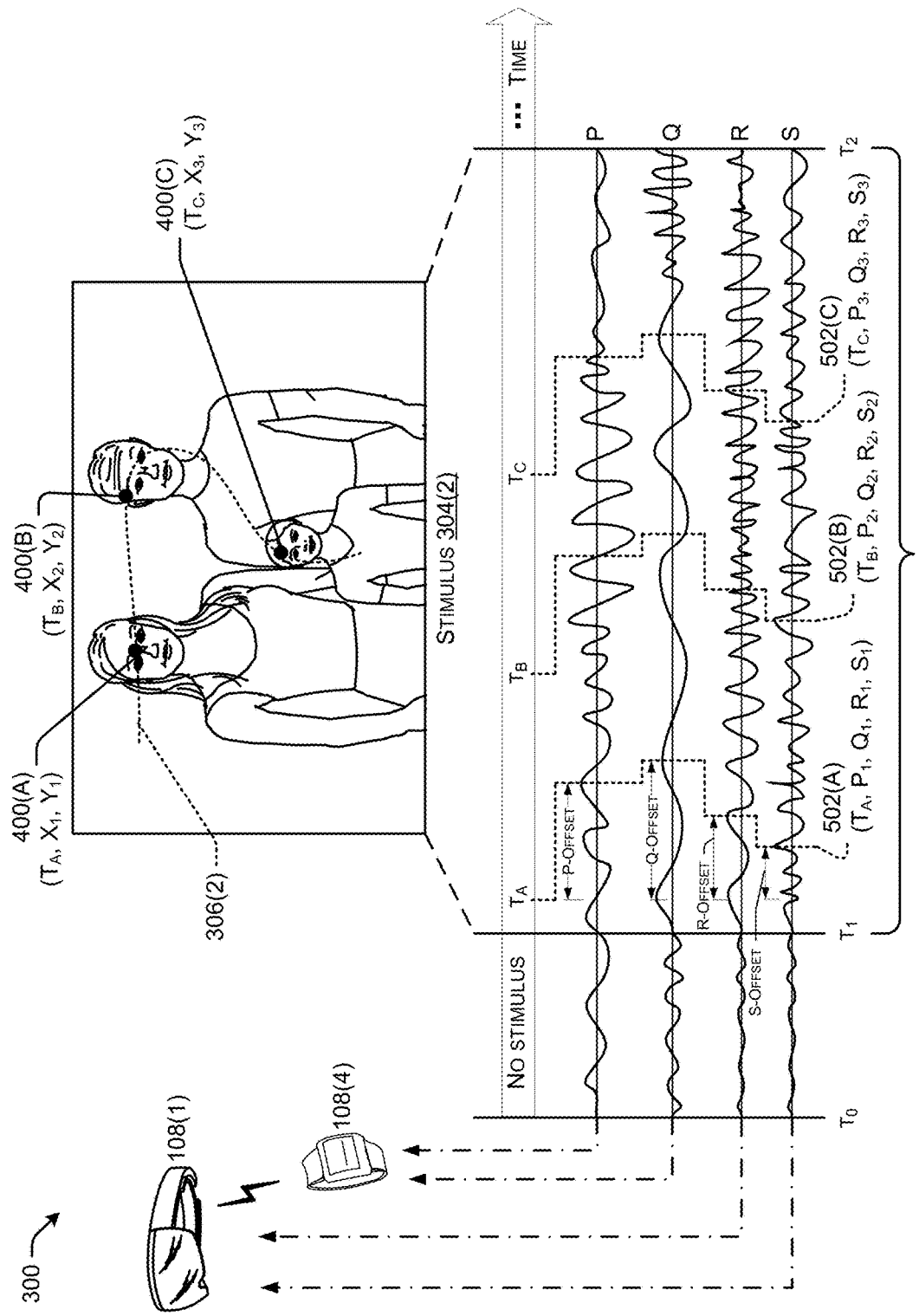
FIG. 5 illustrates an example in which physiological data is measured regarding multiple physiological conditions of the user in response to stimuli.

FIG. 5 illustrates another example technique for correlating gaze tracking data with physiological data over time, in which the physiological data includes measurements of multiple different physiological conditions. FIG. 5 illustrates a portion of the authentication process 300 from $T_1$ to $T_2$ in which the gaze tracking data 306(2) and physiological data 500 of the user are captured while the user is viewing salient stimulus 304(2). As in the example of FIG. 4, the user's gaze in this example traveled in a generally S-shaped path and includes sample 400(A) represented as $(T_A, X_1, Y_1)$, sample 400(B) represented as $(T_B, X_2, Y_2)$, and sample 400(C) represented as $(T_C, X_3, Y_3)$.

The physiological data 500 corresponding to the stimulus 304(2) also includes multiple discrete samples, including at least sample 502(A), sample 502(B), and sample 502(C). Each sample includes a time stamp at which the sample was taken. However, in this example, each sample includes signals from multiple physiological sensors representing measurements of multiple physiological conditions at the time the sample was taken. The illustrated example includes measurements of four signals, namely signal P, signal Q, signal R, and signal S. Signals P, Q, R, and S may represent outputs of four physiological sensors. The physiological sensors may be disposed on the same or different devices and/or may measure the same or different physiological conditions. In one example, signals P and Q represent signals from heart rate monitor and a skin galvanometer, respectively, of wearable device 108(4), while signals R and S represent signals from EEG and fNIRS sensors, respectively, of head-mounted computing device 108(1). The signals P and Q from the wearable device 108(4) may be relayed to the head-mounted computing device 108(1) or other computing device for aggregation. However, in other examples, the signals P, R, R, and S may be captured by any number of one or more sensors and/or computing devices.

Each sample can be represented in the form (T, P, Q, R, S). In the illustrated example, sample 502(A) was taken at time $T_A$ when the measurements of physiological conditions were $P_1, Q_1, R_1$, and $S_1$, respectively. Sample 502(B) was taken at time $T_B$ when the measurements of physiological conditions were $P_2, Q_2, R_2$, and $S_2$, respectively. And, sample 502(C) was taken at time $T_C$ when the measurements of physiological conditions were $P_3, Q_3, R_3$, and $S_3$, respectively. As in the previous examples, times $T_A$, $T_B$, and $T_C$ represent any times between $T_1$ and $T_2$ and thus do not imply that samples 502(A), 502(B), and 502(C) are sequential samples or that there is a uniform time elapsed between samples 502(A), 502(B), and 502(C). Thus, sample 502(A) can be represented as $(T_A, P_1, Q_1, R_1, S_1)$, sample 502(B) can be represented as $(T_B, P_2, Q_2, R_2, S_2)$, and sample 502(C) can be represented as $(T_C, P_3, Q_3, R_3, S_3)$.

As shown in FIG. 5, each of the signals P, Q, R, and S each has a different time offset. That is, each signal represents a measurement of a physiological condition that is delayed relative to the stimulus that caused the physiological reaction. The delay of each signal may be attributed to a perception delay (i.e., a delay in the user perceiving the portion of the stimulus) and/or a reaction delay (i.e., a delay of the body's physiological reaction to the stimulus. The time offset may also be at least partially attributable to a sensitivity of the sensor used to measure the signal, a sampling rate, and other factors. The time offsets for signals P, Q, R, and S are shown relative to the time $T_A$. The physiological data 500 can be correlated to the gaze tracking data 306(2) based on the time stamps and respective time offsets for each signal. The time offset for measurement of a given physiological condition using a given physiological sensor can be determined experimentally during an offline training for a generic pool of users. Thereafter, during use, the offsets may be further customized for each user using online training over time to determine offset for a given physiological condition using a given physiological sensor experienced for each specific user.

Figure 6:
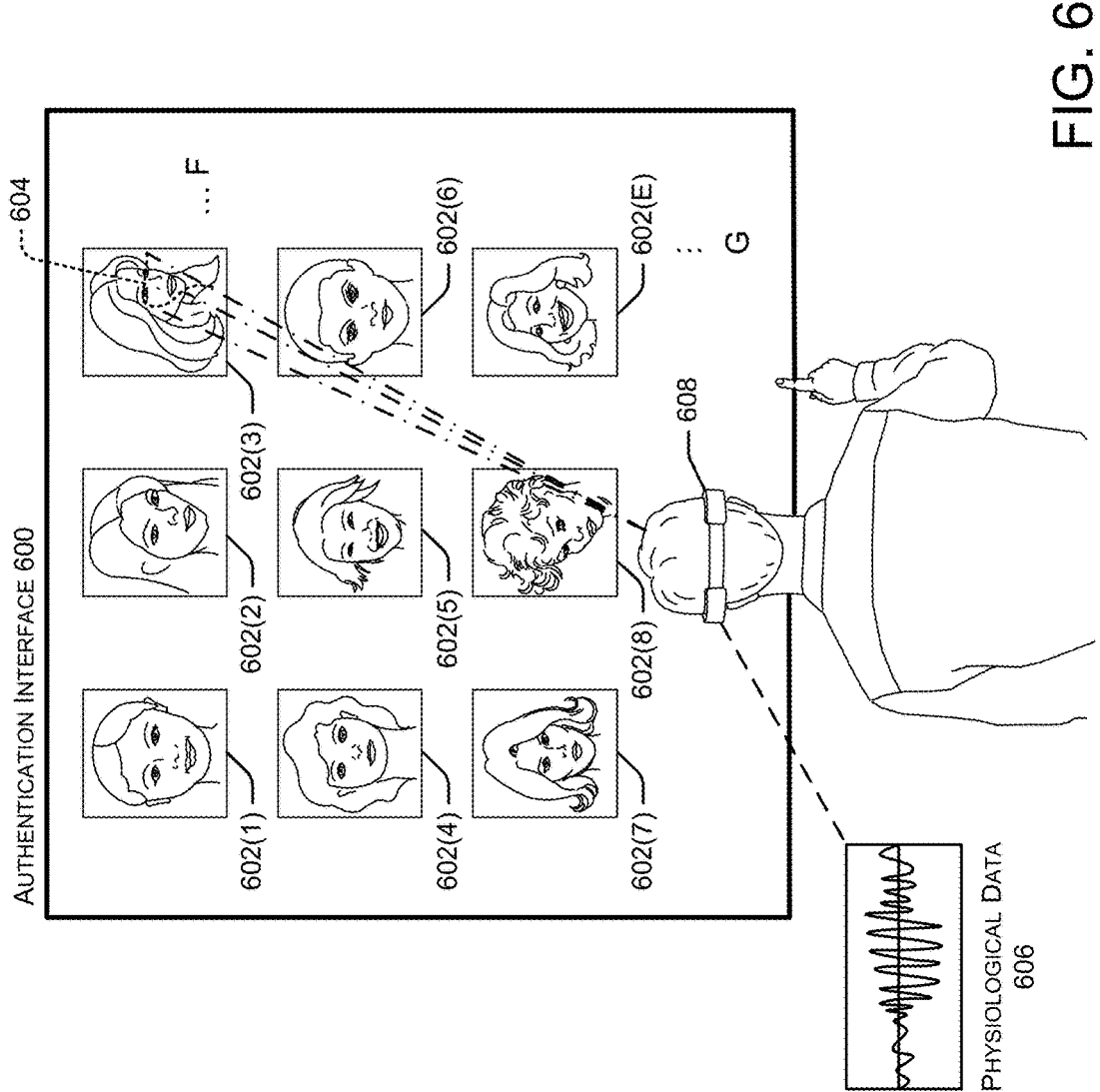
FIG. 6 illustrates another example process of authenticating a user to access a resource based on gaze and physiological response to concurrently presented stimuli.

FIG. 6 illustrates an example technique for authenticating a user to access a resource based on gaze and physiological response to multiple concurrent stimuli. In this example, an authentication interface 600 includes multiple images 602 (1)-602(E)(collectively "images 602") presented simultaneously in a grid of tiled images. The grid may include any number of F columns and G rows, where each of F and G can be any integer greater than or equal to 2 and may or may not be equal to one another. In other examples, the multiple images may be arranged in other configurations (e.g., in a circle, a carousel, a cloud, one or more clusters, a single line, a single row, etc.). At least one image 602(3) of the multiple images 602 includes a salient image upon which a machine learning model for the user was trained. In some examples, the authentication interface 600 includes only one salient image and the remaining images are filler images upon which the model of the user has not been trained. Alternatively, the authentication interface 600 may include multiple salient images. In examples in which the authentication interface 600 includes multiple salient images, the model for the user may also have been trained by presenting the multiple salient images concurrently, or the model may have been trained by presenting the multiple salient images sequentially, similar to the example of FIG. 2.

During authentication, the authentication interface 600 may be presented for a first period of time while tracking gaze of the user to determine when the user's gaze settles on a salient image of the multiple images, such as salient image 602(3). Once the user's gaze settles on the salient image, a timer may be started such that the multiple images 602 are only presented for a limited period of time (e.g., at least 300 milliseconds to at most 1 second) after the user's gaze settles on the salient image. The user's gaze may also be tracked during this limited time period to obtain gaze tracking data 604 while the user is viewing the salient image. One or more physiological conditions of the user may also be tracked during this limited time period to obtain physiological data 606 of the user while the user is viewing the salient image. The gaze tracking data 604 and physiological data 606 may be obtained and correlated according to any of the techniques described herein.

In this example, the gaze tracking data 604 is obtained from a gaze tracking camera of a head-mounted computing device 608, and the physiological data 606 is obtained from a neurological sensor (e.g., EEG sensor, MEG sensor, fNIRS sensor, etc.) of the head-mounted computing device 608. However, in other examples, the gaze tracking data 604 and physiological data 606 may be obtained from other sensors and/or computing devices as described herein.

Figure 7:
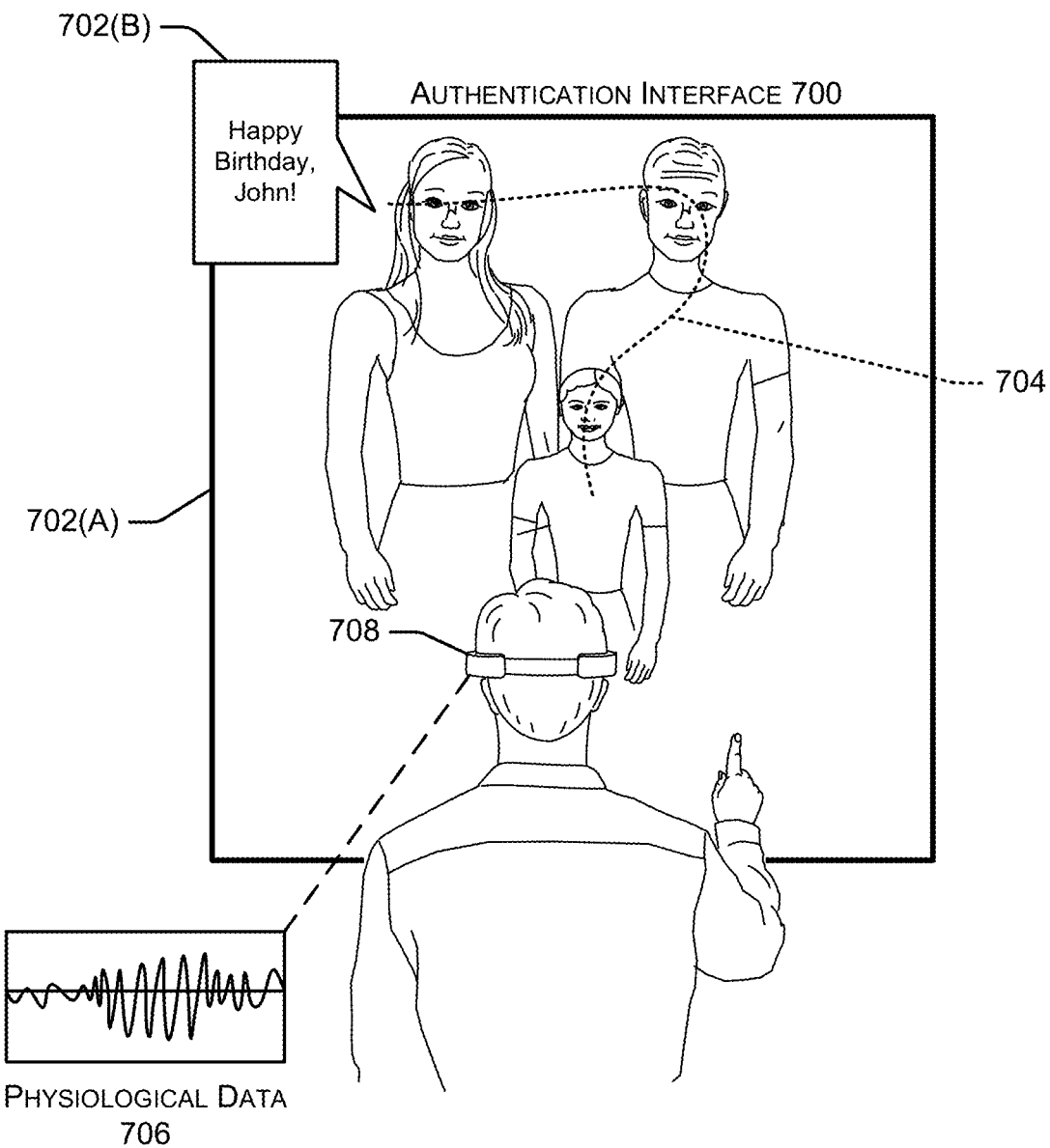
FIG. 7 illustrates another example process of authenticating a user to access a resource based on gaze and physiological response to multiple different types of stimuli.

FIG. 7 illustrates another example technique for authenticating a user to access a resource based on gaze and physiological response to multiple concurrent stimuli. In this example, an authentication interface 700 includes a visual stimulus 702(A) such as an image or video. Concurrently with presentation of the visual stimulus 702(A), the authentication interface outputs an audio stimulus 702(B). In this example, the audio stimulus corresponds to a person depicted in the visual stimulus 702(A) speaking a message to the user. The visual stimulus 702(A) and the audio stimulus 702B) are collectively referred to herein as "stimuli 702." Certain audio stimuli can be particularly personal to a user and can invoke a strong physiological response from the user. Examples of such audio stimuli include the user's name, the voice of a friend or loved one, or the like. In the illustrated example, the audio stimulus 702(B) may correspond to the user's mother's voice speaking the user's name. Such an audio stimulus, particularly when combined with a complimentary visual stimulus such as a picture or video of the speaker can elicit a physiological response that is very unique to the user. However, in other examples, other audible and/or visual stimuli that may elicit weaker physiological responses can also be used. While the visual stimulus 702(A) and audio stimulus 702(B) are presented concurrently in this example, in other examples, one or more visual stimuli may be presented sequentially with one or more audible stimuli.

During authentication, the user's gaze may be tracked to obtain gaze tracking data 704 and one or more physiological conditions of the user may be measured to obtain physiological data 706 of the user while the stimuli 702 are presented. The gaze tracking data 704 and physiological data 706 may be obtained and correlated according to any of the techniques described herein.

In this example, the gaze tracking data 704 is obtained from a gaze tracking camera of a head-mounted computing device 708, and the physiological data 706 is obtained from a neurological sensor (e.g., EEG sensor, MEG sensor, fNIRS sensor, etc.) of the head-mounted computing device 708. However, in other examples, the gaze tracking data 704 and physiological data 706 may be obtained from other sensors and/or computing devices as described herein.

In the example techniques described herein, a number of stimuli presented (sequentially and/or concurrently) by the authentication interface may be based at least in part on a strength of physiological response a user has to the respective stimuli. For instance, the number of stimuli needed to accurately authenticate the user may be inversely proportional to the strength of physiological response to the respective stimuli. That is, the stronger the physiological response, the fewer stimuli needed to authenticate the user. Further, a robustness and accuracy of the authentication techniques described herein may be based at least in part on the strength of physiological response a user has to the respective stimuli. For instance, the strength of security of the authentication techniques described herein may be proportional to the strength of physiological response to the respective stimuli. That is, the stronger the physiological response, the harder it will be for an imposter to replicate the physiological response.

As discussed above, in some examples, machine learning model for a user may be adapted over time to account for changing responses to stimuli. Thus, if a user's response to a particular image or other stimulus weakens over time, the authentication module may cause the machine learning model for the user to be trained based on one or more additional images or other stimuli. The additional images or other stimuli may initially be introduced as filler images during a login attempt and then subsequently converted into salient images upon which the model is trained following a successful authentication based on the login attempt. In this way, the authentication techniques may be continuously adapted to maintain their robustness.

As discussed above, the physiological sensors usable in the various examples described herein can include one or more neurological sensors to measure brain state. For instance, the physiological sensors can include EEG sensors, MEG sensors, and/or fNIRS sensors. In examples including neural sensors, the signal bandwidths are separated into multiple bands, including the Alpha and Beta bands. The Alpha band is located between 8 and 15 Hz. Activity within this band can be indicative of a relaxed or reflective user. The Beta band is located between 16 and 21 Hz. Activity within this band can be indicative of a user that is actively thinking, focused, or highly concentrating. The neural sensors can detect activity in these bands, and potentially others, and generate physiological data representing the activity.

It is to be appreciated that while frequency domain analysis is traditionally used for neural analysis in a clinical setting, it is a transform from the raw time series analog data available at each neurological sensor. A given neurological sensor has some voltage that changes over time, and the changes can be evaluated in some configurations with a frequency domain transform, such as the Fourier transform, to obtain a set of frequencies and their relative amplitudes. Within the frequency domain analysis, the Alpha and Beta bands described above are useful approximations for a large range of biological activities.

In some examples, the signals from the neurological sensors can be preprocessed using transformations such as a short term Fourier transform, wavelets, dictionary based transforms such as matching pursuit, or the like. However, such preprocessing is optional and may be omitted in a machine learning context such as that described herein. For instance, in some examples, a machine learning model such as that disclosed herein can be trained to identify patterns in neural data with higher accuracy from the raw electrode voltages than from a transform. It is to be appreciated, therefore, that the various configurations disclosed herein can train the machine learning model using time-series data generated by the neural sensors directly, data that has been transformed into the frequency domain, or data representing the electrode voltages that has been transformed in another manner.

In this regard, it is also to be appreciated that the illustration of the neural sensors shown in the various examples herein and the discussion of neural signals has been simplified for discussion purposes. A more complex arrangement of neural sensors and related components, such as differential amplifiers for amplifying the signals provided by the neural sensors, can be utilized. These configurations are within the skill of those skilled in the art.

Example Computing Devices

Figure 8:
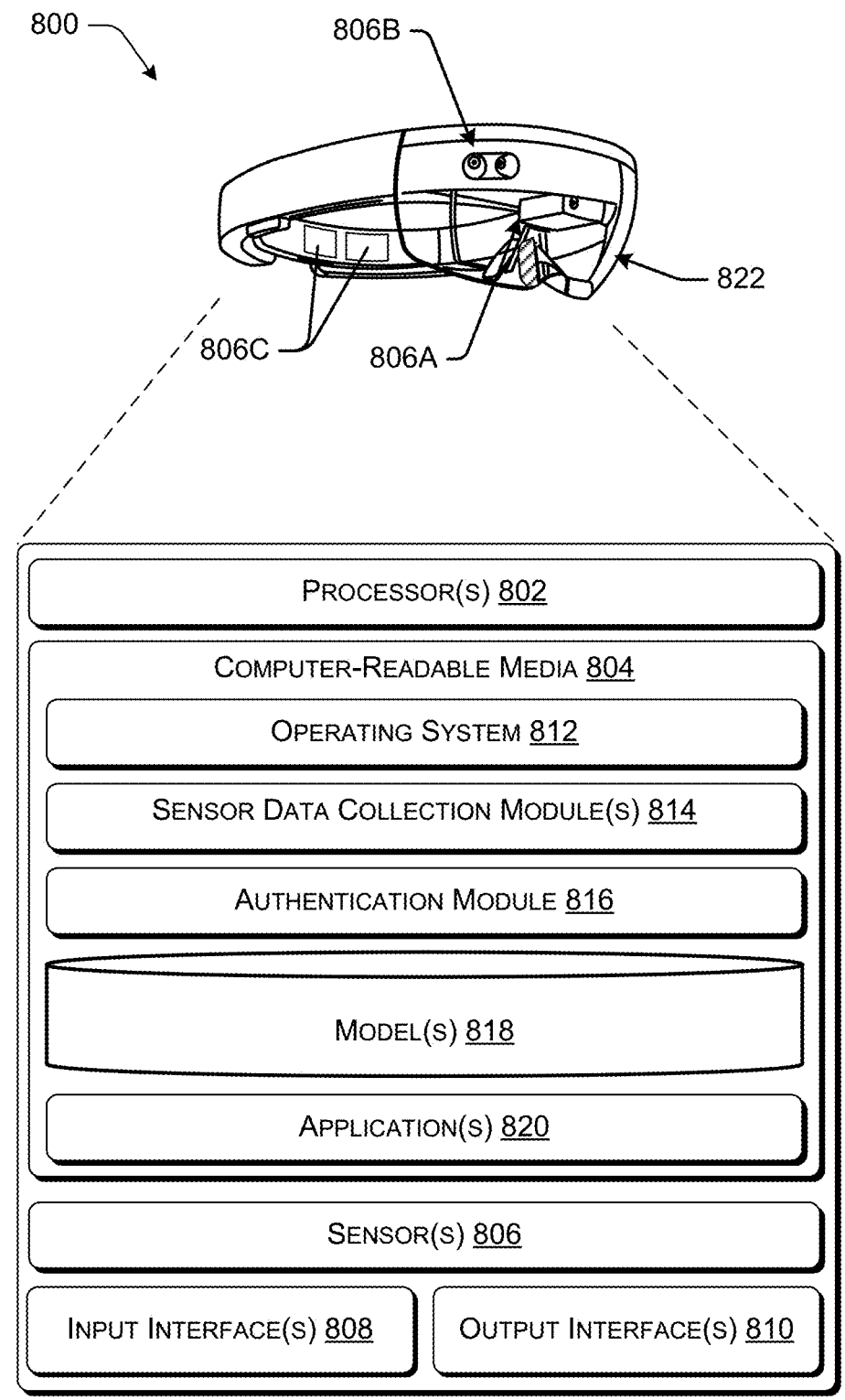
FIG. 8 illustrates details of an example computing device that is usable to implement authentication based on gaze and physiological response to stimuli.

FIG. 8 illustrates details of an example computing device 800 that can be used to implement the authentication techniques described herein. The computing device 800 in this example includes processor(s) 802, computer-readable media 804, sensor(s) 806, input interface(s) 808, and output interfaces(s) 810. In FIG. 8, device 800 is illustrated as a head-mounted device. However, this example is provided for illustrative purposes and is not to be construed as limiting. Rather, computing device 800 can also be implemented as other types of computing devices, such as any of the various computing devices described with reference to FIG. 1 or elsewhere in this application. Additional details and example computing environments and computing devices are described below with reference to FIGS. 13-15.

Processor(s) 802 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In various examples, the processor(s) 802 can execute one or more instructions, modules, and/or processes to cause the device 802 to perform a variety of functions, such as those described as being performed by computing devices herein. Additionally, each of the processor(s) 802 can possess its own local memory, which also can store program modules, program data, and/or one or more operating systems. Additional details of example processors that can be used as processor(s) 802 are described below with reference to FIGS. 13 and 15.

In at least one configuration, the computer-readable media 804 of the device 800 can store components that facilitate interaction between a user and the computing device 800. For example, the computer-readable media 804 can include an operating system 812, sensor data collection module(s) 814, an authentication module 816, a model repository 818 of machine learning models (e.g., models 202), and one or more applications 820. The operating system 812 can be configured to manage hardware and services within and coupled to the device 800 for the benefit of other components and/or modules. The sensor data collection module(s) 814 collect, store, and/or process sensor data collected from the sensor(s) 806 of the computing device. The authentication module 816 includes program instructions to establish one or more machine learning models for a user to access a resource and/or to authenticate the user to access the resource. Specifically, the authentication module 816 may be configured to establish and train one or more machine learning models based on gaze tracking data and physiological data of the user in response to one or more stimuli. The authentication module 816 may store the machine learning models in the model repository 818 in association with an account, computing device, or other resource. The machine learning models may be stored locally, in memory of the computing device 800, or remotely such as in memory of a service provider (e.g., service provider 102). The model repository 818 may include one or more models for one or more users. For instance, in some examples, the model repository 818 may include a separate model for each of multiple different users. Additionally or alternatively, model repository 818 may include multiple different models for multiple different resources.

Application(s) 820 may correspond to any other applications stored in whole or in part on the computing device 800. By way of example and not limitation, the applications 820 may include gaming applications, file sharing applications, browser applications, search applications, productivity applications (e.g., word processing applications, spreadsheet applications, computer-aided design applications, etc.), communication applications (e.g., email, instant messaging, audio and/or video conferencing, social networking applications, etc.). The application(s) 820 can be stored in the computer-readable media 804 or otherwise accessible to the device 800 (e.g., via a network, such as network 104). In some examples, one or more of the applications 820 may be resources for which the authentication techniques described herein are usable to gain access. Additional details of example applications that can be representative of application(s) 820 are described below with reference to FIGS. 13-15.

While FIG. 8 illustrates the authentication module 816 as being separate from the operating system 812 and the application(s) 820, in alternative examples, the authentication module 816 can be included in or integrated with the operating system 812 and/or one or more of the applications 820. In such examples, the operating system 812 and/or application(s) 820 having the integrated authentication functionality can perform same or similar functionalities as described for the authentication module 816.

The modules can represent pieces of code executing on a computing device (e.g., device 102). In some examples, individual modules can include an interface, such as an Application Program Interface (API), to perform some or all of its functionality (e.g., operations). In additional and/or alternative examples, the components can be implemented as computer-readable instructions, data structures, and so forth that are executable by at least one processing unit (e.g., processor(s) 802) to configure the device 800 to perform operations including the authentication techniques described herein. Functionality to perform these operations can be implemented by a single device or distributed across multiple devices. Additional details of an example distributed computing scenario are described with reference to FIG. 14. Additional details of example types of computer-readable media that can be used for computer-readable media 804 are provided below with reference to FIGS. 13-15.

In at least one example, the sensor(s) 806 can be any device or combination of devices configured to sense conditions of a user or surroundings of the user. The sensor(s) 806 include one or more user facing cameras 806A or other sensors for tracking eye movement or gaze, facial expressions, pupil dilation and/or contraction, gestures, and/or other characteristics of the user. The sensor(s) 806 also include one or more outwardly facing or environmental cameras 806B for capturing images of real-world objects and surroundings of the user. The sensor(s) 806 also include one or more physiological sensors 806C for measuring one or more physiological conditions of the user. The physiological sensors 806C in this examples are shown as neural sensors such as electroencephalography (EEG) sensors, magnetoencephalography (MEG) sensors, and/or functional near-infrared spectroscopy (fNIRS) sensors to measure a signal representative of electrical activity of the brain or brain state. The sensors 806 may additionally or alternatively include one or more other physiological sensors such as those described throughout the application. The sensor(s) 806 may additionally or alternatively include one or more other cameras (e.g., web cameras, infrared cameras, depth cameras, etc.), microphones or other sound sensors for measuring a volume of speech, a rate of speech, etc., light sensors, optical scanners, or the like. Individual sensor(s) 806 can output sensor data to corresponding sensor data collection module(s) 814 for suitable processing. For instance, user facing camera 806A can capture gaze tracking data which may be processed by a corresponding sensor data collection module 814 to time stamp the gaze tracking data and determine gaze locations associated with the time stamps. As another example, the physiological sensors 806C can capture physiological data which may be processed by a corresponding sensor data collection module 814 to time stamp the physiological data and apply any applicable time offsets to determine measurements of physiological conditions associated with the time stamps. The sensor data collection module 814 may then output the gaze tracking data and the physiological data to the authentication module 816 for use in establishing a machine learning model for the user, or for authenticating the user.

The sensor(s) 806 can additionally and/or alternatively include a depth map sensor, a light field sensor, a gyroscope, a sonar sensor, an infrared sensor, a compass, an accelerometer, a global positioning system (GPS) sensor, and/or any other device or component for detecting a position or movement of the head-mounted computing device 800 and/or other objects. The sensor(s) 806 can also enable the generation of data characterizing interactions, such as user gestures, with the device 800. For illustrative purposes, the sensor(s) 806 and/or an input interface 808 can enable the generation of data defining a position and aspects of movement, e.g., speed, direction, acceleration, of one or more objects, which can include device 800, physical items near the device 800, and/or users.

FIG. 8 shows an example in which at least some of the sensor(s) 806 are part of, or built into, the computing device 800. More specifically, FIG. 8 shows a non-limiting example where the computing device 800 includes the user facing camera sensor 806A disposed in or integrated with a nose-bridge component of a head-mounted assembly, the environmental camera 806B disposed in an outer surface of a frame of the head-mounted assembly, and one or more physiological sensors 806C disposed in or integrated with an interior of a headband of the head-mounted assembly. As described above, computing device 800 can include any configuration of one or more sensors 806 that can be part of, or built into, the computing device 800. Additionally or alternatively, one or more sensors 806 can be removably coupled to the computing device 800, or be separate from and communicatively coupled to the device 800. In the latter case, sensor data can be communicated from the one or more sensors 806 to the computing device 800, for example, via a wired and/or wireless network, such as network 104.

As described above, the computing device 800 can include the input interface(s) 808 and output interface(s) 810. By way of example and not limitation, the input interface(s) 808 can include a keyboard, keypad, mouse, microphone, touch sensor, touch screen, joystick, physical and/or soft control buttons, scrolling buttons, cameras, neural interface, or any other device suitable to generate a signal and/or data defining a user interaction with the computing device 800. By way of example and not limitation, the output interface(s) 810 can include a display (e.g., holographic display, head-up display, protector, touch screen, liquid crystal display (LCD), etc.), speakers, haptic interfaces, or the like.

In at least one example, an output interface 810 can be a hardware display surface 822 that can be configured to allow for a real-world view of an object through the hardware display surface 822 while also providing a rendered display of computer generated images, content, or scenes. The hardware display surface 822 can include one or more components, such as a projector, screen, or other suitable components for producing a display of an object and/or data. In some configurations, the hardware display surface 822 can be configured to cover at least one eye of a user. In one illustrative example, the hardware display surface 822 can include a screen configured to cover both eyes of a user. The hardware display surface 822 can render or cause the display of one or more images for generating a view or a stereoscopic image of one or more computer generated virtual objects. For illustrative purposes, an object can be an item, data, device, person, place, or any type of entity. In at least one example, an object can be associated with a function or a feature associated with an application. As will be described in more detail below, some configurations enable the computing device 800 to graphically associate holographic user interfaces and other graphical elements with an object seen through the hardware display surface 822 or rendered objects displayed on the hardware display surface 822.

The hardware display surface 822 can be configured to allow a user to view objects from different environments. In some configurations, the hardware display surface 822 can display a rendering of a computer generated virtual object. In addition, some configurations of the hardware display surface 822 can allow a user to see through selectable sections of the hardware display surface 822 having a controllable level of transparency, enabling the user to view objects in his or her surrounding environment. For illustrative purposes, a user's perspective looking at objects through the hardware display surface 822 is referred to herein as a "real-world view" of an object or a "real-world view of a physical object." As will be described in more detail below, computer generated renderings of objects and/or data can be displayed in, around, or near the selected portions of the hardware display surface 822 enabling a user to view the computer generated renderings along with real-world views of objects observed through the selected portions of the hardware display surface 822.

Some configurations described herein provide both a "see through display" and an "augmented reality display." For illustrative purposes, the "see through display" can include a transparent lens that can have content displayed on it. The "augmented reality display" can include an opaque display that is configured to display content over a rendering of an image, which can be from any source, such as a video feed from a camera used to capture images of an environment. For illustrative purposes, some examples described herein describe a display of rendered content over a display of an image. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" or "mixed reality scene."

Additional details associated with the hardware display surface 822 are described below with reference to FIGS. 9A-9C, 10A-10F, 11A-11F. Additional details associated with the input interface(s) 808 and/or the output interface(s) 810 are described below with reference to FIGS. 13 and 15.

Example Gaze Tracking

Figure 9A:
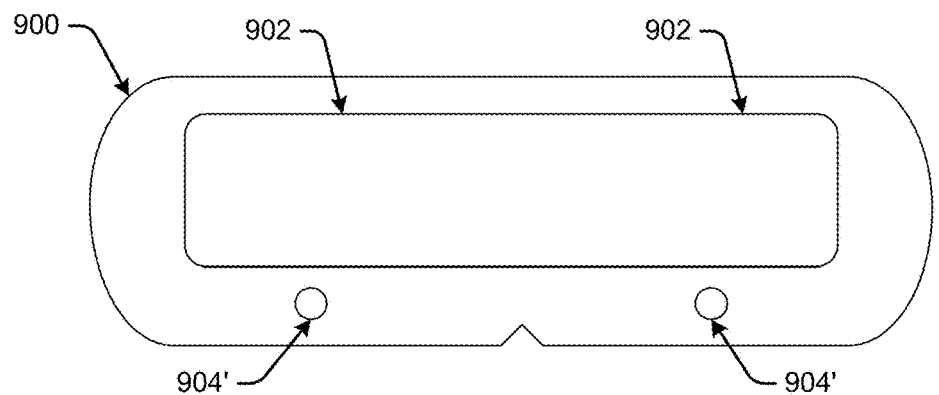
FIG. 9A-FIG. 9C illustrate example details of identifying gaze locations by tracking a gaze of a user.

Referring now to FIGS. 9A-9C, 10A-10F, 11A-11F, and 12 the following section describes techniques for tracking a user's gaze and identifying gaze locations, such as described in the preceding examples. The techniques are described in the context of a head-mounted computing device having a user facing gaze tracking camera, such as that described with reference to FIG. 8. However, the techniques described in this section can also be applied to other types of computing devices having a user facing camera for gaze tracking (e.g., computer with a web camera 108(2), a tablet or smartphone with user-facing camera 108(3), a game console with user facing camera 108(N), etc.). FIG. 9A is back view of a device 900 (e.g., device 108, device 800, etc.) having a hardware display surface 902 (e.g., hardware display surface 822) and one or more sensors 904 and 904' (such as camera 806A of computing device 800). To facilitate functionality described herein, in at least one example, sensor(s) 904' are user facing (such as user facing camera 806A) and can be configured to track the position of at least one eye of a user. In addition, at least one other sensor 904 is environment facing (such as environmental camera 806B) and can be directed toward a real-world object for generating image data of the real-world object. As will be described in more detail below, examples can process eye position data, image data, and other data to identify a gaze location that is a rendered object displayed on a hardware display surface 902 or a real-world object viewed through a transparent section of the hardware display surface 902. As will also be described below, examples described herein can also determine if the user is looking at a particular section of a hardware display surface 902, a particular part of a real-world object, or a particular part of a rendered object or image. Such information can be useful for determining gaze locations from gaze tracking data to establish a machine learning model of a user and/or during authentication for determining whether a user's login data (gaze tracking data and physiological data) correlates to the machine learning model of the user.

In FIG. 9A, the device 900 comprises two of the user facing sensors 904' for generating data or a signal indicating the position or movement of at least one eye of a user. The sensors 904' can be in the form of a camera or another suitable device for tracking the position or movement of at least one eye of the user. The device 900 also comprises at least one hardware display surface 902 (such as hardware display 822 of computing device 800, or a display screen associated with one of computing devices 108(1), 108(2), 108(3), 108(4), 108(5), or 108(N), for example) for allowing a user to view one or more objects. The hardware display surface 902 can provide a view of a real-world object through the hardware display surface 902 as well as images of rendered objects that can be displayed on the hardware display surface 902, as described above.

Figure 9B:
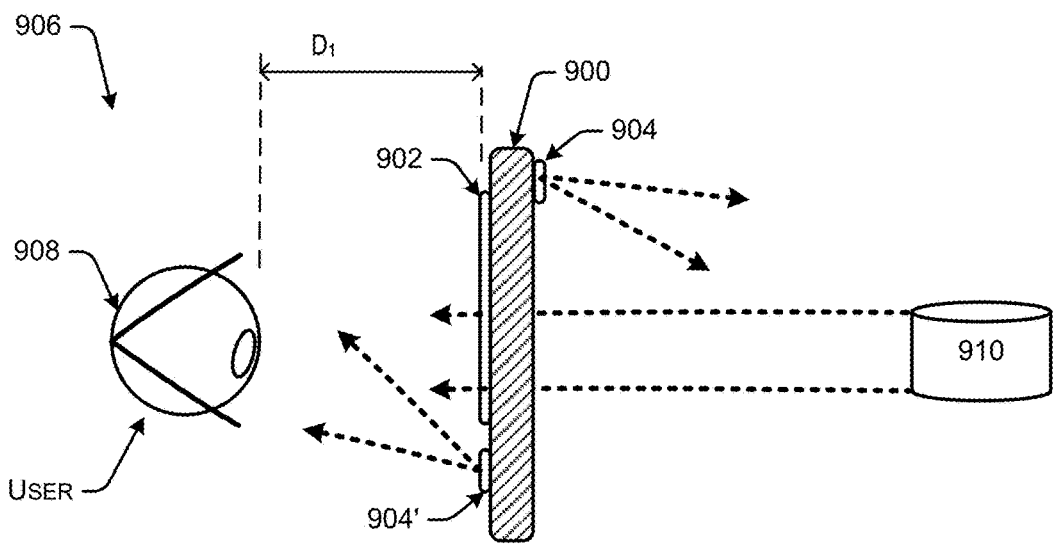

FIG. 9B is a side cutaway view 906 of the device 900 shown in FIG. 9A. FIG. 9B includes an eye 908 of a user looking through the hardware display surface 902. The hardware display surface 902 is configured to create transparent sections enabling a user to view objects through the hardware display surface 902. FIG. 9B shows an example arrangement where a real-world object 910 is aligned with a transparent section of the hardware display surface 902 allowing the user to view the real-world object 910 through the hardware display surface 902. The hardware display surface 902 can display one or more rendered objects. The device 102 also comprises at least one sensor 904' directed toward at least one eye 908 of the user.

Figure 9C:
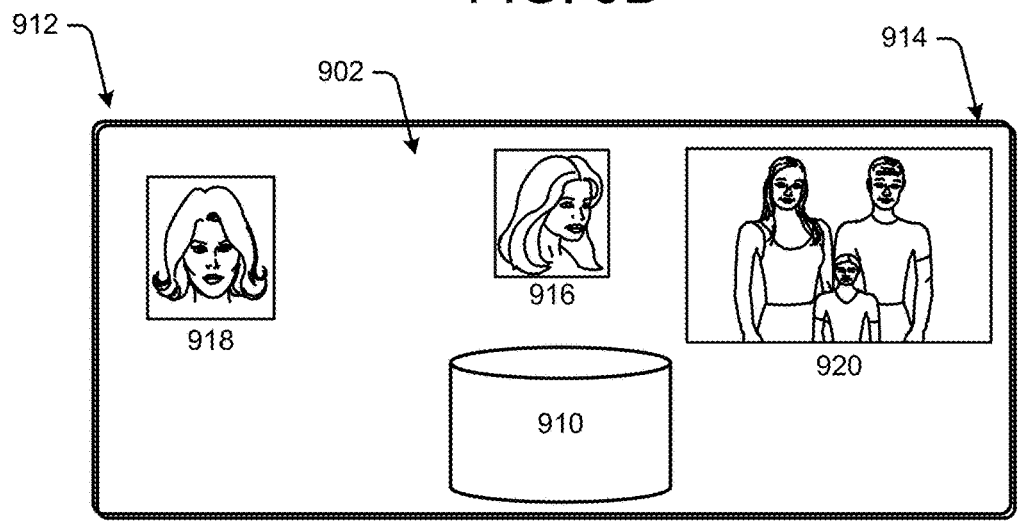

FIG. 9C illustrates an example scene or view 912 that can be observed by a user via the hardware display surface 902. The thick double line 914 illustrates the boundary of the hardware display surface 902. In this illustrative example, the scene or view 912 includes a first rendered object 916, a second rendered object 918, and a third rendered object 920 that are displayed on the hardware display surface 902. The real-world object 910 is viewed through the hardware display surface 902.

In a non-limiting example described above, a user can be attempting to access a resource (e.g., resource(s) 118). For instance, in order to access the resource, the user may be asked to authenticate him or herself by viewing one or more images or other stimuli via an authentication interface. In this example, the scene or view 912 is representative of the authentication interface. The first rendered object 916, the second rendered object 918, and the third rendered object 920 in this example are images or other stimuli that the user is to view while the user's gaze is tracked. In some examples, first rendered object 916, the second rendered object 918, and the third rendered object 920 may be rendered in front of or overlaid on the real-world object 910 or other objects in the real word scene. In other examples, the entire scene or view 912 may be computer generated, blocking out the real word surroundings entirely. In practice, other filler objects (e.g., filler stimuli that do not form part of the machine learning model of the user) may also be included in the scene or view 912. The authentication module (e.g., 116, 134, or 816) can cause the first rendered object 916, the second rendered object 918, and the third rendered object 920 to be rendered concurrently (similar to the example of FIG. 6) or sequentially (similar to the example of FIG. 3). As shown in FIG. 9, the first rendered object 916, the second rendered object 918, and the third rendered object 920 may be presented at different locations within the scene or view 912. Prior to presenting the stimuli, in some examples, the authentication module (e.g., 116, 134, or 816) can provide instructions on how to complete the authentication process. For instance, the authentication module (e.g., 116, 134, or 816) may audibly or visually present instructions indicating that the user will be presented with one or more stimuli and that the user is to look at each of the stimuli.

The authentication module (e.g., 116, 134, or 816) can then receive sensor data from one or more sensors of a computing device (e.g., sensor(s) 126, 806, or 904) as the user gazes at the images (i.e., rendered objects 916, 918, and 920) or other stimuli to obtain gaze tracking data and physiological data.

To facilitate aspects of such an example, the device 900 can utilize one or more techniques for calibrating the device 900. The following section, in conjunction with FIGS. 10A-10F, describes aspects of a technique for obtaining calibration data. A subsequent section, in conjunction with FIG. 11A-FIG. 11F, describes aspects of an example scenario where a device 900 processes the calibration data and other data to identify a gaze location.

A device 900 can be calibrated in a number of ways. In one example, a device 900 can utilize the display of a number of graphical elements at predetermined locations. As the graphical elements are displayed, the device 900 can prompt the user to look at a particular graphical element and provide an input to verify that the user is looking at the particular graphical element. When the user verifies that he or she is looking at the particular graphical element, sensor(s) 904' can generate eye position data defining a position of at least one eye. The eye position data can be stored in a data structure in memory in response to receiving the verification from the user.

FIG. 10A illustrates an example view 1000 that can be captured by the sensors 904' of the device 900. From such a perspective, the device 900 can determine one or more values that define the position of at least one eye 908 of the user. In one illustrative example, the values can include a second value (D2) indicating a distance between a user's eyes and a third value (D3), fourth value (D4), and a fifth value (D5) indicating a distance between at least one eye of the user and a reference point 1002. It can be appreciated that by the use of one or more image processing technologies, one or more aspects of an eye, such as the pupil, can be identified and utilized to determine an eye position.

In addition, by the use of one or more suitable technologies, a reference point 1002 can be selected. A reference point 1002 can be based on a feature of the user, e.g., a tip of a nose, an eyebrow, a beauty mark, or a reference point 1002 can be in an arbitrary location. In the example of FIG. 10A, a point between the user's eyes is used as a reference point 1002. This example reference point 1002 is provided for illustrative purposes and is not to be construed as limiting. It can be appreciated that the reference point 1002 is can be in any suitable location, which can be based on an identifiable feature or characteristic of a user or any object.

As described above, the device 900 can generate a number of graphical elements at predetermined locations of the hardware display surface 902. As the graphical elements are displayed on the hardware display surface 902, the device 900 can prompt the user to look at the graphical elements and provide an input to verify that the user is looking at the graphical elements. FIG. 10B illustrates an example view 1004 of a graphical element 1006 that can be generated by the device 900 to facilitate the calibration process. In this example, the device 900 generates a rendering of a graphical element 1006 in the center of the viewing area. While the graphical element 1006 is displayed, the device 900 can generate a prompt for the user to verify that he or she is looking at the graphical element 1006. The prompt, as well as a user response to the prompt, can include a gesture, voice command, or other suitable types of input.

When the device 900 verifies that the user is looking at the graphical element 1006, the device 900 can record one or more values indicating the position and/or the movement of at least one eye 908 of the user. For instance, one or more values described above and shown in FIG. 9B and FIG. 10A can be stored in a data structure in memory. It can be appreciated that any suitable value or a combination of values can be stored and utilized, including but not limited to, the first value (D1) indicating the distance between the sensors 904' and at least one eye 908 of a user, the second value (D2) indicating the distance between the eyes of a user, and other values (D3, D4, and D5) indicating the distance between at least one eye 908 and a reference point 1002. These values are provided for illustrative purposes and are not to be construed as limiting. It can be appreciated that such values, subsets of such values, and other values of other measurements can be utilized in determining the movement and/or the position of one or more eyes of a user.

Figure 10C:
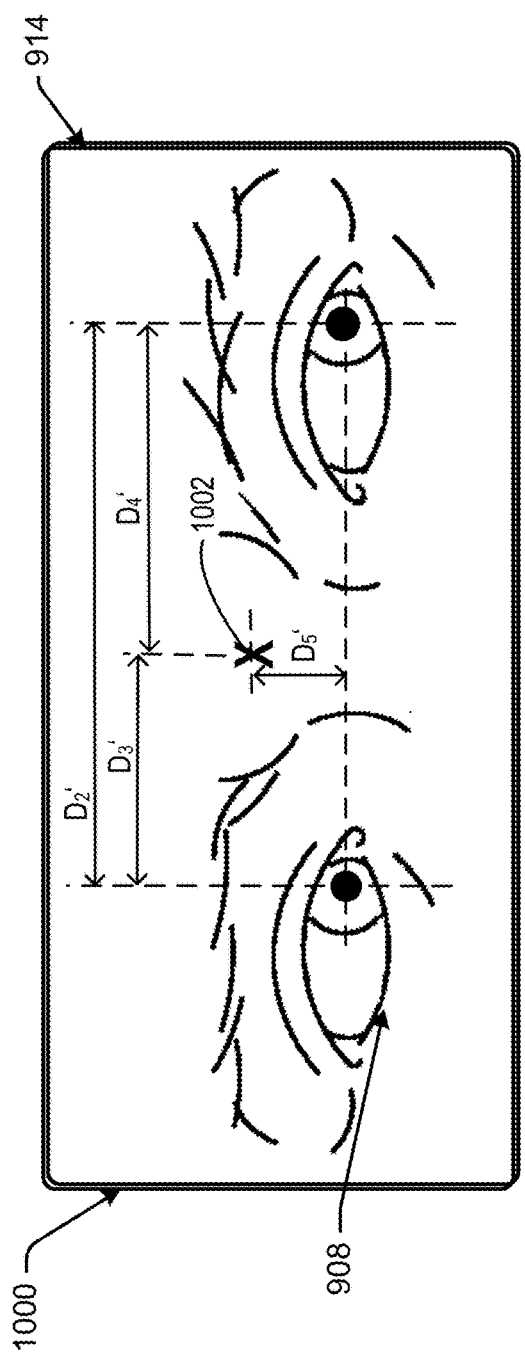
Figure 10D:
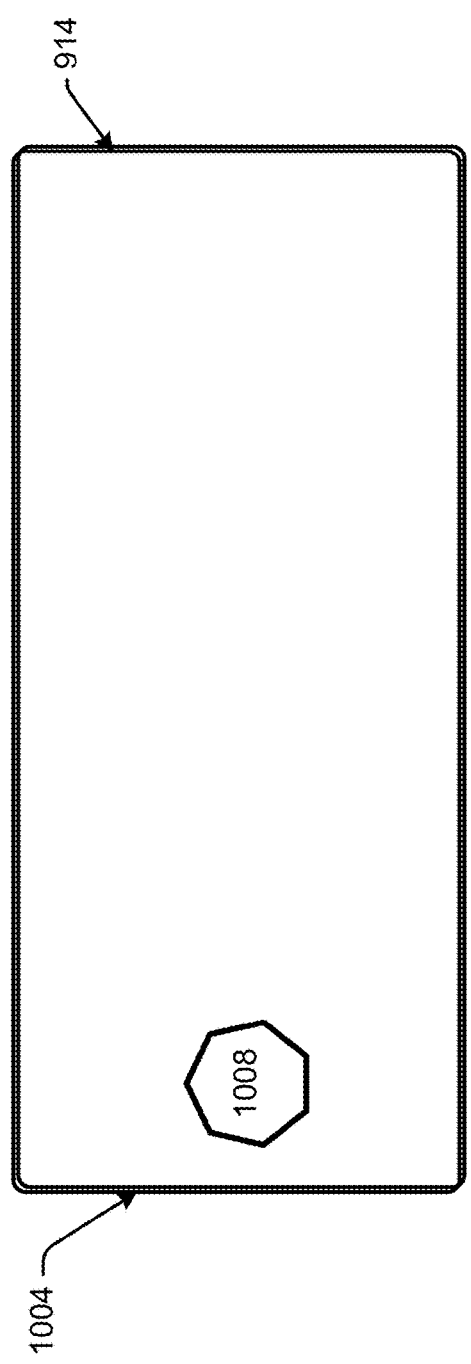

Other sets of values can be measured during the display of other graphical elements displayed in various positions. For example, as shown in FIG. 10C, a second set of values (D2', D3', D4', and D5') can be measured when a second graphical element 1008 is displayed, as shown in FIG. 10D. As shown in FIG. 10E, a third set of values (D2", D3", D4", and D5") can be measured when a third graphical element 1010 is displayed, as shown in FIG. 10F.

These example measurements and the locations of the graphical elements are provided for illustrative purposes. It can be appreciated that any number of graphical elements can be placed at different locations to obtain measurements that can be used to calibrate a device 900. For example, the device 900 can sequentially display a graphical element at pre-determined locations of the view 1004, such as each corner of the view 1004. As can be appreciated, more or fewer graphical elements can be used in the calibration process.

The values that indicate the position of at least one eye 908 at each pre-determined location can be used to generate calibration data. The calibration data can be configured to correlate the sets of eye position data with data identifying the positions of the graphical elements.

Any known technique suitable for generating calibration data can be used. It can be appreciated that the generation of calibration data can include extrapolation, projection and/or estimation technologies that can project correlations between sets of eye position data and various sections of a hardware display surface 902 and/or pixels of a hardware display surface 902. These examples are provided for illustrative purposes and are not to be construed as limiting, and the values and/or calibration data can be obtained in other ways, including receiving such calibration data from one or more remote resources.

Once the calibration data is generated or obtained, such data and other data can be utilized by the device 900 to determine if a user is looking at a particular gaze location, which can include a part of a hardware display surface 902, a rendered object, part of a rendered object, a real-world object, or part of a real-world object. FIGS. 11A-11F describe aspects of an example scenario where the device 900 having at least one sensor 904' is used to track the movement of at least one eye 908 of a user to identify a gaze location.

Referring now to FIG. 11A and FIG. 11B, an example scenario showing the identification of a gaze location is shown and described. In this example, the user is looking at the example view 912. As summarized above with reference to FIG. 9C, the example view 912 comprises both a view of rendered objects (e.g., first rendered object 916, second rendered object 918, and third rendered object 920) on the hardware display surface 902 as well as a view of a real-world object 910 through the hardware display surface 902. While the user is looking at the view 912, the sensor(s) 904' can cause the generation of one or more measured values, such as the values shown in the FIG. 11A. In some examples, using any combination of suitable technologies, such values can be compared against the calibration data and/or other data to identify a gaze location. In this example, one or more values measured in the scenario depicted in FIG. 11A can be processed with the calibration data to determine that the user is looking at the first rendered object 916. In such an example, the one or more measured values shown in FIG. 11A can also be used to determine that the user is looking at a predetermined section of an interface, such as the first section 1100 of the hardware display surface 902 in FIG. 11B. Thus, in an example similar to that of FIG. 6 in which multiple stimuli are presented concurrently, the authentication module (e.g., 116, 134, or 816) may determine that the user's gaze has settled on the first rendered object 916 (which may be a salient image) and may obtain gaze tracking data and physiological data while the user views the first rendered object 916 for comparison to a machine learning model of the user.

In continuing the present example, one or more values measured in the scenario depicted in FIG. 11C can be processed with the calibration data to determine that the user is looking at the second rendered object 918. In such an example, the one or more measured values shown in FIG. 11C can also be used to determine that the user is looking at a second section 1102 of the hardware display surface 902 in FIG. 11D. In that case, in an example similar to that of FIG. 6 in which multiple stimuli are presented concurrently, the authentication module (e.g., 116, 134, or 816) may determine that the user's gaze has settled on the second rendered object 918 (which may be a salient image) and may obtain gaze tracking data and physiological data while the user views the second rendered object 918 for comparison to a machine learning model of the user.

Figure 11E:
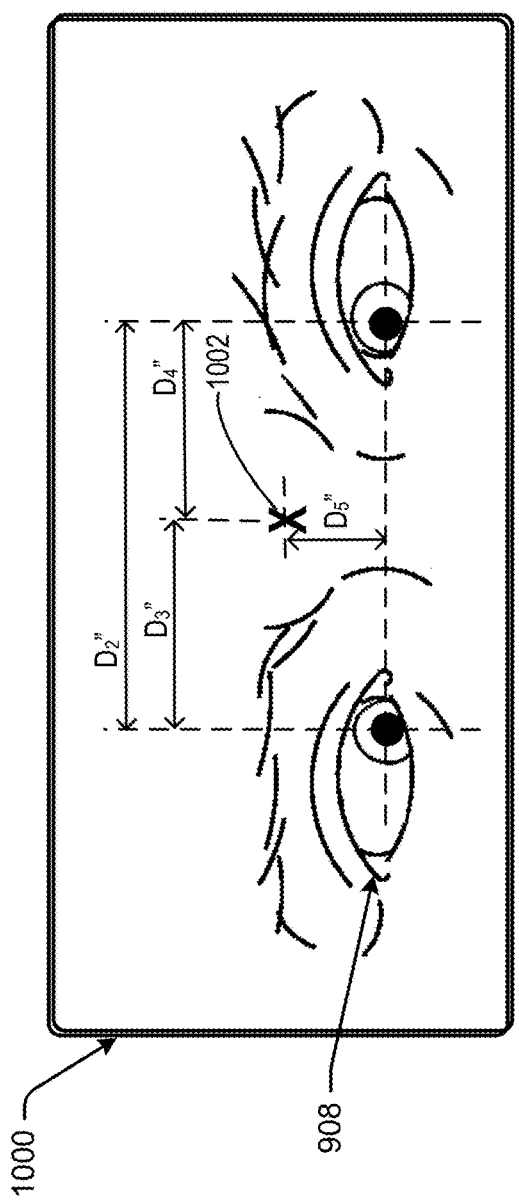
Figure 11F:
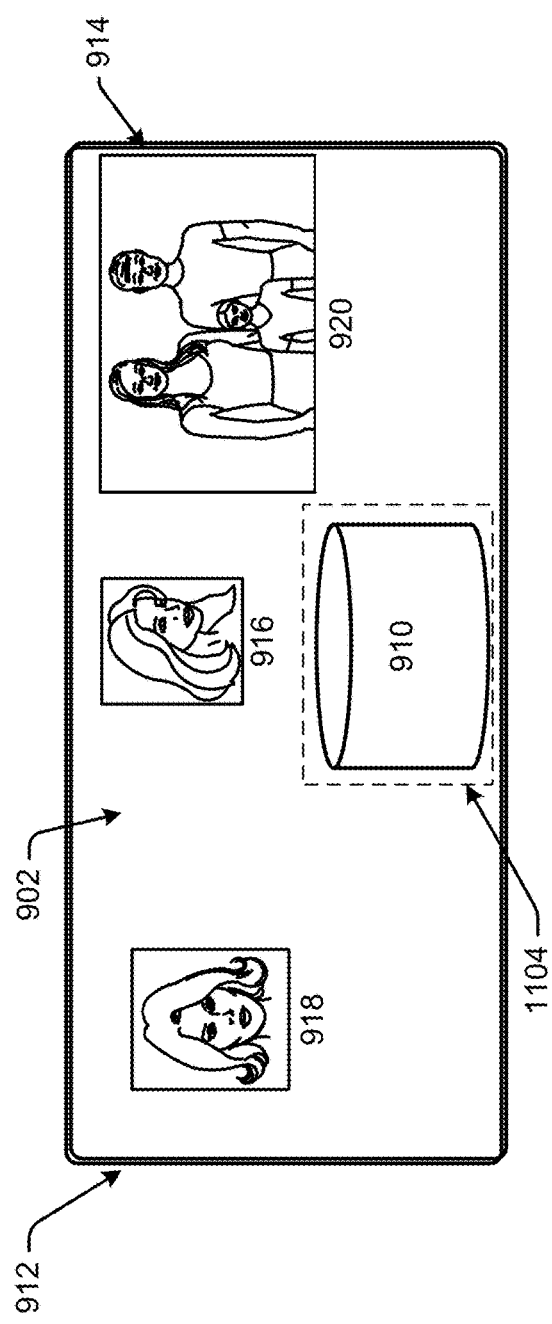

In continuing the present example, one or more values measured in the scenario depicted in FIG. 11E can be processed with the calibration data to determine that the user is looking at the real-world object 910. In such an example, the one or more measured values shown in FIG. 11E can be processed with the calibration data to determine that the user is looking at a third section 1104 of the hardware display surface 902 in FIG. 11F. Again, in an example similar to that of FIG. 6 in which multiple stimuli are presented concurrently, the authentication module (e.g., 116, 134, or 816) may determine that the user's gaze has settled on the third rendered object 920 (which may be a salient image) and may obtain gaze tracking data and physiological data while the user views the third rendered object 920 for comparison to a machine learning model of the user.

In some examples, the device 900 can utilize data from a combination of resources to determine if a user is looking at the real-world object 910 through the hardware display surface 902. As summarized above, a camera or other type of sensor 904 (FIG. 9A) mounted to the device 900 can be directed towards a user's field of view. Image data generated from the camera can be analyzed to determine if an object in the field of view is in a pre-determined position of an image of the image data. If an object is positioned within a pre-determined area of an image, such as the center of the image, a device can determine a gaze location processing such data with eye position data. Such data can be utilized to supplement other types of data, such as position data from a GPS and/or data generated from a compass or accelerometer, to assist device 900 to determine a gaze direction, e.g., left, right, up, or down, and/or a gaze location.

Figure 12:
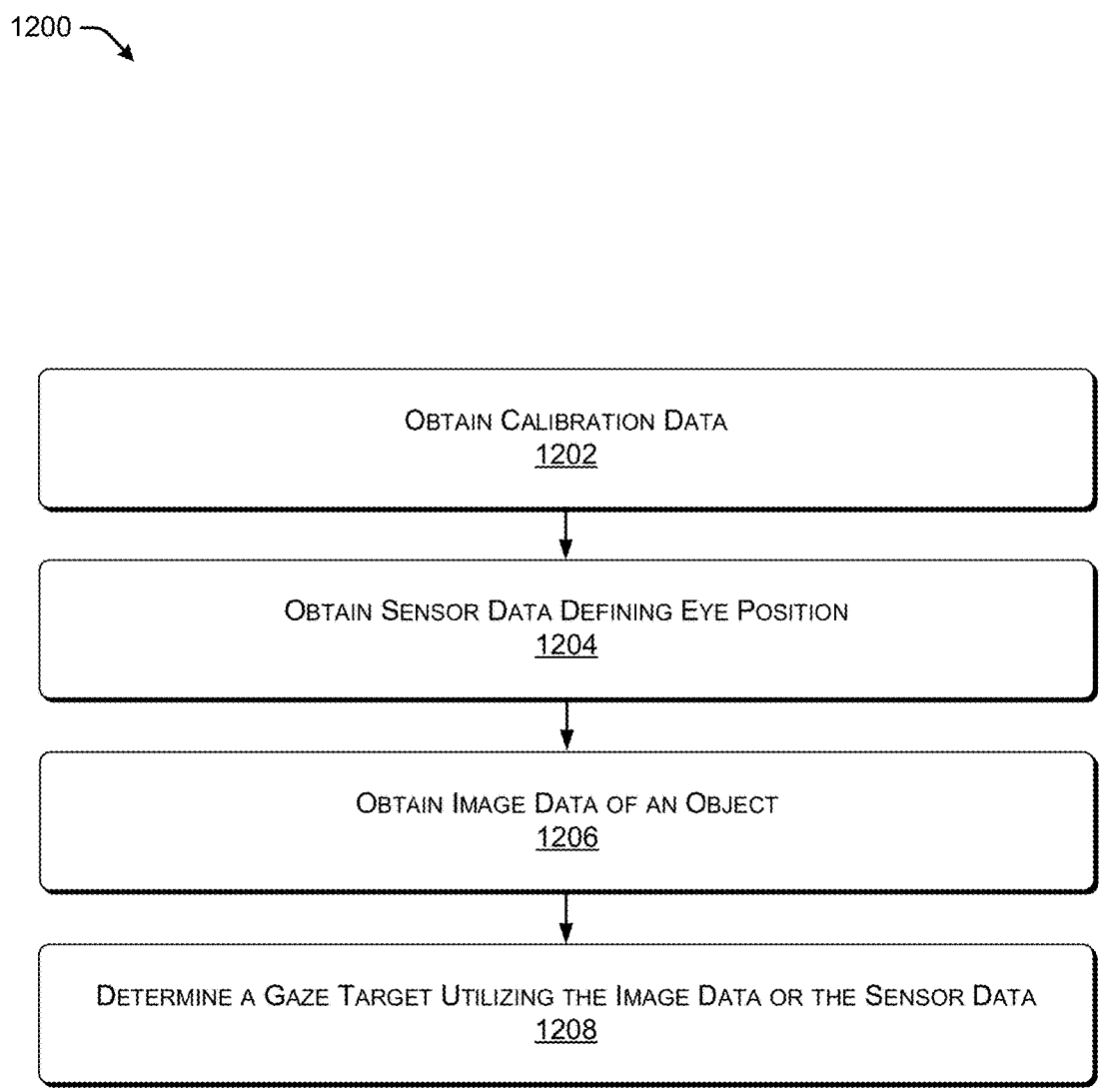
FIG. 12 is a flowchart illustrating aspects of an example process for determining a gaze location from gaze tracking data.

FIG. 12 is a flowchart illustrating aspects of an example process 1200 for determining a gaze location. In FIG. 12, the operations are described in the context of device 800 for convenience. However, the operations are applicable to other devices as well including, but not limited to, computing devices 108 and 900.

Block 1202 illustrates obtaining calibration data. In at least one example, the operating system 812, an application 820, or another module associated with the computer-readable media 804, can obtain calibration data. The calibration data can be stored in a data structure in the computer-readable media 804 or any computer readable storage medium for access at a later time. The calibration data can be generated by the device 800 or the calibration data can be received from a remote resource. In some examples, sensors 806A of computing device 800 can be positioned to track the position of at least one eye of a user. The sensors 806A can cause the generation of one or more values that correlate the position of at least one eye of a user with a particular section or position of a hardware display surface 822. Such examples can utilize an initialization process where the device 800 displays one or more graphical elements at pre-determined locations. During the display of the one or more graphical elements, one or more inputs from a user can indicate that they are looking at the one or more graphical elements. In response to the input, a device can generate calibration data comprising the values that correlate the position of at least one eye of a user with data identifying a particular position or section of a hardware display surface 822.

Block 1204 illustrates obtaining sensor data indicating the position of at least one eye of the user. In at least one example, the operating system 812, an application 820, or another module associated with the computer-readable media 804, can obtain sensor data from the sensor(s) 806A. The sensor data can be stored in a data structure in the sensor data collection module(s) 814 or elsewhere in the computer-readable media 804 or any computer readable storage medium for access at a later time. As summarized above, sensor(s) 806A directed toward at least one eye of the user can cause the generation of sensor data (e.g., gaze tracking data) indicating the position of at least one eye of the user. The sensor data can be processed to generate data indicating a gaze direction of a user. As will be described below, the data indicating the gaze direction of the user can be processed with the calibration data to determine if the user is looking at a gaze location, which can include a rendered object displayed on the hardware display surface 822.

Block 1206 illustrates obtaining image data of an object. In at least one example, the operating system 812, an application 820, or another module associated with the computer-readable media 804, can obtain sensor data. The image data or other information about the object can be stored in a data structure in the sensor data collection module(s) 814, the authentication module 816, or elsewhere in the computer-readable media 106 or any computer readable storage medium for access at a later time. In some examples, a camera or other type of sensor 806B mounted to or otherwise in communication with the computing device 800 can be directed towards a user's field of view. The camera or other type of sensor 806B can cause the generation of image data, which can include one or more images of an object that is in the user's field of view. The image data can be in any suitable format and generated by any suitable sensor 806B, which can include the use of a depth map sensor, camera, etc.

Block 1208 illustrates determining a gaze location utilizing the image data and/or the sensor data. In at least one example, the operating system 812, an application 820, the authentication module 816, or another module associated with the computer-readable media 804, can determine the gaze location. For instance, if the user is looking at a real-world view of the object through the hardware display surface 822, and the sensor 806B directed towards the user's field of view generates image data of the object, the image data can be analyzed to determine if the object in the field of view is in a pre-determined position of an image of the image data. For example, if an object is positioned within a pre-determined area of an image, such as the center of the image, the computing device 800 can determine that the object is a gaze location. In another example, sensor data (e.g., gaze tracking data) indicating the position of at least one eye of the user can be processed with the calibration data and/or image data to determine if the user is looking at a rendered object displayed on the hardware display surface 822. Such an example can be used to determine that the rendered object displayed on the hardware display surface 822 is a gaze location.

Additional Example Computing Architectures

Figure 13:
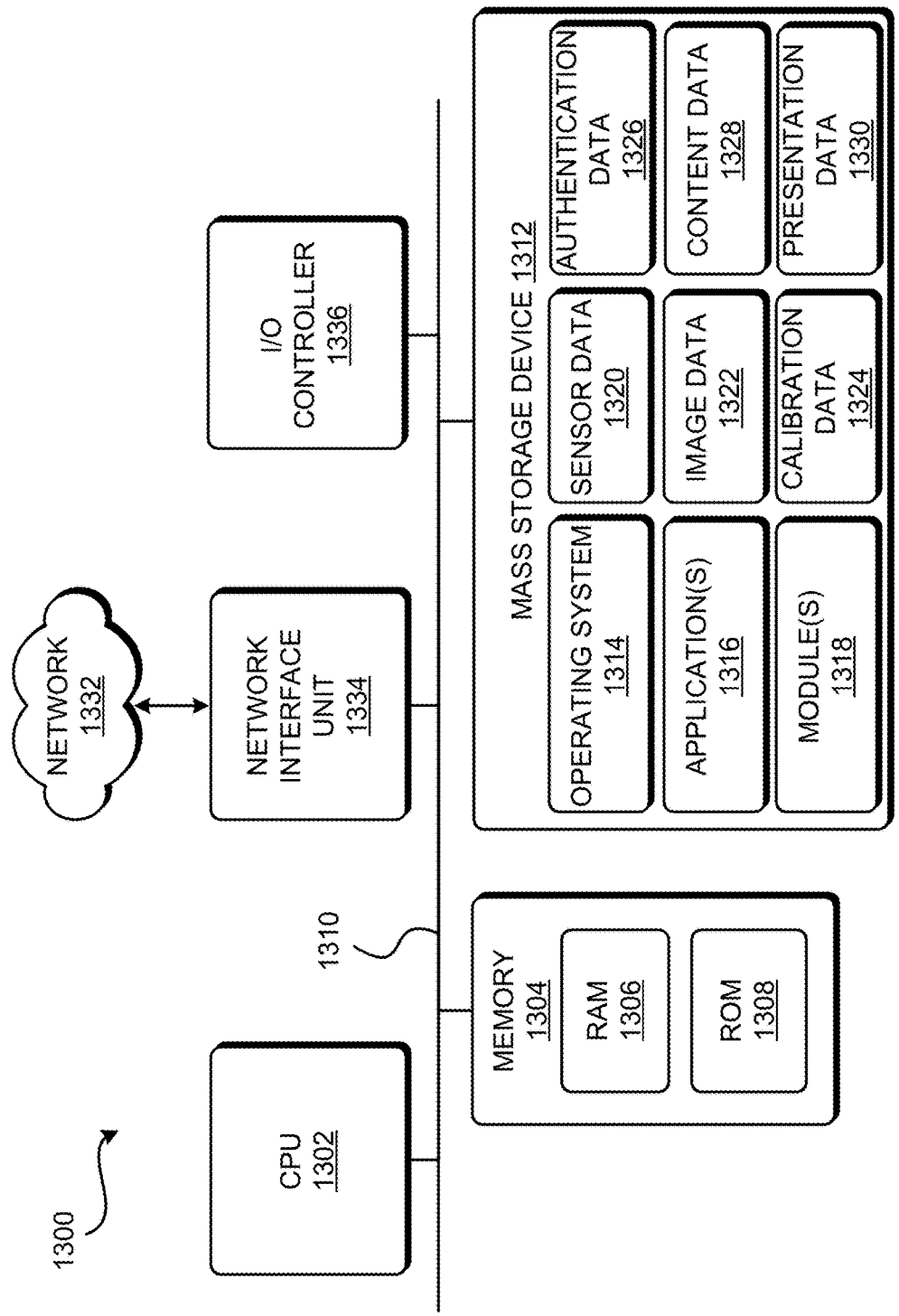
FIG. 13 is a schematic diagram illustrating an example computer architecture usable to implement aspects of authentication based on gaze and physiological response to stimuli.

FIG. 13 shows additional details of an example computer architecture 1300 for a computer, such as computing device 108, computing device 800, device 900, and/or server(s) 110, capable of executing the program components described above for authenticating a user to a resource based gaze and physiological response to one or more images or other stimuli. Thus, the computer architecture 1300 illustrated in FIG. 13 illustrates an architecture for a server computer, mobile phone, a PDA, a smart phone, a desktop computer, a netbook computer, a tablet computer, a laptop computer, a wearable computer, a vehicle computer, a game console, or other computing device. The computer architecture 1300 is an example architecture that can be used to execute, in whole or in part, aspects of the software components presented herein.

The computer architecture 1300 illustrated in FIG. 13 includes a central processing unit 1302 ("CPU"), a system memory 1304, including a random access memory 1306 ("RAM") and a read-only memory ("ROM") 1308, and a system bus 1310 that couples the memory 1304 to the CPU 1302. A basic input/output system ("BIOS") containing the basic routines that help to transfer information between elements within the computer architecture 1300, such as during startup, is stored in the ROM 1308. The computer architecture 1300 further includes a mass storage device 1312 for storing an operating system 1314 (e.g., operating system 812), application(s) 1316 (e.g., resource(s) 118, application(s) 128, application(s) 820, etc.) programs, module(s) 1318 (e.g., authentication modules 116, 134, and 816), sensor data collection module(s) 814, etc.), and the like, as described above with reference to FIGS. 1 and 8. Additionally and/or alternatively, the mass storage device 1312 can store sensor data 1320 (e.g., from sensors 126, 806, 904, etc.), image data 1322 (e.g., photographs, computer generated images, object information about real and/or virtual objects in a scene, metadata about any of the foregoing, etc.), calibration data 1324, authentication data 1326 (e.g., machine learning model(s) 818), content data 1328 (e.g., computer generated images, audio, videos, scenes, etc.), presentation data 1330 (e.g., instructions, prompts, etc.), and the like, as described herein.

The mass storage device 1312 is connected to the CPU 1302 through a mass storage controller (not shown) connected to the bus 1310. The mass storage device 1312 and its associated computer-readable media provide non-volatile storage for the computer architecture 1300. Mass storage device 1312, computer-readable media 114, computer-readable media 122, and computer-readable media 804 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 1300. For purposes of the claims, the phrase "computer storage medium," "computer-readable storage medium," and variations thereof, does not include communication media.

According to various configurations, the computer architecture 1300 can operate in a networked environment using logical connections to remote computers through the network 1332 and/or another network (not shown). The computer architecture 1300 can connect to the network 1332 through a network interface unit 1334 connected to the bus 1310. It should be appreciated that the network interface unit 1334 also can be utilized to connect to other types of networks and remote computer systems. The computer architecture 1300 also can include an input/output controller 1336 for receiving and processing input from input device(s) or input interface(s), and to provide output to an output device or output interface. Numerous examples of input and output devices and interfaces are provided throughout the application. For instance, the input/output controller 1336 can receive and process data from the input interface(s) 808 and/or provide output to output interface(s) 810 described above with reference to FIG. 8.

It should be appreciated that the software components described herein can, when loaded into the CPU 1302 and executed, transform the CPU 1302 and the overall computer architecture 1300 from a general-purpose computing system into a special-purpose computing system customized to facilitate the functionality presented herein. The CPU 1302 can be constructed from any number of transistors or other discrete circuit elements, which can individually or collectively assume any number of states. More specifically, the CPU 1302 can operate as a finite-state machine, in response to executable instructions contained within the software modules described herein. These computer-executable instructions can transform the CPU 1302 by specifying how the CPU 1302 transitions between states, thereby transforming the transistors or other discrete hardware elements constituting the CPU 1302. In some examples, processor(s) 112, processor(s) 120, and/or processor(s) 802 can correspond to CPU 1302.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 can include other types of computing entities, including hand-held computers, embedded computer systems, personal digital assistants, and other types of computing entities known to those skilled in the art. It is also contemplated that the computer architecture 1300 may not include all of the components shown in FIG. 13, can include other components that are not explicitly shown in FIG. 13, or can utilize an architecture completely different than that shown in FIG. 13.

Figure 14:
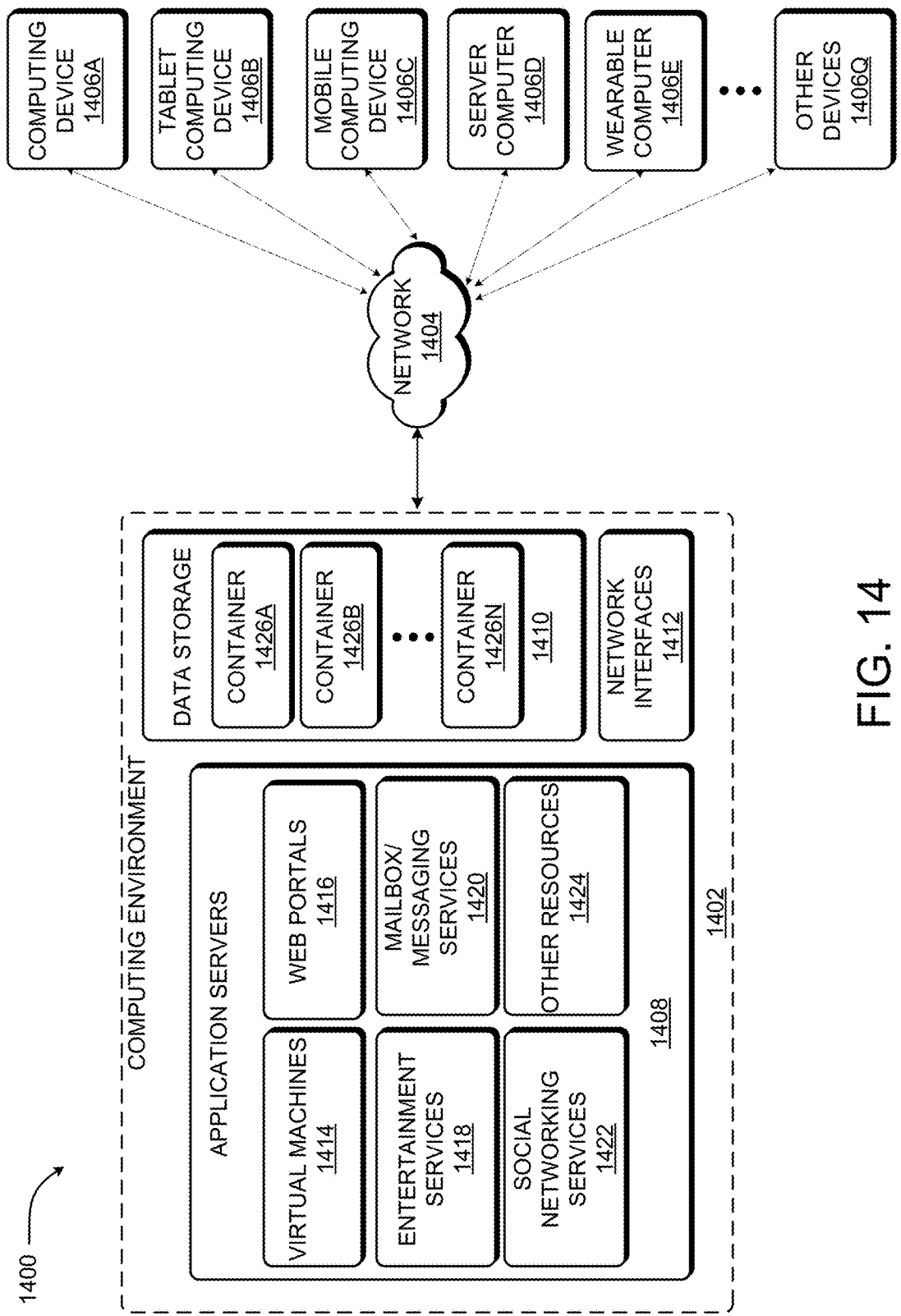
FIG. 14 is a schematic diagram illustrating an example distributed computing environment capable of implementing aspects of authentication based on gaze and physiological response to stimuli.

FIG. 14 depicts an example distributed computing environment 1400 capable of executing the software components described herein for authenticating a user to a resource based gaze and physiological response to one or more images or other stimuli. Thus, the distributed computing environment 1400 illustrated in FIG. 14 can be utilized to execute any aspects of the software components presented herein to achieve aspects of the techniques described herein.

According to various implementations, the distributed computing environment 1400 includes a computing environment 1402 operating on, in communication with, or as part of a network 1404. In at least one example, at least some of computing environment 1402 can correspond to the one or more servers 110 of the service provider 102, the computing devices 108, the computing device 800, and/or the computing device 900. The network 1404 can be or can include network(s) 104 and/or network 1332, described above with reference to FIGS. 1 and 13, respectively. The network 1404 also can include various access networks. One or more client devices 1406A-1406Q (hereinafter referred to collectively and/or generically as "clients 1406") can communicate with the computing environment 1402 via the network 1404 and/or other connections (not illustrated in FIG. 14). By way of example, computing devices 108 and servers 110 in FIG. 1, computing device 800 in FIG. 8, and device 900 in FIG. 9A can correspond to one or more of client devices 1406A-1406Q (collectively referred to as "clients 1406"), where Q may be any integer greater than or equal to 1 depending on the desired architecture. In one illustrated configuration, the clients 1406 include a computing device 1406A such as a laptop computer, a desktop computer, or other computing device, a slate or tablet computing device ("tablet computing device") 1406B, a mobile computing device 1406C such as a mobile telephone, a smart phone, or other mobile computing device, a server computer 1406D, a wearable computer 1406E, and/or other devices 1406Q. It should be understood that any number of clients 1406 can communicate with the computing environment 1402. Two example computing architectures for the clients 1406 are illustrated and described herein with reference to FIGS. 13 and 15. It should be understood that the illustrated clients 1406 and computing architectures illustrated and described herein are illustrative, and should not be construed as being limited in any way.

In the illustrated configuration, the computing environment 1402 includes application servers 1408, data storage 1410, and one or more network interfaces 1412. According to various implementations, the functionality of the application servers 1408 can be provided by one or more server computers that are executing as part of, or in communication with, the network 1404. In some examples, the computing environment 1402 can correspond to or be representative of the one or more servers 110 in FIG. 1, which are in communication with and accessible by the one or more computing devices 108 via the network(s) 104 and/or 1404. In that case, the applications servers 1408 are examples of the resource(s) 118 available at the servers 110 of the service provider 102. In some instances, the resource(s) 118 may be only accessible to authorized users. In that case, the user of one or more of the computing devices 108 may be authenticated to access one or more of the services or resources available from the application servers 1408 using the authentication techniques described herein. It should be understood that this example is illustrative, and should not be construed as being limited in any way.

In at least one example, the application servers 1408 can host various services, virtual machines, portals, and/or other resources. In the illustrated configuration, the application servers 1408 can host one or more virtual machines 1414 for executing applications or other functionality. According to various implementations, the virtual machines 1414 can execute one or more applications and/or software modules for implementing the authentication techniques described herein and/or the virtual machines 1414 may be secured using such authentication techniques. The application servers 1408 also host or provide access to one or more portals, link pages, Web sites, and/or other information ("Web portals") 1416. The Web portals 1416 can be used to communicate with one or more client computers. The application servers 1408 can include one or more entertainment services 1418. The entertainment services 1418 can include various gaming experiences for one or more users.

According to various implementations, the application servers 1408 also include one or more mailbox and/or messaging services 1420. The mailbox and/or messaging services 1420 can include electronic mail ("email") services, various personal information management ("PIM") services (e.g., calendar services, contact management services, collaboration services, etc.), instant messaging services, chat services, forum services, and/or other communication services.

The application servers 1408 also can include one or more social networking services 1422. The social networking services 1422 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1422 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1422 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE® service and the XBOX LIVE® service from Microsoft Corporation in Redmond, Wash. Other services are possible and are contemplated.

The social networking services 1422 also can include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1422 are not mentioned herein for the sake of brevity. As such, the above configurations are illustrative, and should not be construed as being limited in any way. According to various implementations, the social networking services 1422 can provide a source of images, video, audio, or other stimuli for use in the authentication techniques described herein. For instance, a machine learning model for the user may be trained based on gaze tracking data and physiological data while the user views images and/or other stimuli from the social networking services 1422. Such images and/or other stimuli can then be used as a basis to authenticate the user to access one or more resources (which may or may not have any relation to the social networking services from which the images or other stimuli were obtained). In one example, in order to login to access a social networking service, the user may be presented with one or more images or other stimuli from the social networking service. Gaze tracking data and physiological data of the user viewing the one or more images or other stimuli may be obtained and compared to a machine learning model for the user in order to determine whether to authenticate the user to access the social networking services.

As shown in FIG. 14, the application servers 1408 also can host other services, applications, portals, and/or other resources ("other resources") 1424. The other resources 1424 can deploy a service-oriented architecture or any other client-server management software. It thus can be appreciated that the computing environment 1402 can provide integration of the authentication techniques described herein with various mailbox, messaging, social networking, and/or other services or resources. For instance, the authentication techniques described herein can be used to authenticate users to access the various mailbox, messaging, social networking, and/or other services or resources.

As mentioned above, the computing environment 1402 can include the data storage 1410. According to various implementations, the functionality of the data storage 1410 is provided by one or more databases operating on, or in communication with, the network 1404. The functionality of the data storage 1410 also can be provided by one or more server computers configured to host data for the computing environment 1402. The data storage 1410 can include, host, or provide one or more real or virtual containers 1426A-1426N (referred to collectively and/or generically as "containers 1426"). Although not illustrated in FIG. 14, the containers 1426 also can host or store data structures and/or algorithms for execution by one or more modules of remote computing devices (e.g., authentication module 134 of one of computing devices 108, authentication module 816, sensor data collection module(s) 814, and/or machine learning model(s) 118 of computing device 800). Aspects of the containers 1426 can be associated with a database program, file system and/or any program that stores data with secure access features. Aspects of the containers 1426 can also be implemented using products or services, such as ACTIVE DIRECTORY®, DKM®, ONEDRIVE®, DROPBOX® or GOOGLEDRIVE®.

The computing environment 1402 can communicate with, or be accessed by, the network interfaces 1412. The network interfaces 1412 can include various types of network hardware and software for supporting communications between two or more computing entities including, but not limited to, the clients 1406 and the application servers 1408. It should be appreciated that the network interfaces 1412 also can be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 1400 provides the software functionality described herein as a service to the clients 1406. It should be understood that the clients 1406 can include real or virtual machines including, but not limited to, server computers, web servers, personal computers, tablet computers, gaming consoles, smart televisions, mobile computing entities, smart phones, and/or other devices. As such, various configurations of the concepts and technologies described herein enable any device configured to access the distributed computing environment 1400 to utilize the functionality described herein for providing gaze-based authentication, among other aspects. In one specific example, as summarized above, techniques described herein can be implemented, at least in part, by a web browser application that can work in conjunction with the application servers 1408 of FIG. 14.

Figure 15:
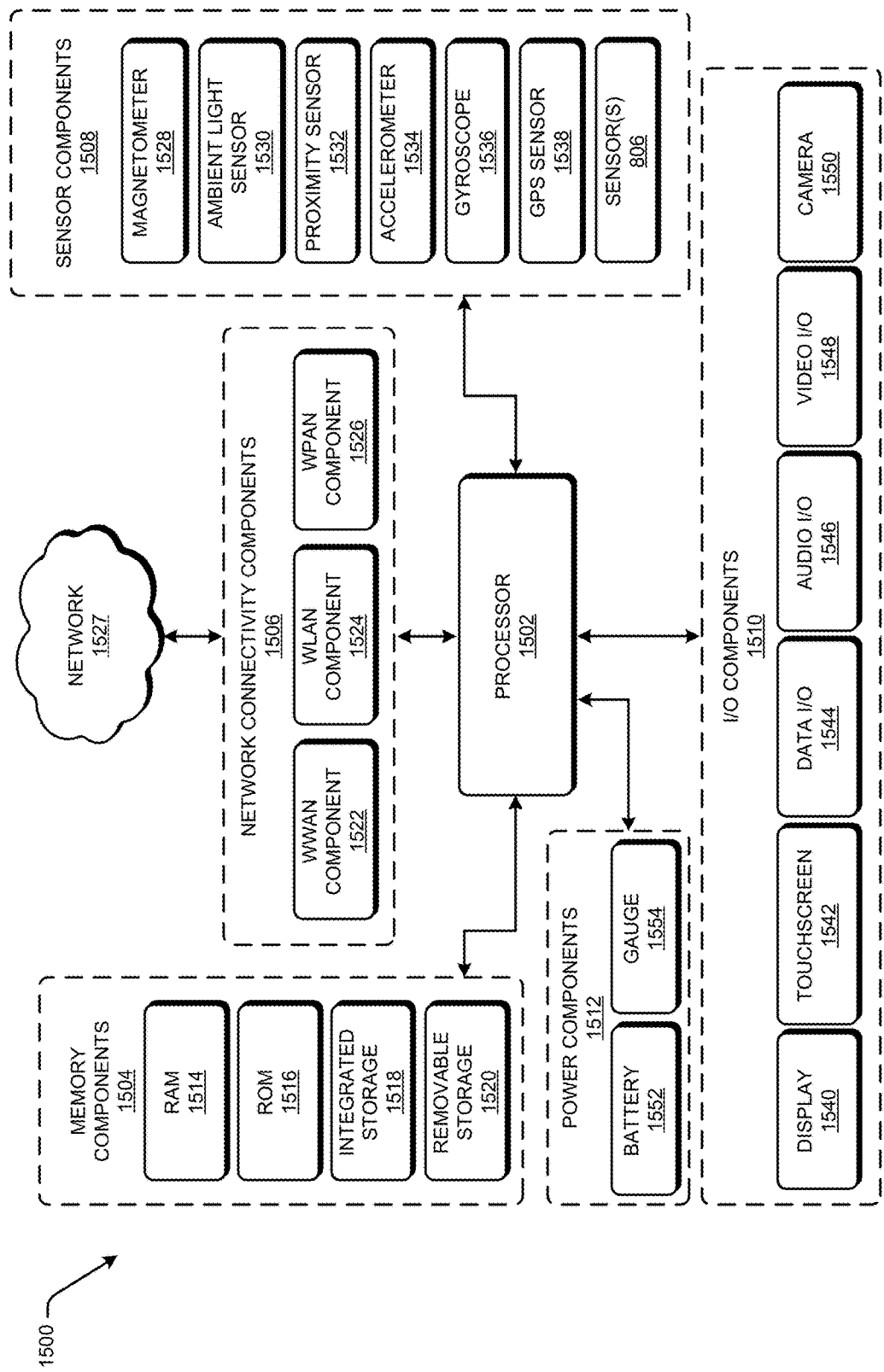
FIG. 15 is a schematic diagram illustrating another example computing device architecture usable to implement aspects of authentication based on gaze and physiological response to stimuli.

FIG. 15 is an illustrative computing device architecture 1500 for a computing device that is capable of executing various software components described which, in some examples, is usable to implement aspects of authenticating a user to a resource based gaze and physiological response to one or more images or other stimuli. The computing device architecture 1500 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices, portable video game devices, and the like. Moreover, aspects of the computing device architecture 1500 can be applicable to traditional desktop computers, portable computers (e.g., laptops, notebooks, ultraportables, and netbooks), server computers, vehicle computers, and other computer systems. By way of example and not limitation, the computing device architecture 1500 is applicable to any of the clients shown in FIGS. 1, 8, 9, 13, and 14 (e.g., servers 110 of service provider 102, computing devices 108, computing device 800, device 900, and/or devices 1406).

The computing device architecture 1500 illustrated in FIG. 15 includes a processor 1502, memory components 1504, network connectivity components 1506, sensor components 1508, input/output components 1510, and power components 1512. In the illustrated configuration, the processor 1502 is in communication with the memory components 1504, the network connectivity components 1506, the sensor components 1508, the input/output ("I/O") components 1510, and the power components 1512. Although no connections are shown between the individual components illustrated in FIG. 15, the components can interact to carry out device functions. In some configurations, the components are arranged so as to communicate via one or more busses (not shown).

The processor 1502 includes a central processing unit ("CPU") configured to process data, execute computer-executable instructions of one or more application programs, and communicate with other components of the computing device architecture 1500 in order to perform various functionality described herein. The processor 1502 can be utilized to execute aspects of the software components presented herein. In some examples, the processor 1502 can correspond to processor(s) 112, processor(s) 122, processor(s) 802, and/or CPU 1302, as described above in reference to FIGS. 1, 8, and 13.

In some configurations, the processor 1502 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1502 is configured to communicate with a discrete GPU (not shown). In some examples, the processor 1502 may additionally or alternatively comprise a holographic processing unit (HPU) which is designed specifically to process and integrate data from multiple sensors of a head mounted computing device and to handle tasks such as spatial mapping, gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1502 is, or is included in, a System-on-Chip ("SoC") along with one or more of the other components described herein below. For example, the SoC can include the processor 1502, a GPU, one or more of the network connectivity components 1506, and one or more of the sensor components 1508. In some configurations, the processor 1502 is fabricated, in part, utilizing a Package-on-Package ("PoP") integrated circuit packaging technique. The processor 1502 can be a single core or multi-core processor.

The processor 1502 can be created in accordance with an ARM architecture, available for license from ARM HOLDINGS of Cambridge, United Kingdom. Alternatively, the processor 1502 can be created in accordance with an x86 architecture, such as is available from INTEL CORPORATION of Mountain View, Calif. and others. In some configurations, the processor 1502 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1504 include a random access memory ("RAM") 1514, a read-only memory ("ROM") 1516, an integrated storage memory ("integrated storage") 1518, and a removable storage memory ("removable storage") 1520. In some configurations, the RAM 1514 or a portion thereof, the ROM 1516 or a portion thereof, and/or some combination the RAM 1514 and the ROM 1516 is integrated in the processor 1502. In some configurations, the ROM 1516 is configured to store a firmware, an operating system or a portion thereof (e.g., operating system kernel), and/or a bootloader to load an operating system kernel from the integrated storage 1518 and/or the removable storage 1520. In some examples, memory components 1504 can correspond to computer-readable media 114, computer-readable media 124, computer-readable media 804, memory 1304, as described above in reference to FIGS. 1, 8, and 13, respectively.

The integrated storage 1518 can include a solid-state memory, a hard disk, or a combination of solid-state memory and a hard disk. The integrated storage 1518 can be soldered or otherwise connected to a logic board upon which the processor 1502 and other components described herein also can be connected. As such, the integrated storage 1518 is integrated in the computing device. The integrated storage 1518 is configured to store an operating system or portions thereof, application programs, data, and other software components described herein.

The removable storage 1520 can include a solid-state memory, a hard disk, or a combination of solid-state memory and a hard disk. In some configurations, the removable storage 1520 is provided in lieu of the integrated storage 1518. In other configurations, the removable storage 1520 is provided as additional optional storage. In some configurations, the removable storage 1520 is logically combined with the integrated storage 1518 such that the total available storage is made available as a total combined storage capacity. In some configurations, the total combined capacity of the integrated storage 1518 and the removable storage 1520 is shown to a user instead of separate storage capacities for the integrated storage 1518 and the removable storage 1520.

The removable storage 1520 is configured to be inserted into a removable storage memory slot (not shown) or other mechanism by which the removable storage 1520 is inserted and secured to facilitate a connection over which the removable storage 1520 can communicate with other components of the computing device, such as the processor 1502. The removable storage 1520 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1504 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are also contemplated.

The network connectivity components 1506 include a wireless wide area network component ("WWAN component") 1522, a wireless local area network component ("WLAN component") 1524, and a wireless personal area network component ("WPAN component") 1526. The network connectivity components 1506 facilitate communications to and from the network 1527 or another network, which can be a WWAN, a WLAN, or a WPAN. Although only the network 1527 is illustrated, the network connectivity components 1506 can facilitate simultaneous communication with multiple networks, including the network 1527 of FIG. 15. For example, the network connectivity components 1506 can facilitate simultaneous communications with multiple networks via one or more of a WWAN, a WLAN, or a WPAN. In some examples, the network 1527 can correspond to all or part of network(s) 104, network 1332, and/or network 1404, as shown in FIGS. 1, 13, and 14.

The network 1527 can be or can include a WWAN, such as a mobile telecommunications network utilizing one or more mobile telecommunications technologies to provide voice and/or data services to a computing device utilizing the computing device architecture 1500 via the WWAN component 1522. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1527 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1527 can be configured to provide voice and/or data communications with any combination of the above technologies. The network 1527 can be configured to or adapted to provide voice and/or data communications in accordance with future generation technologies.

In some configurations, the WWAN component 1522 is configured to provide dual-multi-mode connectivity to the network 1527. For example, the WWAN component 1522 can be configured to provide connectivity to the network 1527, wherein the network 1527 provides service via GSM and UMTS technologies, or via some other combination of technologies. Alternatively, multiple WWAN components 1522 can be utilized to perform such functionality, and/or provide additional functionality to support other non-compatible technologies (i.e., incapable of being supported by a single WWAN component). The WWAN component 1522 can facilitate similar connectivity to multiple networks (e.g., a UMTS network and an LTE network).

The network 1527 can be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as WI-FI). Draft 802.15 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1524 is configured to connect to the network 1527 via the WI-FI access points. Such connections can be secured via various encryption technologies including, but not limited, WI-FI Protected Access ("WPA"), WPA2, Wired Equivalent Privacy ("WEP"), and the like.

The network 1527 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1526 is configured to facilitate communications with other devices, such as peripherals, computers, or other computing entities via the WPAN.

In at least one example, the sensor components 1508 can include a magnetometer 1528, an ambient light sensor 1530, a proximity sensor 1532, an accelerometer 1534, a gyroscope 1536, and a Global Positioning System sensor ("GPS sensor") 1538. Additionally, the sensor components 1508 can include any or all of the sensor(s) 126 and/or 806 as described above with reference to FIGS. 1 and 8. It is contemplated that other sensors, such as, but not limited to, temperature sensors or shock detection sensors, strain sensors, moisture sensors also can be incorporated in the computing device architecture 1500.

The magnetometer 1528 is configured to measure the strength and direction of a magnetic field. In some configurations the magnetometer 1528 provides measurements to a compass application program stored within one of the memory components 1504 in order to provide a user with accurate directions in a frame of reference including the cardinal directions, north, south, east, and west. Similar measurements can be provided to a navigation application program that includes a compass component. Other uses of measurements obtained by the magnetometer 1528 are contemplated.

The ambient light sensor 1530 is configured to measure ambient light. In some configurations, the ambient light sensor 1530 provides measurements to an application program stored within one the memory components 1504 in order to automatically adjust the brightness of a display to compensate for low-light and high-light environments. Other uses of measurements obtained by the ambient light sensor 1530 are contemplated.

The proximity sensor 1532 is configured to detect the presence of an object or thing in proximity to the computing device without direct contact. In some configurations, the proximity sensor 1532 detects the presence of a user's body (e.g., the user's face) and provides this information to an application program stored within one of the memory components 1504 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1528 are contemplated.

The accelerometer 1534 is configured to measure proper acceleration. In some configurations, output from the accelerometer 1534 is used by an application program as an input mechanism to control some functionality of the application program. For example, the application program can be a video game in which a character, a portion thereof, or an object is moved or otherwise manipulated in response to input received via the accelerometer 1534. In some configurations, output from the accelerometer 1534 is provided to an application program for use in switching between landscape and portrait modes, calculating coordinate acceleration, or detecting a fall. Other uses of the accelerometer 1534 are contemplated.

The gyroscope 1536 is configured to measure and maintain orientation. In some configurations, output from the gyroscope 1536 is used by an application program as an input mechanism to control some functionality of the application program. For example, the gyroscope 1536 can be used for accurate recognition of movement within a 3D environment of a video game application or some other application. In some configurations, an application program utilizes output from the gyroscope 1536 and the accelerometer 1534 to enhance control of some functionality of the application program. Other uses of the gyroscope 1536 are contemplated.

The GPS sensor 1538 is configured to receive signals from GPS satellites for use in calculating a location. The location calculated by the GPS sensor 1538 can be used by any application program that requires or benefits from location information. For example, the location calculated by the GPS sensor 1538 can be used with a navigation application program to provide directions from the location to a destination or directions from the destination to the location. Moreover, the GPS sensor 1538 can be used to provide location information to an external location-based service, such as E1515 service. The GPS sensor 1538 can obtain location information generated via WI-FI, WIMAX, and/or cellular triangulation techniques utilizing one or more of the network connectivity components 1506 to aid the GPS sensor 1538 in obtaining a location fix. The GPS sensor 1538 can also be used in Assisted GPS ("A-GPS") systems.

In at least one example, the I/O components 1510 can correspond to the input interface(s) 808 and/or output interface(s) 810, described above with reference to FIG. 8. Additionally and/or alternatively, the I/O components can include a display 1540, a touchscreen 1542, a data I/O interface component ("data I/O") 1544, an audio I/O interface component ("audio I/O") 1546, a video I/O interface component ("video I/O") 1548, and a camera 1550. In some configurations, the display 1540 and the touchscreen 1542 are combined. In some configurations two or more of the data I/O component 1544, the audio I/O component 1546, and the video I/O component 1548 are combined. The I/O components 1510 can include discrete processors configured to support the various interface described below, or can include processing functionality built-in to the processor 1502.

The display 1540 is an output device configured to present information in a visual form. In particular, the display 1540 can present graphical user interface ("GUI") elements, text, photographs, images, video, notifications, virtual buttons, virtual keyboards, messaging data, Internet content, device status, time, date, calendar data, preferences, map information, location information, and any other information that is capable of being presented in a visual form. In some configurations, the display 1540 is a liquid crystal display ("LCD") utilizing any active or passive matrix technology and any backlighting technology (if used). In some configurations, the display 1540 is an organic light emitting diode ("OLED") display. In some configurations, the display 1540 is a holographic display. Other display types are contemplated.

In at least one example, the display 1540 can correspond to the hardware display surface 822 and/or hardware display surface 902. As described above, the hardware display surface 822 and the hardware display surface 902 can be configured to graphically associate holographic user interfaces and other graphical elements with an object seen through the hardware display surface or rendered objects displayed on the hardware display surface. Additional features associated with the hardware display device 822 and the hardware display surface 902 are described above with reference to FIGS. 8 and 9, respectively.

The touchscreen 1542, also referred to herein as a "touch-enabled screen," is an input device configured to detect the presence and location of a touch. The touchscreen 1542 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1542 is incorporated on top of the display 1540 as a transparent layer to enable a user to use one or more touches to interact with objects or other information presented on the display 1540. In other configurations, the touchscreen 1542 is a touch pad incorporated on a surface of the computing device that does not include the display 1540. For example, the computing device can have a touchscreen incorporated on top of the display 1540 and a touch pad on a surface opposite the display 1540.

In some configurations, the touchscreen 1542 is a single-touch touchscreen. In other configurations, the touchscreen 1542 is a multi-touch touchscreen. In some configurations, the touchscreen 1542 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1542. As such, a developer can create gestures that are specific to a particular application program.

In some configurations, the touchscreen 1542 supports a tap gesture in which a user taps the touchscreen 1542 once on an item presented on the display 1540. The tap gesture can be used to perform various functions including, but not limited to, opening or launching whatever the user taps. In some configurations, the touchscreen 1542 supports a double tap gesture in which a user taps the touchscreen 1542 twice on an item presented on the display 1540. The double tap gesture can used to perform various functions including, but not limited to, zooming in or zooming out in stages. In some configurations, the touchscreen 1542 supports a tap and hold gesture in which a user taps the touchscreen 1542 and maintains contact for at least a pre-defined time. The tap and hold gesture can be used to perform various functions including, but not limited to, opening a context-specific menu.

In some configurations, the touchscreen 1542 supports a pan gesture in which a user places a finger on the touchscreen 1542 and maintains contact with the touchscreen 1542 while moving the finger on the touchscreen 1542. The pan gesture can be used to perform various functions including, but not limited to, moving through screens, images, or menus at a controlled rate. Multiple finger pan gestures are also contemplated. In some configurations, the touchscreen 1542 supports a flick gesture in which a user swipes a finger in the direction the user wants the screen to move. The flick gesture can be used to perform various functions including, but not limited to, scrolling horizontally or vertically through menus or pages. In some configurations, the touchscreen 1542 supports a pinch and stretch gesture in which a user makes a pinching motion with two fingers (e.g., thumb and forefinger) on the touchscreen 1542 or moves the two fingers apart. The pinch and stretch gesture can be used to perform various functions including, but not limited to, zooming gradually in or out of a website, map, or picture.

Although the above gestures have been described with reference to the use of one or more fingers for performing the gestures, other appendages such as toes or objects such as styluses can be used to interact with the touchscreen 1542. As such, the above gestures should be understood as being illustrative and should not be construed as being limited in any way.

The data I/O interface component 1544 is configured to facilitate input of data to the computing device and output of data from the computing device. In some configurations, the data I/O interface component 1544 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1546 is configured to provide audio input and/or output capabilities to the computing device. In some configurations, the audio I/O interface component 1546 includes a microphone configured to collect audio signals. In some configurations, the audio I/O interface component 1546 includes a headphone jack configured to provide connectivity for headphones or other external speakers. In some configurations, the audio I/O interface component 1546 includes a speaker for the output of audio signals. In some configurations, the audio I/O interface component 1546 includes an optical audio cable out.

The video I/O interface component 1548 is configured to provide video input and/or output capabilities to the computing device. In some configurations, the video I/O interface component 1548 includes a video connector configured to receive video as input from another device (e.g., a video media player such as a DVD or BLURAY player) or send video as output to another device (e.g., a monitor, a television, or some other external display). In some configurations, the video I/O interface component 1548 includes a High-Definition Multimedia Interface ("HDMI"), mini-HDMI, micro-HDMI, DisplayPort, or proprietary connector to input/output video content. In some configurations, the video I/O interface component 1548 or portions thereof is combined with the audio I/O interface component 1546 or portions thereof.

The camera 1550 can be configured to capture still images and/or video. The camera 1550 can utilize a charge coupled device ("CCD") or a complementary metal oxide semiconductor ("CMOS") image sensor to capture images. In some configurations, the camera 1550 includes a flash to aid in taking pictures in low-light environments. Settings for the camera 1550 can be implemented as hardware or software buttons. Images and/or video captured by camera 1550 may additionally or alternatively be used to detect non-touch gestures, facial expressions, eye movement, or other movements and/or characteristics of the user. The camera may correspond to represent the gaze tracking camera or sensor(s) 806A or the environmental camera 806B of FIG. 8, or may be an additional or alternative camera.

Although not illustrated, one or more hardware buttons can also be included in the computing device architecture 1500. The hardware buttons can be used for controlling some operational aspect of the computing device. The hardware buttons can be dedicated buttons or multi-use buttons. The hardware buttons can be mechanical or sensor-based.

The illustrated power components 1512 include one or more batteries 1552, which can be connected to a battery gauge 1554. The batteries 1552 can be rechargeable or disposable. Rechargeable battery types include, but are not limited to, lithium polymer, lithium ion, nickel cadmium, and nickel metal hydride. Each of the batteries 1552 can be made of one or more cells.

The battery gauge 1554 can be configured to measure battery parameters such as current, voltage, and temperature. In some configurations, the battery gauge 1554 is configured to measure the effect of a battery's discharge rate, temperature, age and other factors to predict remaining life within a certain percentage of error. In some configurations, the battery gauge 1554 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1512 can also include a power connector, which can be combined with one or more of the aforementioned I/O components 1510. The power components 1512 can interface with an external power system or charging equipment via a power I/O component.

Example Gaze-Based Authentication Techniques

Figure 16:
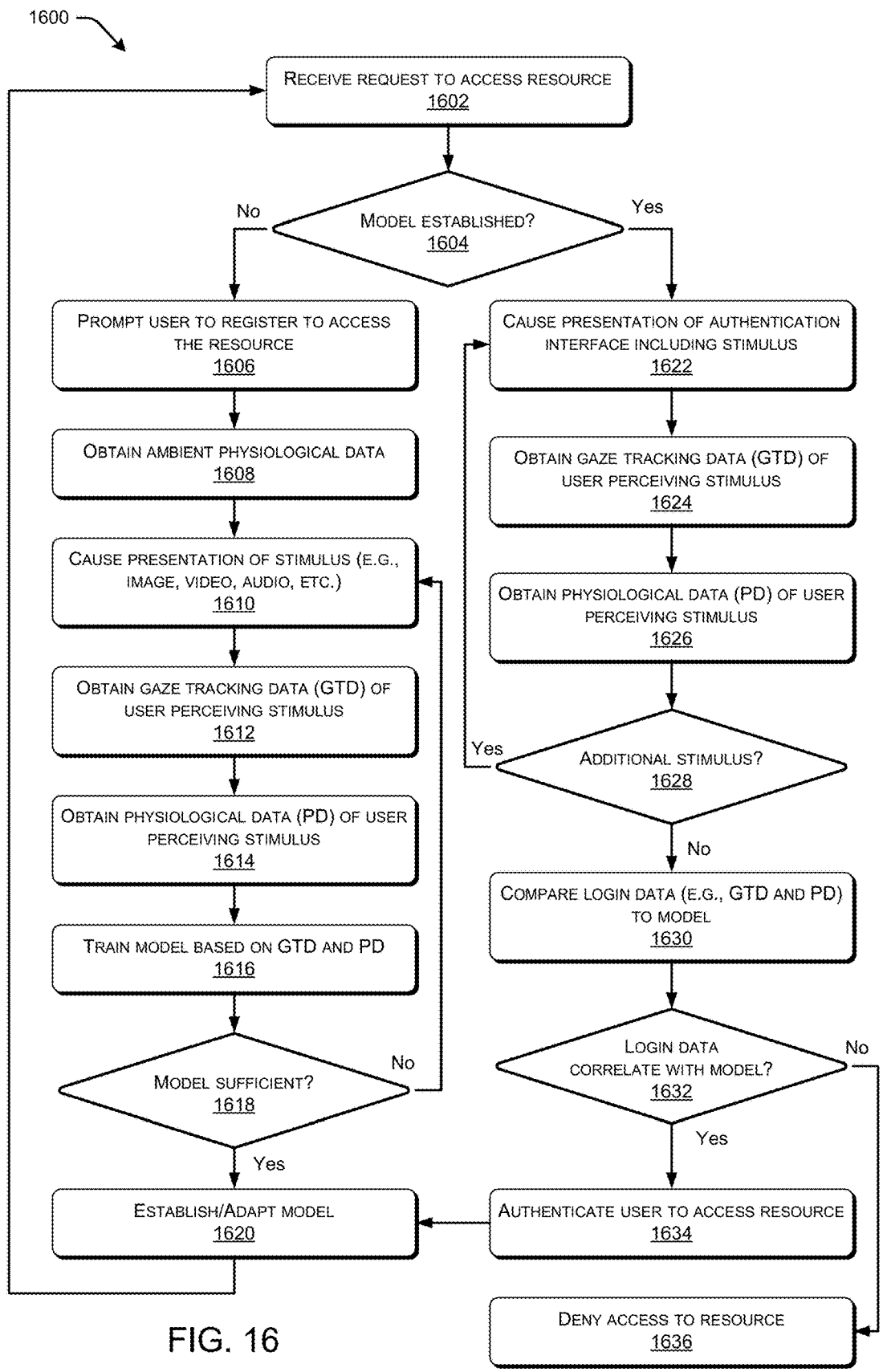
FIG. 16 is a flowchart illustrating aspects of an example process for establishing a machine learning model and/or authenticating a user to a resource based on gaze and physiological response to stimuli.

FIG. 16 is a flowchart illustrating an example process 1600 for authenticating a user to a resource based gaze and physiological response to one or more images or other stimuli. The process can be implemented using one or more of the devices and/or computing architectures described herein. The techniques are described in the context of the environment 100 of FIG. 1 for convenience, but the techniques are not limited to use in the environment or with the devices shown in FIG. 1. Rather the techniques of FIG. 16 are applicable to other environments and devices including those shown in FIGS. 1, 8, 9, 13, 14, and 15, as well as other environments and computing devices.

The process described below with reference to FIG. 16 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 16 illustrates an example process 1600 to implement gaze-based authentication. Block 1602 illustrates receiving a request by a user to access a resource. In some examples, the resource may comprise a computing resource, such as a resource available from a remote service provider (e.g., service provider 102), a local computing resource such as access to a computing device (e.g., one of computing devices 108), or an application or other resource available from a local and/or remote computing device or service. In other examples, the resource may comprise a physical resource such as access to building, room, object, or other physical item. Whether the resource is a computing resource or a physical resource, access to the resource may be controlled at least in part by a computing device. For instance, a user may seek to access a resource of computing devices 108. Alternatively, the user may seek to use one of computing devices 108 to access a resource available from the service provider 102 and/or one or more other computing devices. In some examples, the request may include information (e.g., a login name, phone number, photograph, image, etc.) identifying the user that is attempting to login. In other examples (e.g., examples in which the computing device has only a single authorized user), the request may not include any information identifying the user.

At block 1604, the computing device (e.g., one of computing devices 108, a server 110 of the service provider 102, or another computing device) determines whether or not a machine learning model has been established for authenticating the user to access the resource. If a model exists for the user, the computing device proceeds to an authentication phase described with reference to blocks 1622-1636 below. If, at block 1604, a model has not previously been established for the user to access the resource, the computing device may initiate a model establishment phase described with reference to blocks 1606-1620.

At block 1606, the user may be prompted to register to access the resource. The prompt may include instructions for how to register to access the resource. For instance, the instructions may ask the user to view or otherwise perceive one or more stimuli in order to establish and train a machine learning model for accessing the resource. The instructions may also inform the user that the registration process involves tracking gaze and physiological responses of the user while perceiving the stimuli. In some examples, the user may be required to affirmatively opt it to the collection of such gaze tracking and physiological data. In other examples, the user may be given the option to opt out of the collection of the collection of such gaze tracking and physiological data. In either case, the user may, in some examples, be given alternate authentication options for accessing the resource (e.g., password, certificate, biometric authentication, or other conventional authentication credentials). The prompting may be in the form of a visual instruction presented in a computer generated information pane, in the form of audible instructions, both audible and visual, or by other means. The computing device may also specify a number (or a minimum number) of stimuli that the user is to perceive to establish and/or train the model. In other examples, the number of stimuli may be unspecified. The number of stimuli may depend on, for example, the intensity and uniqueness of the user's gaze and physiological response to the stimuli, a level of security required, a complexity of the stimuli, accuracy of the gaze tracking camera and/or physiological sensors, or other factors. Examples of each of various stimuli are described in detail with reference to FIGS. 2-7.

At block 1608, the computing device may obtain information about the user, including ambient or background measurement of one or more physiological conditions of the user. The information about the user may additionally or alternatively include user name, address, contact information, demographic information, biometric information, or other identifying information. In some examples, the ambient measurement of the physiological condition may be obtained in response to a null stimulus (e.g., stimulus 204(1) in FIG. 2) designed not to invoke a physiological response from the user in order to obtain a baseline or control measurement of the physiological condition(s). In that case, the null stimulus may comprise a blank screen, a screen having a cool or soothing color, text (e.g., a letter, number, word, or symbol), a visual target for the user to focus his or her gaze on, or the like. In other examples, null stimulus may include an instruction (audio or textual) for the user to close his or her eyes for a period of time (e.g., 1-5 seconds) during which time the baseline or ambient measurement of the physiological condition can be made. Depending on the physiological condition(s) being measured, the ambient measurement of the user's physiological condition(s) may provide a unique signature of the user. For instance, when multiple neurological or other physiological conditions are measured, the combination of physiological conditions may provide a unique physiological signature of the user. In other instances, the ambient measurement of the user's physiological condition may not be unique to the user. The ambient measurement of the user's physiological condition may or may not be used to train the model.

At block 1610, the computing device causes presentation of the one or more stimuli on a display screen, speaker, or other output of (or accessible to) the computing device. The stimuli may include photographs or other images, video, audio, text, and/or other stimuli. Where multiple stimuli are used, the stimuli may be of the same type (e.g., multiple images, or multiple audio clips, or multiple video clips) or different types (e.g., multiple stimuli including some images, some audio clips, and some videos). Also, multiple stimuli can be presented sequentially, concurrently, or a combination of both sequential and concurrent presentation (e.g., some stimuli presented sequentially and other stimuli presented concurrently).

At block 1612, the computing device obtains gaze tracking data corresponding to gaze of the user responsive to the stimuli. The gaze tracking data may be obtained from a gaze tracking camera of (or in communication with) the computing device (e.g., sensor(s) 126 or gaze tracking camera 806A). The gaze tracking data may correspond to gaze of the user at a time the user is viewing an image or other stimulus (e.g., stimulus 204(2) in FIG. 2).

At block 1614, the computing device obtains physiological data corresponding to measurement of one or more physiological conditions of the user responsive to the stimuli. The physiological data may be obtained from a physiological sensor of (or in communication with) the computing device (e.g., sensor(s) 126, physiological sensor(s) 806C) and/or another computing device (e.g., wearable device 108(4)). The physiological data may include a measurement of a physiological condition of the user at the time that the user is viewing the image or other stimulus (e.g., stimulus 204(2) in FIG. 2). By way of example and not limitation, the physiological sensor may include a neural sensor such as an electroencephalography (EEG) sensor, a magnetoencephalography (MEG) sensor, a functional near-infrared spectroscopy (fNIRS) sensor to measure one or more signals representing brain state or activity of the user. Other non-limiting examples of the physiological sensor include a skin galvanometer, a pupil scanner, an electrocardiogram (EKG), or a photoplethysmography sensor.

At block 1616, the computing device can train a machine learning model for the user based upon the gaze tracking data and the physiological data. In some examples, the model may also take into account other information, such as the ambient measurement of physiological condition(s) of the user prior to being presented with the stimuli, demographic information about the user (e.g., age, gender, etc.), facial expression of the user, voice data (e.g., tone, inflection, volume, etc.) of the user, or the like. In some examples, the computing device may train the machine learning model locally. In other examples, the computing device may transmit the gaze tracking data and/or physiological data to a provider of the resource (e.g., the service provider 102) or other entity to establish and/or train the machine learning model for the user.

At block 1618, the computing device (or other entity responsible for establishing/training the machine learning model) may determine whether or not the model is sufficiently trained. Whether or not the model is sufficiently trained may depend upon the magnitude or strength of the user's physiological response to the stimuli, a number of different physiological conditions measured, a sensitivity of measurement of physiological condition(s), a level of security required for access to the resource, acceptable levels of false positive (an entity falsely authenticated when they should not have been) and/or false negative (a user not being authenticated—being denied access—when he or she should have been authenticated), or the like. In some examples, the existence of additional stimuli upon which the model can be trained may also be taken into account when determining whether the model is sufficiently trained.

If the model is not sufficiently trained and/or additional stimuli exist for training the model, the process 1600 may repeat operations 1610-1618 for one or more additional stimuli until the model is sufficiently trained or until the model has been trained based on available stimuli, or both.

If, at block 1618, the model is sufficiently trained, the process 1600 proceeds to block 1620, where the machine learning model for the user is established for the user and stored in association with the resource. The model may be stored in memory of the computing device (e.g., computer-readable media 124 or 804), a provider of the resource (e.g., computer-readable media 114), or another computing device.

Thereafter, when the user attempts to access the resource, the process proceeds to block 1602, at which the computing device receives the request to access the resource. At block 1604, the computing device determines that a model already exists for the user, and proceeds with an authentication phase according to blocks 1622-1636.

At block 1622, responsive to receiving the request to access the resource, the computing device causes presentation of an authentication interface (e.g., authentication interface 312 of FIG. 3) including one or more images or other stimuli. As discussed above, when multiple stimuli are presented, the stimuli can include one or multiple types of stimuli and can be presented sequentially, concurrently, or a combination of sequentially and concurrently. The stimuli can include salient stimuli, upon which the model of the user is based, and/or non-salient or filler stimuli upon which the model is not based. The order in which the stimuli are presented may be the same as or different than the order in which the images were presented during training of the model.

At block 1624, the computing device obtains, from the gaze tracking camera or other sensor, login gaze tracking data corresponding to gaze of the user at a time that the user is viewing an image or other stimulus via the authentication interface. At block 1626, the computing device obtains, from the physiological sensor(s), measurement of physiological condition(s) of the user at the time that the user is viewing the image or other stimulus via the authentication interface. Tracking the user's gaze in addition to the user's physiological response ensures that the person attempting to access the resource is looking at the image being presented and not some other picture that evokes the same feeling in an attempt to fraudulently access the resource.

At block 1628, the computing device determines whether or not additional stimuli are to be presented via the authentication interface in order to authenticate the user to access the resource. In some examples, a predetermined number of one or more stimuli may be needed authenticate the user to access the resource. In other examples, a number of stimuli needed to authenticate the user to access the resource may be determined based at least in part on a strength, magnitude, uniqueness, or other characteristic of the user's response to the stimulus, as determined by the measurement of physiological condition(s) of the user at the time that the user is viewing the image or other stimulus. In that case, the stronger or more unique the user's response to a stimulus the fewer number of stimuli that may be needed to authenticate the user. If the computing device determines that additional stimuli are to be presented via the authentication interface, operations 1622-1628 may be repeated until the no additional stimuli are to be presented via the authentication interface. If at block 1628, the computing device determines that no additional stimuli are to be presented via the authentication interface, the process proceeds to block 1630.

At block 1630, the computing device compares the login data, including the user's gaze tracking data and the physiological data at the time(s) that the user is viewing the image(s) or other stimul(us/i) via the authentication interface, with the model. At block 1632, the computing device determines, based at least in part on the comparison at block 1630, whether the login data (e.g., login gaze tracking data and the measurement of the physiological condition of the user at the time that the user is viewing the image via the authentication interface) correlate with the model. If the login data is found to correlate with the model, at block 1634, the computing device authenticates the user to access the resource. In some examples, the process 1600 may also return to block 1620 to update or adapt the model based on the gaze tracking data and the measurement of the physiological condition of the user at the time that the user is viewing the image via the authentication interface. In that way, if the user's physiological response to a particular stimulus changes over time, the model can be adapted to the user's changed response. Additionally, the model can be updated or adapted based on gaze tracking data and the measurement of the physiological condition of the user at the time that the user is viewing one or more filler images or filler stimuli. In this way, the model can be expanded by training the model based on the login data corresponding to the user viewing filler images or filler stimuli presented via the authentication interface. Once the model has been trained based on the filler stimuli, the filler stimuli become salient stimuli upon which the model is based for subsequent authentication attempts. If, at block 1632, the login data is found not to correlate with the model for the user, access to the resource may be denied.

As noted above, the order in which the operations are described is not intended to be construed as a limitation, and any number of the described blocks can be combined in any order and/or in parallel to implement the processes. For example, the comparison operation of block 1630 is described as occurring after the all of the stimuli have been presented. However, in other examples, the comparison of block 1630 and/or the determination of block 1632 can be performed for each stimulus before presenting an additional stimulus via the authentication interface. In that case, the computing device may determine whether to present additional stimuli based on results of the comparison (e.g., based on a degree to which the login data for the stimulus already presented correlates to the model). For instance, if there is a high degree of correlation between the login information and/or the response to the already presented stimulus was strong, then the computing device may determine that additional stimuli need not be presented in order to authenticate the user. In contrast, if the degree of correlation between the login information and the model is lower and/or the user's response to the already presented stimulus was weak, the computing device may determine that additional login data is necessary to determine whether to authenticate the user to access the resource and, therefore, additional stimuli are to be presented via the authentication interface.

Using the foregoing techniques, computing devices can quickly and accurately authenticate users to access a resource. The techniques are seamless and unobtrusive to a user, requiring little or no cognitive or physical action on the part of the user. There is no authentication credential that could be lost or stolen. And, in at least some instances, the neurological or other physiological response to certain stimuli are unique and personal to the user, making it difficult for the response to be spoofed or reproduced by other humans and/or computers.

Example Clauses

The disclosure presented herein can be considered in view of the following example clauses.

A. In some examples, a system comprises: a display to present one or more images to a user; a gaze tracking camera to track a gaze of the user; a physiological sensor to monitor a physiological condition of the user; one or more processors communicatively coupled to the display, the gaze tracking camera, and the physiological sensor; and memory having computer-executable instructions stored thereon which, when executed by the one or more processors, cause the computing device to perform operations comprising: causing presentation, on the display, of an image; obtaining, from the gaze tracking camera, gaze tracking data corresponding to gaze of the user at a time the user is viewing the image; obtaining, from the physiological sensor, a measurement of a physiological condition of the user at the time that the user is viewing the image; establishing a model based at least in part on the gaze tracking data of the user and the measurement of the physiological condition of the user at the time that the user is viewing the image; associating the model with a resource; and storing the model in memory.

B. The system of paragraph A, wherein the physiological sensor comprises at least one of: an electroencephalography (EEG) sensor; a magnetoencephalography (MEG) sensor; a functional near-infrared spectroscopy (fNIRS) sensor; a skin galvanometer; a pupil scanner; or an electrocardiogram (EKG).

C. The system of paragraph A, wherein the physiological sensor comprises a neurological sensor and the measurement of the physiological condition comprises measurement of a signal representing a brain state of the user.

D. The system of paragraph C, wherein the neurological sensor comprises an electroencephalograph (EEG) sensor, a magnetoencephalography (MEG) sensor, or a functional near-infrared spectroscopy (fNIRS) sensor.

E. The system of any one of paragraphs A-D, the operations further comprising obtaining an ambient measurement of the physiological condition prior to causing presentation of the image on the display, wherein the model is further based at least in part on the ambient measurement of the physiological condition.

F. The system of any one of paragraphs A-E, the operations further comprising: causing presentation of an additional image on the display; obtaining, from the gaze tracking camera, additional gaze tracking data corresponding to gaze of the user at a time the user is viewing the additional image; obtaining, from the physiological sensor, a measurement of the physiological condition of the user at the time that the user is viewing the additional image; and updating the model based on the additional gaze tracking data and the measurement of the physiological condition of the user at the time that the user is viewing the additional image.

G. The system of any one of paragraphs A-F, the operations further comprising: receiving a request by the user to access the resource; responsive to receiving the request to access the resource, causing presentation, on the display, of the image via an authentication interface; obtaining, from the gaze tracking camera, login gaze tracking data corresponding to gaze of the user at a time that the user is viewing the image via the authentication interface; obtaining, from the physiological sensor, a measurement of a physiological condition of the user at the time that the user is viewing the image via the authentication interface; comparing the login gaze tracking data and the measurement of the physiological condition of the user at the time that the user is viewing the image via the authentication interface, with the model; and determining, based on the comparing, that the login gaze tracking data and the measurement of the physiological condition of the user at the time that the user is viewing the image via the authentication interface correlate with the model; and based at least in part on the determining, authenticating the user to access the resource.

H. The system of any one of paragraphs A-G, the operations further comprising: obtaining, from the gaze tracking camera, gaze tracking data corresponding to gaze of the user viewing the image via the authentication interface; obtaining, from the physiological sensor, measurement of a physiological condition of the user at the time that the user is viewing the image via the authentication interface; and updating the model based on the gaze tracking data and the measurement of the physiological condition of the user at the time that the user is viewing the image via the authentication interface.

I. The system of any one of paragraphs A-H, the operations further comprising causing presentation of a filler image via the authentication interface before, concurrently with, or after causing presentation of the image via the authentication interface, wherein the authenticating is performed without regard to gaze and physiological condition of the user when viewing the filler image via the authentication interface.

J. The system of any one of paragraphs A-H, the operations further comprising: obtaining, from the gaze tracking camera, gaze tracking data corresponding to gaze of the user viewing the filler image via the authentication interface; obtaining, from the physiological sensor, measurement of a physiological condition of the user at the time that the user is viewing the filler image via the authentication interface; and updating the model based on the gaze tracking data and the measurement of the physiological condition of the user at the time that the user is viewing the filler image.

K. The system of any one of paragraphs A-J, wherein causing presentation of the image via the authentication interface comprises causing presentation of the image for at least about 300 milliseconds and at most about 1 second.

L. The system of any one of paragraphs A-K, further comprising a head-mounted computing assembly, and the display, the gaze tracking camera, and the physiological sensor are integral with or physically coupled to the head-mounted assembly.

M. The system of paragraph L, wherein the one or more processors and the memory are integral with or physically coupled to the head-mounted assembly.

N. The system of any one of paragraphs A-K, further comprising an enclosure housing the one or more processors and memory, and wherein the physiological sensor is separate and physically remote from the enclosure to measure the physiological condition of the user.

O. The system of paragraph N, wherein the display and the gaze tracking camera are integral with or physically proximate to the enclosure.

P. A computer-implemented method comprises: receiving a request by a user to access a resource; responsive to receiving the request to access the resource, causing presentation, on a display, of an image via an authentication interface; obtaining, from a gaze tracking camera, login gaze tracking data corresponding to gaze of the user at a time that the user is viewing the image via the authentication interface; obtaining, from a physiological sensor, a measurement of a physiological condition of the user at the time that the user is viewing the image via the authentication interface; comparing the login gaze tracking data and the measurement of the physiological condition of the user at the time that the user is viewing the image via the authentication interface, with a model representative of gaze of the user and physiological condition of the user at a previous time that the user viewed the image; determining, based on the comparing, that the login gaze tracking data and the measurement of the physiological condition of the user at the time that the user is viewing the image via the authentication interface correlate with the model; and based at least in part on the determining, authenticating the user to access the resource.

Q. The computer-implemented method of paragraph P, further comprising: obtaining, from the gaze tracking camera, gaze tracking data corresponding to gaze of the user viewing the image via the authentication interface; obtaining, from the physiological sensor, measurement of a physiological condition of the user at the time that the user is viewing the image via the authentication interface; and updating the model based on the gaze tracking data and the measurement of the physiological condition of the user at the time that the user is viewing the image via the authentication interface.

R. The computer-implemented method of any one of paragraphs P or Q, further comprising causing presentation of a filler image via the authentication interface before, concurrently with, or after causing presentation of the image via the authentication interface, wherein the authenticating is performed without regard to gaze and physiological condition of the user when viewing the filler image via the authentication interface.

S. The computer-implemented method of any one of paragraphs P-R, further comprising: obtaining, from the gaze tracking camera, gaze tracking data corresponding to gaze of the user viewing the filler image via the authentication interface; obtaining, from the physiological sensor, measurement of a physiological condition of the user at the time that the user is viewing the filler image via the authentication interface; and updating the model based on the gaze tracking data and the measurement of the physiological condition of the user at the time that the user is viewing the filler image.

T. The computer-implemented method of any one of paragraphs P-S, wherein causing presentation of the image via the authentication interface comprises causing presentation of the image for at least about 300 milliseconds and at most about 1 second.

U. The computer-implemented method of any one of paragraphs P-T, wherein the physiological sensor comprises at least one of: an electroencephalography (EEG) sensor; a magnetoencephalography (MEG) sensor; a functional near-infrared spectroscopy (fNIRS) sensor; a skin galvanometer; a pupil scanner; or an electrocardiogram (EKG).

V. The computer-implemented method of any one of paragraphs P-T, wherein the physiological sensor comprises a neurological sensor and the measurement of the physiological condition comprises measurement of a signal representing a brain state of the user.

W. The computer-implemented method of any one of paragraphs P-T, wherein the physiological sensor comprises at least one of an electroencephalograph (EEG) sensor, a magnetoencephalography (MEG) sensor, or a functional near-infrared spectroscopy (fNIRS) sensor.

X. The computer-implemented method of any one of paragraphs P-W, further comprising obtaining an ambient measurement of the physiological condition after receiving the request to access the resource and prior to causing presentation of the image on the display via the authentication interface, wherein: the model is further based at least in part on an ambient measurement of physiological condition of the user prior to receiving the request to access the resource; the comparing further comprises comparing the ambient measurement of the physiological condition with the model; and the determining further comprises determining that the ambient measurement of the physiological condition correlates with the model.

Y. The computer-implemented method of any one of paragraphs P-X, the operations further comprising: causing presentation of an additional image via the authentication interface; obtaining, from the gaze tracking camera, additional login gaze tracking data corresponding to gaze of the user at a time the user is viewing the additional image via the authentication interface; obtaining, from the physiological sensor, a measurement of the physiological condition of the user at the time that the user is viewing the additional image via the authentication interface, wherein: the model is further based at least in part on the additional login gaze tracking data and the measurement of the physiological condition of the user at the time that the user is viewing the additional image via the authentication interface; the comparing further comprises comparing the additional login gaze tracking data and the measurement of the physiological condition of the user at the time that the user is viewing the additional image via the authentication interface with the model; and the determining further comprises determining that the additional login gaze tracking data and the measurement of the physiological condition of the user at the time that the user is viewing the additional image via the authentication interface correlates with the model.

Z. A head-mounted computing device comprises: a display to present one or more images to a user; a gaze tracking camera to track a gaze of the user; a physiological sensor to monitor a physiological condition of the user; one or more processors communicatively coupled to the display, the gaze tracking camera, and the physiological sensor; and memory having computer-executable instructions stored thereon which, when executed by the one or more processors, cause the computing device to perform operations comprising: receiving a request by the user to access a resource; responsive to receiving the request to access the resource, causing presentation, on the display, of an image via an authentication interface; obtaining, from the gaze tracking camera, login gaze tracking data corresponding to gaze of the user at a time that the user is viewing the image via the authentication interface; obtaining, from the physiological sensor, a measurement of a physiological condition of the user at the time that the user is viewing the image via the authentication interface; and determining, based on the login gaze tracking data, the measurement of the physiological condition, and a model of user gaze tracking data and physiological condition, whether to authenticate the user to access the resource.

AA. The head-mounted computing device of paragraph Z, the operations further comprising: obtaining, from the gaze tracking camera, gaze tracking data corresponding to gaze of the user viewing the image via the authentication interface; obtaining, from the physiological sensor, measurement of a physiological condition of the user at the time that the user is viewing the image via the authentication interface; and updating the model based on the gaze tracking data and the measurement of the physiological condition of the user at the time that the user is viewing the image via the authentication interface.

BB. The head-mounted computing device of any one of paragraphs Z or AA, the operations further comprising causing presentation of a filler image via the authentication interface before, concurrently with, or after causing presentation of the image via the authentication interface, wherein the authenticating is performed without regard to gaze and physiological condition of the user when viewing the filler image via the authentication interface.

CC. The head-mounted computing device of paragraph BB, the operations further comprising: obtaining, from the gaze tracking camera, gaze tracking data corresponding to gaze of the user viewing the filler image via the authentication interface; obtaining, from the physiological sensor, measurement of a physiological condition of the user at the time that the user is viewing the filler image via the authentication interface; and updating the model based on the gaze tracking data and the measurement of the physiological condition of the user at the time that the user is viewing the filler image.

DD. The head-mounted computing device of any one of paragraphs Z-CC, wherein causing presentation of the image via the authentication interface comprises causing presentation of the image for at least about 300 milliseconds and at most about 1 second.

EE. The head-mounted computing device of any one of paragraphs Z-DD, wherein the physiological sensor comprises at least one of: an electroencephalography (EEG) sensor; a magnetoencephalography (MEG) sensor; a functional near-infrared spectroscopy (fNIRS) sensor; a skin galvanometer; a pupil scanner; or an electrocardiogram (EKG).

FF. The head-mounted computing device of any one of paragraphs Z-DD, wherein the physiological sensor comprises a neurological sensor and the measurement of the physiological condition comprises measurement of a signal representing a brain state of the user.

GG. The head-mounted computing device of any one of paragraphs Z-DD, wherein the neurological sensor comprises at least one of an electroencephalograph (EEG) sensor, a magnetoencephalography (MEG) sensor, or a functional near-infrared spectroscopy (fNIRS) sensor.

HH. The head-mounted computing device of any one of paragraphs Z-GG, the operations further comprising obtaining an ambient measurement of the physiological condition after receiving the request to access the resource and prior to causing presentation of the image on the display via the authentication interface, wherein: the model is further based at least in part on an ambient measurement of physiological condition of the user prior to receiving the request to access the resource; and the determining is further based on the ambient measurement of the physiological condition.

II. The head-mounted computing device of any one of paragraphs Z-HH, the operations further comprising: causing presentation of an additional image via the authentication interface; obtaining, from the gaze tracking camera, additional login gaze tracking data corresponding to gaze of the user at a time the user is viewing the additional image via the authentication interface; obtaining, from the physiological sensor, a measurement of the physiological condition of the user at the time that the user is viewing the additional image via the authentication interface, wherein: the model is further based at least in part on the additional login gaze tracking data and the measurement of the physiological condition of the user at the time that the user is viewing the additional image via the authentication interface; and the determining is further based on the additional login gaze tracking data and the measurement of the physiological condition of the user at the time that the user is viewing the additional image via the authentication interface.

JJ. The head-mounted computing device of paragraph II, wherein the determining comprises determining to authenticate the user to access the resource, and the operations further comprising authenticating the user to access the resource.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system comprising:
a display;
a gaze tracking camera to track a gaze of a user;
a physiological sensor to monitor a physiological condition of the user;
one or more processors communicatively coupled to the display, the gaze tracking camera, and the physiological sensor; and
memory having computer-executable instructions stored thereon which, when executed by the one or more processors, cause the computing device to perform operations comprising:
    causing presentation, on the display, of multiple images;
    obtaining, from the gaze tracking camera, gaze tracking data corresponding to gaze of the user at a time the user is viewing individual ones of the multiple images;
    obtaining, from the physiological sensor, a measurement of a physiological condition of the user at the time that the user is viewing individual ones of the multiple images;
    establishing a model based at least in part on the gaze tracking data and the measurement of the physiological condition of the user at the time that the user is viewing individual ones of the multiple images;
    associating the model with a resource;
    storing the model in memory;
    receiving a request by the user to access the resource;
    responsive to receiving the request to access the resource, causing the multiple images to be presented on the display via an authentication interface along with a filler image, wherein the filler image is interspersed amongst the multiple images used to establish the model;
    obtaining, from the gaze tracking camera, login gaze tracking data corresponding to gaze of the user at a time that the user is viewing individual ones of the multiple images;
    obtaining, from the physiological sensor, a measurement of a physiological condition of the user at the time that the user is viewing individual ones of the multiple images;
    comparing the login gaze tracking data and the measurement of the physiological condition of the user at the time that the user is individual ones of the multiple images, with the model;
    determining, based on the comparing, that the login gaze tracking data and the measurement of the physiological condition of the user at the time that the user is viewing individual ones of the multiple images correlate with the model; and
    based at least in part on the determining, authenticating the user to access the resource, wherein the authenticating ignores gaze and physiological condition of the user when viewing the filler image.

2. The system of claim 1, wherein the physiological sensor comprises at least one of:
an electroencephalography (EEG) sensor;
a magnetoencephalography (MEG) sensor;
a functional near-infrared spectroscopy (fNIRS) sensor;
a skin galvanometer;
a pupil scanner; or
an electrocardiogram (EKG).

3. The system of claim 1, wherein the physiological sensor comprises a neurological sensor and the measurement of the physiological condition comprises measurement of a signal representing a brain state of the user.

4. The system of claim 3, wherein the neurological sensor comprises an electroencephalograph (EEG) sensor, a magnetoencephalography (MEG) sensor, or a functional near-infrared spectroscopy (fNIRS) sensor.

5. The system of claim 1, the operations further comprising obtaining an ambient measurement of the physiological condition prior to causing the multiple images to be presented on the display, wherein the model is further based at least in part on the ambient measurement of the physiological condition.

6. The system of claim 1, the operations further comprising:
obtaining, from the gaze tracking camera, gaze tracking data corresponding to the gaze of the user at a time that the user is viewing the filler image via the authentication interface;
obtaining, from the physiological sensor, measurement of the physiological condition of the user at the time that the user is viewing the filler image via the authentication interface; and
updating the model based on the gaze tracking data and the measurement of the physiological condition of the user at the time that the user is viewing the filler image.

7. The system of claim 1, wherein causing an individual image to be presented via the authentication interface comprises causing presentation of the individual image for at least about three hundred milliseconds and at most about one second.

8. A computer-implemented method, comprising:
causing multiple images to be presented;
obtaining, from a gaze tracking camera, gaze tracking data corresponding to gaze of a user at a time the user is viewing individual ones of the multiple images;
obtaining, from a physiological sensor, a measurement of a physiological condition of the user at the time that the user is viewing individual ones of the multiple images;
establishing a model based at least in part on the gaze tracking data and the measurement of the physiological condition of the user at the time that the user is viewing individual ones of the multiple images;
associating the model with a resource;
storing the model in memory;
receiving a request by the user to access the resource;
responsive to receiving the request to access the resource, causing the multiple images and a filler image to be presented on a display via an authentication interface;
obtaining, from the gaze tracking camera, login gaze tracking data corresponding to gaze of the user at a time that the user is viewing individual ones of the multiple images via the authentication interface;
obtaining, from the physiological sensor, a measurement of a physiological condition of the user at the time that the user is viewing individual ones of the multiple images via the authentication interface;
comparing the login gaze tracking data and the measurement of the physiological condition of the user at the time that the user is viewing individual ones of the multiple images via the authentication interface, with the model;
determining, based on the comparing, that the login gaze tracking data and the measurement of the physiological condition of the user at the time that the user is viewing individual ones of the multiple images via the authentication interface correlate with the model; and
based at least in part on the determining, authenticating the user to access the resource, wherein the authenticating ignores gaze and physiological condition of the user when viewing the filler image via the authentication interface.

9. The computer-implemented method of claim 8, further comprising:
obtaining, from the gaze tracking camera, gaze tracking data corresponding to the gaze of the user at a time that the user is viewing the filler image via the authentication interface;
obtaining, from the physiological sensor, measurement of the physiological condition of the user at the time that the user is viewing the filler image via the authentication interface; and
updating the model based on the gaze tracking data and the measurement of the physiological condition of the user at the time that the user is viewing the filler image.

10. The computer-implemented method of claim 8, wherein causing an individual image to be presented via the authentication interface comprises causing presentation of the image for at least about three hundred milliseconds and at most about one second.

11. The computer-implemented method of claim 8, wherein the physiological sensor comprises at least one of an electroencephalograph (EEG) sensor, a magnetoencephalography (MEG) sensor, or a functional near-infrared spectroscopy (fNIRS) sensor.

12. The computer-implemented method of claim 8, further comprising obtaining an ambient measurement of the physiological condition after receiving the request to access the resource, wherein:
the model is further based at least in part on an ambient measurement of the physiological condition of the user prior to receiving the request to access the resource;
the comparing further comprises comparing the ambient measurement of the physiological condition after receiving the request to access the resource with the model; and
the determining further comprises determining that the ambient measurement of the physiological condition after receiving the request to access the resource correlates with the model.

13. A computing device comprising:
one or more processors; and
memory having computer-executable instructions stored thereon which, when executed by the one or more processors, cause the computing device to perform operations comprising:
causing multiple images to be presented;
obtaining gaze tracking data corresponding to gaze of a user at a time the user is viewing individual ones of the multiple images;
obtaining a measurement of a physiological condition of the user at the time that the user is viewing individual ones of the multiple images;
establishing a model based at least in part on the gaze tracking data and the measurement of the physiological condition of the user at the time that the user is viewing individual ones of the multiple images;
associating the model with a resource;
storing the model in memory;
receiving a request by the user to access the resource;
responsive to receiving the request to access the resource, causing multiple images and a filler image to be presented on a display via an authentication interface;
obtaining login gaze tracking data corresponding to gaze of the user at a time that the user is viewing individual ones of the multiple images via the authentication interface;
obtaining a login measurement of a physiological condition of the user at the time that the user is viewing individual ones of the multiple images via the authentication interface; and
determining, based on the login gaze tracking data, the login measurement of the physiological condition, and the model, whether to authenticate the user to access the resource, wherein the determining ignores gaze and physiological condition of the user at a time the user is viewing the filler image via the authentication interface.

14. The computer-implemented method of claim 8, wherein the multiple images and the filler image are presented on the display concurrently.

15. The computer-implemented method of claim 8, wherein the multiple images and the filler image are presented on the display sequentially over a period of time.

16. The computer-implemented method of claim 9, further comprising converting the filler image to an image used for authentication when the user next attempts to access the resource.

17. The computing device of claim 13, wherein the multiple images and the filler image are presented on the display concurrently.

18. The computing device of claim 13, wherein the multiple images and the filler image are presented on the display sequentially over a period of time.

19. The computing device of claim 13, the operations further comprising:
obtaining gaze tracking data corresponding to the gaze of the user at the time that the user is viewing the filler image via the authentication interface;
obtaining measurement of the physiological condition of the user at the time that the user is viewing the filler image via the authentication interface; and
updating the model based on the gaze tracking data and the measurement of the physiological condition of the user at the time that the user is viewing the filler image.

20. The computing device of claim 19, the operations further comprising converting the filler image to an image used for authentication when the user next attempts to access the resource.

\* \* \* \* \*